US012064990B2

(12) United States Patent
Kostner et al.

(10) Patent No.: US 12,064,990 B2
(45) Date of Patent: Aug. 20, 2024

(54) METHODS AND APPARATUS FOR APPLYING DECORATIVE ELEMENTS TO WORKPIECES

(71) Applicant: D. Swarovski KG, Wattens (AT)

(72) Inventors: Hannes Kostner, Absam (AT); Claus Haaser, Wattens (AT); Elias Faccinelli, Innsbruck (AT); Franz Kaltenecker, Jenbach (AT); Thomas Boettger, Brandenberg (DE); Franz Schwanniger, Innsbruck (AT); Herbert Margreiter, Bruck am Ziller (AT)

(73) Assignee: D. Swarovski KG, Wattens (AT)

( * ) Notice: Subject to any disclaimer, the term of this patent is extended or adjusted under 35 U.S.C. 154(b) by 286 days.

(21) Appl. No.: 17/597,451

(22) PCT Filed: Jul. 10, 2020

(86) PCT No.: PCT/EP2020/069678
§ 371 (c)(1),
(2) Date: Jan. 6, 2022

(87) PCT Pub. No.: WO2021/005243
PCT Pub. Date: Jan. 14, 2021

(65) Prior Publication Data

US 2022/0250407 A1 Aug. 11, 2022

(30) Foreign Application Priority Data

Jul. 11, 2019 (EP) .................................... 19185868
Jul. 11, 2019 (EP) .................................... 19185873
Jul. 11, 2019 (EP) .................................... 19185878

(51) Int. Cl.
*B32B 41/00* (2006.01)
*A44C 27/00* (2006.01)
(Continued)

(52) U.S. Cl.
CPC ................ *B44B 9/00* (2013.01); *A44C 27/00* (2013.01); *B44C 1/18* (2013.01)

(58) Field of Classification Search
CPC ........... B44B 9/00; A44C 27/00; A44C 17/04; B44C 1/18
(Continued)

(56) References Cited

U.S. PATENT DOCUMENTS 5,979,038 A 11/1999 Nelson et al.
5,992,485 A 11/1999 Song
(Continued)

FOREIGN PATENT DOCUMENTS

CH 703200 A2 11/2011
CN 1230619 A 10/1999
(Continued)

OTHER PUBLICATIONS

"Denso Robots Placing Swarovski Stones"; densoroboticseurope; Youtube video; Feb. 8, 2016; retrieved from URL: https://www.youtube.com/watch?v=lb3wpxw3MsY.
(Continued)

*Primary Examiner* — Michael N Orlando
*Assistant Examiner* — Joshel Rivera
(74) *Attorney, Agent, or Firm* — Stevens & Showalter LLP

(57) ABSTRACT

Apparatus for automatically applying a decorative element to a workpiece comprises an element applicator configured to apply the decorative element in an application direction at an application location, a moveable support for supporting the workpiece, the support being moveable by translation and/or rotation along and/or about an axis transverse to the application direction, and a control arrangement. The control arrangement is configured to determine, or receive information relating to, an element location at which the decorative
(Continued)

element is to be applied to the workpiece, cause relative translation and/or rotation between the support and the decorative element applicator along and/or about an axis transverse to the application direction to align and/or orient the application location with the element location, and cause the decorative element applicator to apply the decorative element at the element location of the workpiece.

15 Claims, 30 Drawing Sheets

(51) Int. Cl.
*B44B 9/00* (2006.01)
*B44C 1/18* (2006.01)

(58) Field of Classification Search
USPC .................... 156/60, 64, 350, 351, 378, 379
See application file for complete search history.

(56) References Cited

U.S. PATENT DOCUMENTS

| | | | |
|---|---|---|---|
| 6,003,577 | A | 12/1999 | Morito |
| 6,546,857 | B2 | 4/2003 | Fischer et al. |
| 6,796,877 | B1 | 9/2004 | Bingham et al. |
| 2010/0043193 | A1 | 2/2010 | Choi |
| 2016/0199985 | A1 | 7/2016 | Ganninger |

FOREIGN PATENT DOCUMENTS

| | | | |
|---|---|---|---|
| CN | 1335799 | A | 2/2002 |
| DE | 193995 | C | 9/1906 |
| DE | 19514132 | A1 | 10/1996 |
| DE | 9117221 | U1 | 9/1997 |
| EP | 0638443 | A2 | 2/1995 |
| EP | 1116602 | A1 | 7/2001 |
| ES | 2257961 | A1 | 8/2006 |
| ES | 2257961 | B1 | 8/2006 |
| GB | 2360265 | A | 9/2001 |
| WO | 2021005243 | A1 | 1/2021 |

OTHER PUBLICATIONS

"High Speed Pick and Place Robots by Bastian Solutions"; Bastian Solutions; Youtube video; Apr. 3, 2012; retrieved from https://www.youtube.com/watch?v=6RKXVefE98w.
"Decorating Smart Phone Covers with Robots"; Epson Robots; Youtube video; Mar. 11, 2014; retrieved from https://www.youtube.com/watch?v=MX70qt3DBoc.
Patrick Rudiger; Extended European Search Report; European Application No. 19185868; Jan. 21, 2020; European Patent Office; Munich, Germany.
Sofie Bjorklund; Extended European Search Report; European Application No. 19185873; Jan. 24, 2020; European Patent Office; Munich, Germany.
Sofie Bjorklund; Extended European Search Report; European Application No. 19185878; Jan. 29, 2020; European Patent Office; Munich, Germany.
Saida Isliy; International Search Report and Written Opinion; International Application No. PCT/EP2020/069678; Aug. 31, 2020; European Patent Office; Rijswijk, Netherlands.
Meena, Chandra Prakash; Examination Report dated Nov. 1, 2023; Indian Application No. 202227007154; Intellectual Property India; Mumbai, India.
Rüdiger. Patrick; Communication pursuant to Article 94(3) EPC dated Oct. 19, 2023; European Application No. 20750180.0; European Patent Office; Munich, Germany.
Densoroboticseurope; "Denso Robots Placing Swarovski stones"; Youtube; Feb. 8, 2016; https://www.youtube.com/watch?vlb3wpxw3MsY.
Bastian Solutions; High-Speed Pick & Place Robots; Youtube; Apr. 3, 2012; https://www.youtube.com/watch?v=6RKXVefE98w.
Epson Robots: "Decorating Smart Phone Covers with Robots"; Youtube; Mar. 11, 2014; https://www.youtube.com/watch?v=MX70qt3DBoc.
Carlén: "Picking up workpiece Comments"; Nov. 1, 2009; pp. 1-4; [retrieved on Oct. 13, 2023].
Aiai, Zheng; Office Action dated May 17, 2023; Chinese Application No. 202080050483.X; China National Intellectual Property Administration; Beijing, China.
Aiai, Zheng; Second Chinese Office Action dated Feb. 8, 2024; Chinese Application No. 202080050483.X; China National Intellectual Property Administration; Beijing, China.

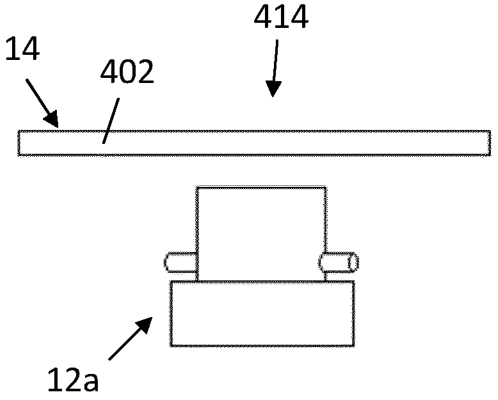
Figure 22
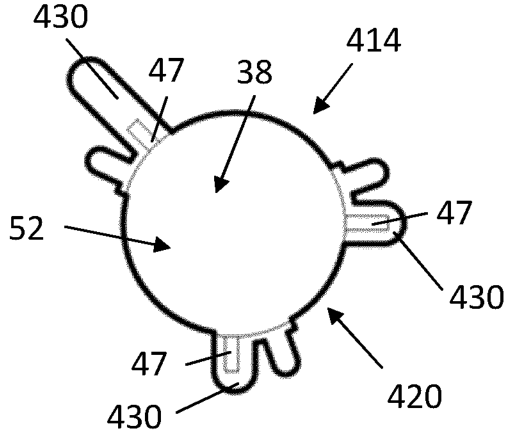
Figure 23
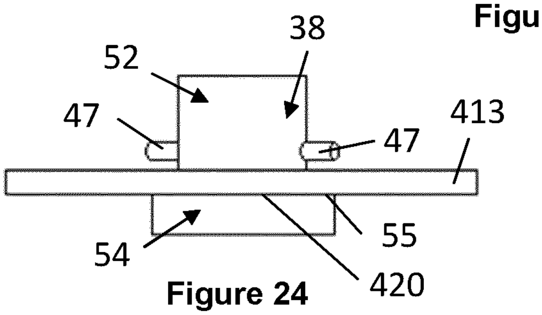
Figure 24
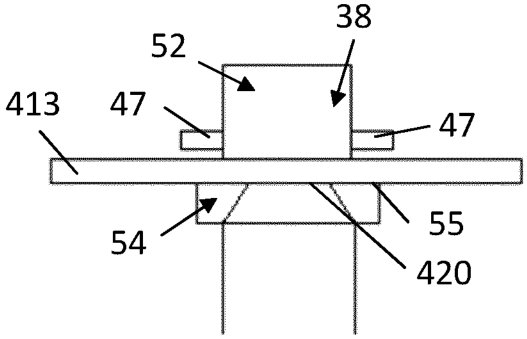
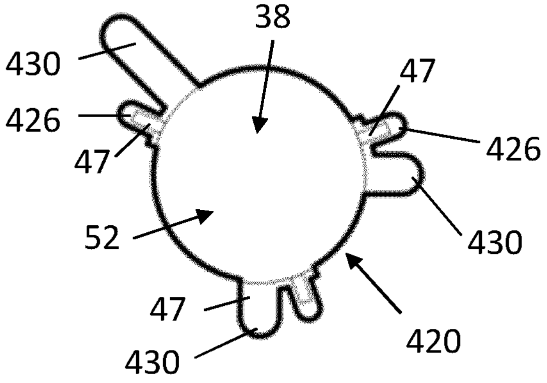
Figure 25b
Figure 25a
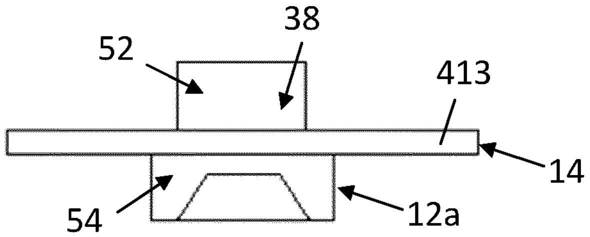
Figure 26

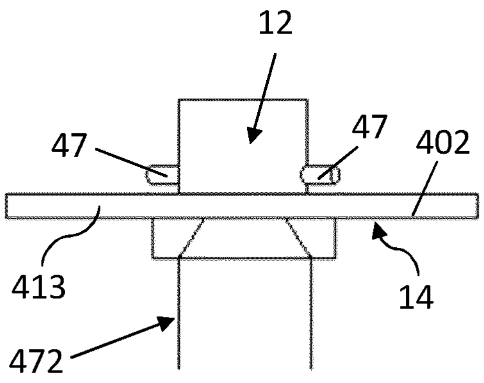
Figure 45a
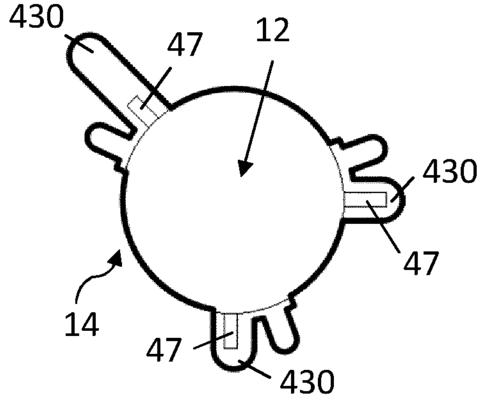
Figure 45b
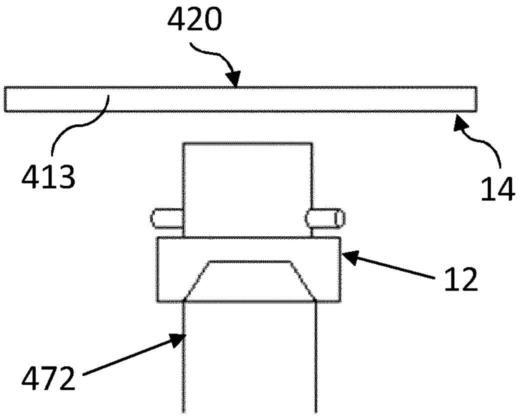
Figure 46
Figure 47
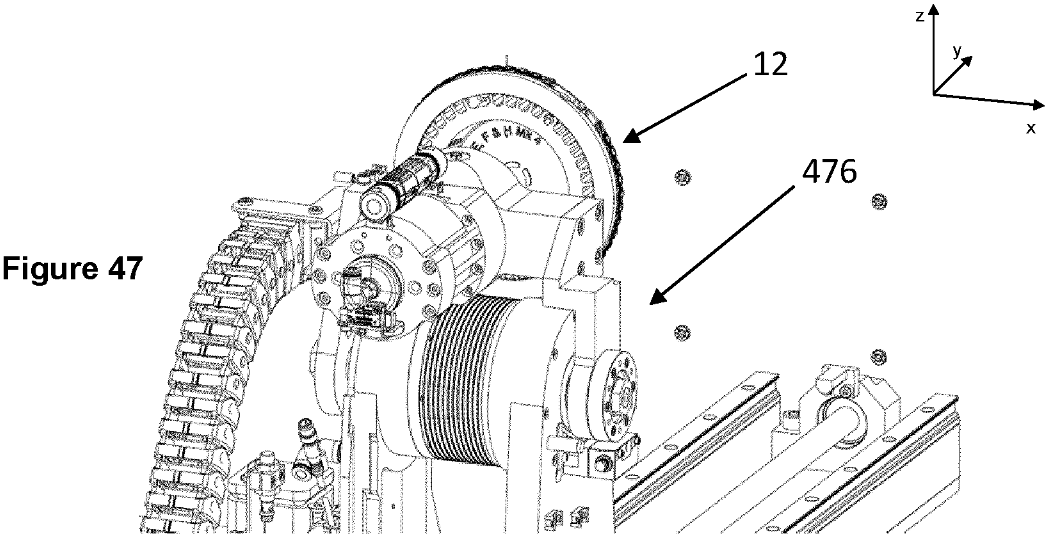

METHODS AND APPARATUS FOR APPLYING DECORATIVE ELEMENTS TO WORKPIECES

FIELD OF THE INVENTION

The present disclosure relates to apparatus for automatically applying a decorative element to a work piece, to a method of applying a decorative element to a work piece, and to a method of making an article.

INTRODUCTION

Articles of jewellery often contain decorative elements, such as gemstones or crystals, to give the article a more interesting or desirable appearance. In this case, the article of jewellery contains a body or workpiece, which is typically predominantly made out of metal, and one or more decorative elements that are applied to the body.

The workpiece is conventionally manufactured using a 'lost-wax' casting process, which will be described in brief here. The lost-wax process begins with the manufacture of a master model of the workpiece, in wax or clay or a similar material. This master model can be hand modelled or 3D printed, for example. In a next step, a mould of the master model is made by taking a silicone negative of the master model, before molten wax is injected into the mould to create a wax copy. Multiple wax copies may be formed and joined together to form a tree-like structure known as a wax tree.

Next, the wax tree is removed from the mould and placed in a receptacle for casting. Gypsum is poured into the receptacle around the wax tree, and the receptacle is subsequently placed into an oven for heating. As the oven increases in temperature, the heat from the oven both heats the gypsum and melts the wax, which burns off leaving no residuals. The hardened shell formed by the gypsum is permitted to cool and can then be used as a casting mould fora number of workpieces.

To form the workpieces, molten metal is poured into the casting mould and is left to solidify. When the casting mould is removed, a metal tree in the same form as the wax tree is revealed, and this tree can subsequently be cut into its constituent workpieces, which are ground and polished as required. Optional soldering or assembly steps may follow, if the workpiece is formed of multiple interconnected parts (for example, a necklace or bracelet comprising multiple interconnected links), and electroplating may be carried out to apply a precious metal coating to the workpiece if desired.

Decorative elements may be accommodated on the workpiece in multiple ways. For a cavity-set article, the workpiece may comprise one or more cavities, each configured to receive an amount of adhesive followed by a decorative element, such that the element is adhered to walls of the cavity. In some embodiments, the adhesive may be omitted, and the element may be secured into the cavity by way of mechanical fixation: with prongs, for example. The prongs may, for example be pre-formed around the cavity, and may be slightly elastically deformable, such the element can be pushed into place between the prongs.

Alternatively, or additionally, the elements may be set into a mouldable material. In this case, instead of or in addition to metal, the workpiece may comprise a region of mouldable material, for example a two-component epoxy composite clay known as Epoxy clay. The Epoxy clay can be used as a base in which to embed one or more decorative elements, permitting versatile decorative element application and greater flexibility in the appearance of the article of jewellery than may be possible with the use of a wholly metal workpiece having cavities. Irrespective of the form of the workpiece, the process used to apply these decorative elements to the workpiece is conventionally predominantly, if not wholly, manual, with a human operator applying adhesive if necessary, and using specialist tools to select and apply a decorative element to the cavity or to the Epoxy clay. Such processes are time intensive and both the rate of production and the quality of the finished article are affected by the concentration and ability of the operator.

It is known to try to automate aspects of this process to overcome problems associated with manual application of decorative elements to workpieces, but the throughput of machines used in these processes tends to be too low for effective utilisation of the machinery. Further, these automated processes are still prone to producing articles of jewellery having quality issues, resulting in machine downtime and scrap or rework of the articles.

The present invention aims to solve at least some of the problems referred to above.

SUMMARY OF THE INVENTION

Against this background, the invention resides in apparatus for automatically applying a decorative element to a workpiece. The apparatus comprises: an element applicator configured to apply the decorative element in an application direction at an application location; a moveable support for supporting the workpiece, the support being moveable by translation and/or rotation along and/or about an axis transverse to the application direction; and a control arrangement. The control arrangement is configured to: determine, or receive information relating to, an element location at which the decorative element is to be applied to the workpiece; cause relative translation and/or rotation between the support and the decorative element applicator along and/or about an axis transverse to the application direction to align and/or orient the application location with the element location; and cause the decorative element applicator to apply the decorative element at the element location of the workpiece.

The control arrangement may be configured to cause relative translation and/or rotation between the support and the decorative element applicator along and/or about an axis perpendicular to the application direction to align and/or orient the application location with the element location. The control arrangement may be configured to cause relative translation and rotation between the support and the decorative element applicator simultaneously. The control arrangement may be configured to cause simultaneous movement of the support and the decorative element applicator.

The apparatus may comprise a workpiece presentation area for presenting workpieces on a workpiece support and a working area in which the element applicator applies elements to the workpiece, the moveable support being moveable between the workpiece presentation area and the working area to transport a workpiece from the workpiece presentation area to the working area.

The control arrangement may be configured to cause movement of the moveable support between the workpiece presentation area and the working area to transport a workpiece from the workpiece presentation area to the working area.

The apparatus may comprise a workpiece insertion location, a workpiece storage location and a workpiece transporter configured to transport the workpiece from the workpiece insertion location to the workpiece storage location. Optionally, the workpiece transporter is configured to transport a second workpiece from the workpiece insertion location to the workpiece storage location when the decorative element applicator is applying a decorative element to a first workpiece.

The moveable support may comprise a connecting feature that is configured to engage with the workpiece and/or a holder that holds the workpiece, to connect the moveable support to the workpiece and/or holder.

The control arrangement may be configured to cause the moveable support to retrieve a workpiece from a workpiece support in the workpiece presentation area.

The moveable support may comprise a connecting feature configured to engage with a corresponding or complementary connecting feature on the workpiece and/or on the holder that holds the workpiece. The connecting feature of the holder and/or the workpiece may comprise a recess. The connecting feature of the holder and/or the workpiece may comprise a conical or frustoconical recess. The connecting feature of the moveable support may comprise a protrusion and, optionally, a protrusion shaped to complement the recess. The protrusion may be substantially conical or frustoconical. The moveable support may be configured to engage with the workpiece and/or the holder in a direction opposite to the application direction.

The apparatus comprises an element retrieval location at which one or more decorative elements are presented to the applicator and a working area in which the element applicator applies decorative elements to the workpiece. The applicator may be moveable between the retrieval location and the working area so as to retrieve a decorative element from the element retrieval location and transport it to the working area for application to the workpiece.

The control arrangement may be configured to cause movement of the applicator between the retrieval location and the working area so as to retrieve a decorative element from the element retrieval location and transport it to the working area for application to the workpiece.

The applicator may be configured to retrieve a decorative element from the element retrieval location by applying suction to the decorative element. The element applicator may comprise an application sensor, the application sensor being configured to detect a force with which the decorative element is applied to the workpiece.

The apparatus may further comprise an element presentation region for presenting a plurality of elements on an element support.

In this case, the element presentation region may define the element retrieval location, such that the applicator is moveable between the element presentation region and the working area.

The apparatus may further comprise element retriever configured to retrieve an element from the element support and transport the element to the element retrieval location. In this case, the applicator may be configured to retrieve the element from the element retrieval location.

The applicator may be configured to retrieve the element from the retriever at the element retrieval location. The applicator may be configured to retrieve the element from a second element support at the element retrieval location.

The element retriever may comprise a retriever arm configured to rotate the decorative element from a presentation orientation to an application orientation during transportation. The application orientation may correspond to an orientation of the decorative element when the decorative element has been applied to the workpiece.

The control arrangement may be configured to cause rotation of the decorative element from the presentation orientation to the application orientation during transportation. The element retriever may be configured to invert the decorative element, optionally through approximately 180 degrees. The element retriever may be a retriever arm that is pivotable about an axis to move the decorative element from the element support to the element retrieval location, and to invert the decorative element. The element retriever may be configured to retrieve an element from the element support by applying suction to the decorative element.

The decorative element may comprise a presentation face. In the presentation orientation the presentation face may be oriented downwardly, while in the application orientation the presentation face may be oriented upwardly. If the decorative element is a ground faceted element such as a crystal or gemstone, the presentation face may be a table facet of the ground faceted element.

The control arrangement may be configured to select a decorative element to apply at the element location. The control arrangement may be configured to determine, or receive information relating to, a workpiece characteristic at the element location, and to select a decorative element to apply at the element location in dependence on the workpiece characteristic.

The apparatus may further comprise an element presentation region for presenting a plurality of elements on an element support, the support defining element presentation locations at which elements are presented. The control arrangement may be configured to output a signal to cause the support to vibrate to cause each decorative element of the plurality of elements to self-locate in a respective element presentation location.

The apparatus may further comprise an element sensor system configured to detect a characteristic of the decorative elements, wherein the control arrangement may be configured to cause the retrieval of a selected decorative element from the support in dependence on its decorative element characteristic. The element sensor system may be configured to detect a characteristic of the element by characterising the element directly. Alternatively or additionally, the element sensor system may be configured to detect information relating to the decorative element characteristics provided on an information carrier, such as a unique ID code. If the decorative elements are provided on a decorative element support, the information carrier may be provided on the decorative element support.

The apparatus may further comprise an adhesive regulation system configured to detect or receive information relating to a workpiece characteristic. The control arrangement may be configured to determine a desired adhesive amount for application at the element location in dependence on the workpiece characteristic.

The control arrangement may be configured to output a signal to cause an adhesive applicator to dispense the desired adhesive amount at the element location. The apparatus may comprise an adhesive applicator configured to apply adhesive at a dispensing location. The dispensing location may correspond to the application location. The control arrangement may be configured to cause relative translation and/or rotation between the support and the adhesive applicator to align and/or orient the dispensing location with the element location of the workpiece.

The adhesive regulation system may comprise a sensor, which may be a camera.

The apparatus may comprise an adhesive applicator configured to apply adhesive to the element location of the workpiece. The control arrangement may be configured to output an instruction to the adhesive applicator to dispense the desired adhesive amount to the workpiece.

The workpiece characteristic may be a characteristic of a cavity of the workpiece, wherein the adhesive applicator is configured to apply the adhesive to the cavity. The cavity may be a cavity configured to receive a decorative element. The characteristic of the cavity may comprise one or more of: a maximum diameter of the cavity; a roughness of an internal surface of the cavity; a depth of the cavity; and an angle of an internal surface of the cavity. The maximum diameter of the cavity may correspond to a diameter of the cavity at the widest point of the cavity.

The control arrangement may be configured to determine the desired adhesive amount in further dependence on an adhesive characteristic. Optionally, the adhesive characteristic is a viscosity of the adhesive. The adhesive regulation system may comprise a test system, and the adhesive characteristic may be determined in dependence on a test conducted using the test system.

The control arrangement may be configured to cause retrieval of the element from the element support and application of adhesive to the element location to occur substantially simultaneously.

The apparatus may comprise an element sensor system configured to detect a characteristic of a decorative element to be applied to the workpiece. The control arrangement may be configured to determine the desired adhesive amount further in dependence on the decorative element characteristic.

The decorative element characteristic may comprise one or more of: an orientation of the decorative element; a roundness of the decorative element; a colour of the decorative element; and a maximum diameter of the decorative element.

The element sensor system may comprise a second sensor. The second sensor may be a camera. The sensor of the element sensor system may be different to a sensor of the adhesive regulation system.

The maximum diameter of the decorative element may correspond to a diameter of the decorative element at the widest point of the decorative element. The widest point of the decorative element may be the widest point of the decorative element as viewed by the second sensor. The element sensor system may further comprise a mirror to provide a line of sight from the camera to the decorative element. The element sensor system may be configured to detect the decorative element characteristic substantially simultaneously to the adhesive regulation system detecting the workpiece characteristic.

The adhesive regulation system may be configured to assess whether excess adhesive is present and/or to detect a location or orientation of the applied decorative element relative to the workpiece. The control arrangement may be configured to cause the camera of the adhesive regulation system to take a first image of the workpiece before adhesive is applied to detect the workpiece characteristic, and to take a second image of the workpiece after the adhesive and the decorative element have been applied, to conduct the quality control check. In the event that the adhesive regulation system detects excess adhesive, the control arrangement may be configured to do one or more of the following: to mark the workpiece for re-work; to output an alert to an operator; and/or to mark the workpiece to be scrapped.

The control arrangement may be configured: to determine or receive information relating to a first element location of the workpiece at which a first decorative element is to be applied to the workpiece; to cause relative movement between the support and the decorative element applicator to align the application location with the first element location; and to cause the decorative element applicator to apply the first decorative element at the first element location; and then: to determine or receive information relating to a second element location of the workpiece at which a second decorative element is to be applied to the workpiece; to cause relative movement between the support and the decorative element applicator to align the application location with the second element location; and to cause the decorative element applicator to apply the decorative element at the second element location of the workpiece.

The control arrangement may be configured: to cause the adhesive applicator to apply adhesive to a first element location of the workpiece; and to cause the element applicator to apply a first decorative element to the adhesive at the first element location; and then to cause the adhesive applicator to apply adhesive to a second element location of the workpiece; and to cause the element to apply a second decorative element to the adhesive at the second element location.

The workpiece may have a primary reference feature common to all workpieces of that type and the apparatus may further comprise an alignment sensor system configured to detect the primary reference feature. The control arrangement may be configured to determine an offset between a detected primary reference feature location and/or orientation and a target location and/or orientation, and align the primary reference feature with the target location and/or orientation.

The control arrangement may be configured to cause relative movement between the moveable support and the applicator to align the primary reference feature with the target location and/or orientation. For example, the control arrangement may be configured to cause movement of the moveable support to align the primary reference feature with the target location and/or orientation.

The alignment sensor system may comprise a camera, the camera being configured to image the primary reference feature.

The control arrangement may be configured to store or receive information relating to a base model of the workpiece, the base model including information relating to one or more secondary parameters of the base model, and a plurality of element locations on the base model. An alignment sensor system may be configured to detect a secondary parameter relating to a selected area of the workpiece, and to transmit information relating to the detected secondary parameter to the control arrangement. The control arrangement may be configured to determine a deviation between the detected secondary parameter and a corresponding secondary parameter of the base model, and to calculate an updated model for the selected area of the workpiece based on the deviation, the updated model comprising updated element locations in the selected area of the workpiece.

The secondary parameter may be one or more of the following: a difference between a location of a first secondary reference feature in a selected area of the workpiece and a location of a second secondary reference feature in the selected area of the workpiece; a difference between an orientation of a first secondary reference feature in a selected area of the workpiece and an orientation of a second secondary reference feature in the selected area of the workpiece; and a statistical or mathematical parameter relating to a secondary reference feature in the selected area of the workpiece. One of the secondary reference features may be defined by the primary reference feature.

The alignment sensor system may comprise a camera, and the camera may be configured to image at least a part of the workpiece to determine the secondary parameter of the workpiece. Where the secondary parameter relates to a secondary reference feature, the camera may be configured to image the secondary reference feature.

The camera that is configured to image the secondary reference feature may be the same as the camera configured to image the primary reference feature.

The or each secondary reference feature may be selected from the group consisting of the following features: an arrangement of one or more cavities; a moulded feature of the workpiece, or a contour or profile of the workpiece.

The control arrangement may be configured to cause the decorative element applicator to apply a decorative element to the workpiece at an updated element location based on the updated model.

The sensor system may be configured to detect a further secondary parameter relating to a further selected area of the workpiece, and to transmit information relating to the detected further secondary parameter to the control arrangement. The control arrangement may be configured to determine a deviation between the further detected secondary parameter and the corresponding secondary parameter of the base model, and to calculate an updated model for the further selected area of the workpiece based on the deviation, the updated model optionally comprising updated element locations in the further selected area of the workpiece.

The control arrangement may be configured to calculate an updated model for the selected area of the workpiece by scaling the base model in dependence on the deviation between the detected secondary parameter and the corresponding secondary parameter of the base model.

The invention also extends to a method of making an article, the article comprising a plurality of decorative elements at respective element locations. The method comprises a) providing an element applicator configured to apply a decorative element in an application direction at an application location; b) providing a workpiece defining the plurality of element locations; c) supporting the workpiece using a support; d) causing relative translation and/or rotation between the support and the element applicator along and/or about an axis transverse to the application direction to align and/or orient the application location with an element location; and e) causing the element applicator to apply a decorative element at the element location of the workpiece.

The method may comprise determining element locations on the workpiece using a control arrangement, or supplying information relating to the element locations to a control arrangement. The method may comprise causing relative translation and/or rotation between the support and the element applicator using the control arrangement, and optionally causing the element applicator to apply the decorative element at the element location of the workpiece using the control arrangement.

The method may comprise providing an adhesive applicator configured to dispense adhesive at a dispensing location. The method may comprise dispensing adhesive for securing the decorative element to the workpiece. The method may comprise causing relative translation and/or rotation between the support and the adhesive applicator so as to align and/or orient the dispensing location with the element location, and dispensing adhesive to an element location of the workpiece, optionally causing the element applicator to apply a decorative element to the adhesive at the element location. The method may comprise: detecting a workpiece characteristic using a sensor; and determining a desired adhesive amount in dependence on the workpiece characteristic; and optionally, dispensing the desired adhesive amount to the workpiece.

The method may comprise retrieving the decorative element from an element presentation region before applying the decorative element to the element location.

The method may comprise determining an element location at which the decorative element is to be applied to the workpiece. The workpiece may have a primary reference feature common to all workpieces of that type and the method may comprise: detecting information associated with the primary reference feature; and determining the element location at which the decorative element is to be applied to the workpiece in dependence on said information. The method may comprise: detecting a primary reference feature on the workpiece; determining an offset between a detected primary reference feature location and/or orientation and a target location and/or orientation; and causing movement of the support to align the primary reference feature with the target location and/or orientation. The step of detecting the primary reference feature may comprise imaging the primary reference feature using a camera. The step of determining an offset between the location and/or orientation of the primary reference feature and a target location and/or orientation may comprise processing the image using a control arrangement.

The method may comprise presenting the decorative element in a presentation orientation in the presentation region, and applying the decorative element to the element location in an application orientation which is an inversion of the presentation orientation. The method may comprise inverting the decorative element as it is transported from the presentation region to the element location The control arrangement may comprise multiple controllers, each controller configured to effect one or more aspects of the function of the control arrangement. Alternatively, the control arrangement may comprise a single controller configured to effect all aspects of the function of the control arrangement.

According to another aspect the invention resides in a system for supporting a workpiece to allow transportation of the workpiece to a working region of a machine for application of decorative elements to the workpiece. The system comprises a holder configured to hold a workpiece and a carrier configured to carry the holder. The holder comprises a connecting feature that is configured to connect with a corresponding connecting feature of a moveable support of the machine to connect the holder to the moveable support so that the moveable support can transport the holder to the working region of the machine. For example, the connecting feature may be shaped so that it is connectable to a corresponding connecting feature of a moveable support.

The system may comprise a plurality of holders. Each holder may be configured to hold a respective workpiece, and the carrier being configured to carry the plurality of holders. Each holder may comprise a connecting feature. The connecting feature of each holder may be the same.

The holder and the carrier may each comprise cooperating engaging features that are configured to engage to secure the holder to the carrier and to disengage to permit removal of the holder from the carrier.

The holder may comprise a plurality of engaging features and/or the carrier may comprise a plurality of engaging features. The number of engaging features of the holder may correspond to the number of engaging features of the carrier.

The cooperating engaging features may comprise cooperating male and female engaging features.

The engaging feature of the holder may comprise one or more protrusions that protrude from a main body of the holder, and/or the engaging feature of the carrier may comprise one or more recesses configured to receive the protrusions on the holder.

The number of recesses of the co-operating feature may correspond to the number of protrusions of the engaging feature.

Each protrusion may be configured to be seated in a respective recess when the holder is carried by the carrier.

The spacings between the protrusions on the holder may be the same as the spacings between the recesses on the carrier. In particular, the protrusions may have a relative angular spacing that corresponds to the relative angular spacing of the recesses, such that the protrusions and the recesses can be aligned to allow the protrusions to rest in the recesses.

The corresponding connecting feature of the moveable workpiece support may be configured to connect with the connecting feature of the holder when the movable workpiece support is moved in a connecting direction. The engaging feature of the holder may be configured to disengage with the respective engaging feature of the carrier when the holder is moved in a disengaging direction. The disengaging direction and the connecting direction may be the same direction.

The corresponding connecting feature of the moveable workpiece support may comprise one or more locking features and the connecting feature of the holder may comprise one or more locking recesses, the locking features being configured to engage with the locking recesses. The locking features may take the form of one or more protruding lugs. The locking recesses may be provided as channels.

The carrier may comprise a withdrawal feature configured to allow the holder to be withdrawn from the carrier.

The holder may be configured to be withdrawn from the carrier in a withdrawal direction opposite to the disengaging and connecting directions.

The carrier may comprise an aperture, the aperture being configured to surround a part of the holder, such that the holder extends through the carrier when the holder is carried by the carrier.

When the holder is arranged in the carrier to extend through the aperture, the connecting feature on the holder may be located below the carrier.

The withdrawal feature may comprise one or more openings that extend from the aperture. The openings may extend radially from the aperture.

Spacings between the protrusions on the holder may be the same as spacings between the openings on the carrier, such that, when the protrusions and the openings are aligned, the body and protrusions of the holder can be withdrawn through the aperture and openings of the carrier.

The number of openings may correspond to the number of recesses. The one or more openings may be rotationally offset from the one or more recesses. Each opening may be rotationally offset from a respective recess by the same degree.

The aperture may have a shape corresponding to an outer profile of the holder.

The system may comprise a plurality of holders. The plurality of holders may include a first holder configured to hold a first workpiece and a second holder configured to hold a second workpiece, wherein the first and second workpieces are different.

An interface between the first holder and the first workpiece may differ from an interface between the second holder and the second workpiece. A workpiece holding region of the first holder may differ from a workpiece holding region of the second holder. The first holder may be configured to hold the first workpiece above the carrier, and the second holder may be configured to hold the second workpiece below the carrier.

The holder may be configured to hold a first workpiece and a third workpiece, wherein the first and third workpieces are different. The holder may be configured to hold a first workpiece and a third workpiece simultaneously.

The carrier may comprise one or more elongate apertures for handling of the carrier by an operator.

The system may comprise a plurality of carriers each configured to transport a holder. Each carrier of the plurality of carriers may comprise a protruding feature and a receiving feature, such that the plurality of carriers is configured to be stacked.

The holder may comprise a clamping arrangement for clamping the respective workpiece to the holder. The clamping arrangement may comprise a clamping lever and a clamping piece. The clamping lever may be arrangeable in a de-actuated configuration in which the clamping piece does not clamp the workpiece and in an actuated configuration in which the clamping piece clamps the workpiece. The workpiece may be an annular workpiece and the clamping piece may have an annular clamping surface against which the workpiece is clamped. The clamping piece may be configured such that an outer diameter of the annular clamping surface increases when the clamping lever is moved from the open position to the closed position. The holder may comprise a body portion and the clamping arrangement may be rotatable with respect to the body portion.

The holder may comprise a first section configured for location above the carrier when the holder is held by the carrier, and a second section configured for location below the carrier when the holder is held by the carrier, and wherein the connecting feature is located on the second section of the holder.

The connecting feature may be defined on an underside of the second section. The connecting feature on the holder may be a male or female connecting feature. The connecting feature on the holder may comprise a recess.

The holder may comprise a workpiece holding region for holding the workpiece, and the workpiece holding region may be arranged on the first portion of the holder.

The recess may be arranged in a base of the holder, to face downwardly when the holder is carried by the carrier.

The recess may be substantially conical or frustoconical. The connecting feature on the machine may comprise a protrusion shaped to complement the recess. The protrusion may be substantially conical or frustoconical.

The invention also extends to a machine for automatically applying decorative elements to a workpiece held in a holder, the machine comprising: a workpiece-receiving region for receiving the carrier and associated holders and workpieces of the system above; and a moveable support comprising a connecting feature that is configured to engage with the connecting feature on the holder to connect the holder to the moveable support; wherein the moveable support is moveable between the workpiece-receiving region and the working region.

The moveable support may be configured to move in one or more directions and/or rotate in one or more rotational degrees of freedom to remove the holder from the carrier.

The moveable support may be configured to move in a first direction to disengage the holder from the carrier, to rotate about an axis parallel to the first direction and to move in a second direction opposite to the first direction to remove the holder from the carrier.

The moveable support may be a manipulator arm.

The invention further extends to a method for transporting a workpiece to a working region of a machine for application of decorative elements to the workpiece, the machine having a moveable support. The method comprises: mounting a workpiece to a holder; mounting the holder to a carrier, the holder comprising a connecting feature; arranging the carrier and mounted holder in the machine; connecting a corresponding connecting feature of the moveable support with the connecting feature of the holder to connect the holder to the moveable support; and, using the moveable support: removing the holder from the carrier; and transporting the holder to the working region of the machine.

At least a part of the step of removing the holder from the carrier may comprise moving the moveable support and holder in a disengaging direction. The step of connecting the connecting feature of the moveable support with the connecting feature of the holder may comprise moving the moveable support in a connecting direction. In this case, the disengaging direction and the connecting direction may be the same direction, and may optionally be an upward direction.

The step of connecting the corresponding connecting feature of the moveable support to the connecting feature of the holder may occur substantially simultaneously with the step of disengaging the holder from the carrier using the manipulator arm.

Removing the holder from the carrier using the moveable support may comprise: moving the moveable support and holder in a disengaging direction; rotating the holder relative to the carrier; and moving the moveable support and holder in a withdrawal direction opposite to the disengaging direction.

The invention extends further to a method of making an article, the article comprising a plurality of decorative elements at respective element locations. The method comprises: transporting a workpiece to a working region of a machine according to the method described above, and applying a decorative element to an element location on the workpiece in the working region of the machine.

According to a further aspect, the invention resides in a system for presenting a plurality of decorative elements for automatic application of the decorative elements to a workpiece. The system comprises: a sensor system configured to detect a characteristic of the decorative elements; a support configured to support the decorative elements, the support configured to provide a line of sight from the sensor system to the decorative elements; a decorative element retriever configured to retrieve the decorative elements from the support; and a controller configured to cause the decorative element retriever to retrieve a selected decorative element from the support in dependence on its decorative element characteristic.

The controller may be configured to cause movement of the support and/or the decorative element retriever to align the decorative element retriever with a decorative element, to retrieve the element from the support.

The decorative element characteristic may be one or more of the following: a presence of the decorative element; an orientation of the decorative element; a shape parameter of the decorative element, such as a roundness of the decorative element; a colour of the decorative element; a surface quality parameter of the decorative element; one or more dimensions of the decorative element, such as a maximum diameter of the decorative element; and an aspect ratio of the decorative element.

In the event that the decorative element characteristic is an orientation of the decorative element, the sensor may be configured to detect whether the decorative element is in a presentation orientation. The presentation orientation may be an inversion of an application orientation of the decorative element when the decorative element has been applied to the workpiece.

The maximum diameter of the decorative element may correspond to a diameter of the decorative element at the widest point of the decorative element.

The decorative element characteristic may be a fill rate of the support. The fill rate of the support may be a number of predetermined element regions that are supporting a respective decorative element.

The controller may be configured to cause movement of the support in a first direction and movement of the decorative element retriever in a second direction, the first and second directions being perpendicular.

The sensor system may be an image processing system. The sensor system may comprise a camera.

The support may comprise a base. The base of the support may be configured to provide the line of sight from the sensor system to the decorative element through the base. In this case, the line of sight may be provided from a side of the base opposite to the decorative element.

The support may be at least partially transparent so as to provide the line of sight from the sensor system to the decorative element.

The controller may be configured to control an adhesive application system. In this case, the controller may be configured to determine a desired amount of adhesive to be applied by the adhesive application system to the workpiece in dependence on the decorative element characteristic.

The support may define element presentation locations at which elements are presented for sensing by the sensor system and retrieval by the element retriever.

The controller may be configured to cause movement of the support and/or the decorative element retriever to align the decorative element retriever with an element presentation location to retrieve an element from the element presentation location.

The element presentation locations may be defined by recesses or apertures in the support.

The line of sight may be provided via a base of the recess or opening.

The controller may be configured to output a signal to cause the support to vibrate, to cause each decorative element of the plurality of decorative elements to self-locate in a respective element presentation location. The system may comprise an actuator arranged to effect vibration of the support upon receipt of the signal from the controller.

The support may comprise a base, and a base of the support may be at least partially transparent. The recesses or apertures of the element presentation locations may be provided in the base. The base may be transparent at the recesses only.

The sensor system may comprise a mirror configured to provide the image processing system or camera with a line of sight to the plurality of elements. At least a part of the support may be positioned between the decorative elements and the camera and/or between the decorative elements and the mirror. In particular, the base of the support may be positioned between the decorative elements and the camera and/or between the decorative elements and the mirror.

The system may comprise one or more light sources. The support may be positioned between a sensor system and a first light source. The system may comprise a second light source positioned on the same side of the support as the sensor system. In particular, the second light source may be below the support.

The decorative element retriever may be configured to retrieve the decorative element from the support at a side of the support opposite the sensor system. For example, the decorative element retriever may be configured to retrieve the decorative element from above the support, and the sensor system may be positioned beneath the support.

The decorative element retriever may be configured to invert the decorative element following retrieval from the element support. To this end, the decorative element retriever may be an element retriever arm that is pivotable about an axis to move the decorative element from the element support to a handover location, and to invert the decorative element.

The decorative element retriever may be configured to invert the decorative element from a presentation orientation to an application orientation, the application orientation corresponding to an orientation of the decorative element when the decorative element is applied to the workpiece.

The decorative element may be a chaton.

The invention also extends to apparatus for automatically applying a decorative element to a workpiece, the apparatus comprising the system described above for presenting a plurality of decorative elements for automatic application of the decorative elements to a workpiece, and an element applicator for applying the decorative elements to the workpiece.

The element applicator may be configured to retrieve a decorative element from the support and to apply the decorative element to the workpiece. Alternatively or additionally, the apparatus may comprise a decorative element retriever configured to retrieve a decorative element from the support and to pass the decorative element to the element applicator for application to the workpiece.

The invention extends further to a method of selecting a decorative element for automatic application of the decorative element to a workpiece. The method comprises: supporting a plurality of decorative elements on a support, the support providing a line of sight from a sensor to the decorative element; detecting a characteristic of the decorative elements using the sensor; and selectively retrieving a decorative element from the support in dependence on the decorative element characteristic.

The invention extends still further to a method of making an article, the article comprising a plurality of decorative elements at respective element locations. The method comprises: providing a workpiece defining the plurality of element locations; supporting a plurality of decorative elements on a support, the support providing a line of sight from a sensor to the decorative elements; detecting a characteristic of the decorative elements using the sensor; selectively retrieving a decorative element from the support in dependence on the decorative element characteristic; applying the retrieved decorative element to the workpiece at the element location.

From a further aspect, the invention resides in a system for dispensing adhesive for securing a decorative element to a workpiece, the system comprising: an adhesive applicator for applying adhesive to the workpiece; a first sensor system configured to detect a workpiece characteristic; and a controller configured to determine a desired adhesive amount in dependence on the workpiece characteristic, and to instruct the adhesive applicator to dispense the desired adhesive amount to the workpiece.

The workpiece characteristic may be a characteristic of a cavity of the workpiece. In this case, the adhesive applicator may be configured to apply adhesive to the cavity. The cavity may be a cavity configured to receive a decorative element. The characteristic of the cavity may comprise one or more of the following: a maximum diameter of the cavity; a roughness of an internal surface of the cavity; a depth of the cavity; and an angle of an internal surface of the cavity. The maximum diameter of the cavity may correspond to a diameter of the cavity at the widest point of the cavity.

The first sensor system may comprise a camera.

The processor may be configured to determine the desired adhesive amount in dependence on an adhesive characteristic, such as the viscosity of the adhesive. The system may comprise a test system, and the adhesive characteristic may be determined in dependence on a test conducted using the test system.

The system may comprise a second sensor system configured to detect a characteristic of a decorative element to be applied to the workpiece. The processor may be configured to determine the desired adhesive amount in dependence on the decorative element characteristic.

The second sensor system may be different to the first sensor system. The second sensor system may comprise a second sensor. The second sensor may comprise a camera.

The decorative element characteristic may comprise one or more of the following: a maximum diameter of the decorative element; and a roundness of the decorative element.

The maximum diameter of the decorative element may correspond to a diameter of the decorative element at the widest point of the decorative element. The widest point of the decorative element may be the widest point of the decorative element as viewed by the second sensor.

The second sensor system may be configured to detect the decorative element characteristic substantially simultaneously to the first sensor system detecting the workpiece characteristic.

The first sensor system may be further configured to conduct a quality control check on the region of the applied adhesive after both the adhesive and the decorative element have been applied.

The system may be configured to assess whether excess adhesive is present and/or to detect a location or orientation of the decorative element relative to the workpiece.

The controller may be configured to cause the first camera of the first sensor system to take a first image of the workpiece before adhesive is applied to detect the workpiece characteristic, and to take a second image of the workpiece after the adhesive and the decorative element have been applied, to conduct the quality control check.

When the adhesive applicator has dispensed the desired amount of adhesive to the workpiece and the decorative element has been applied to the adhesive, the first sensor system may be configured to detect excess adhesive.

In the event that the first sensor system detects excess adhesive, the processor may be configured to do one or more of the following: to mark the workpiece for re-work; to output an alert to an operator; to mark the workpiece to be scrapped.

The system may further comprise a decorative element applicator, configured to apply a decorative element to the adhesive. The processor may be configured to select a decorative element to apply to the adhesive in dependence on the workpiece characteristic.

The invention also extends to a method for dispensing adhesive for securing a decorative element to a workpiece. The method comprises: detecting a workpiece characteristic; determining a desired adhesive amount in dependence on the workpiece characteristic; dispensing the desired adhesive amount to the workpiece.

The invention extends further to a method of making a decorative article, the method comprising: providing a workpiece; detecting a workpiece characteristic; determining a desired adhesive amount in dependence on the workpiece characteristic; dispensing the desired adhesive amount to the workpiece; applying a decorative element to the dispensed adhesive to adhere the decorative element to the workpiece.

From yet another aspect, the invention resides in a system for alignment of a workpiece for automatic application of a decorative element to the workpiece, the workpiece having a primary reference feature common to all workpieces of that type. The system comprises a moveable support for supporting the workpiece; a sensor system configured to detect the primary reference feature; and a controller configured to: determine an offset between a detected primary reference feature location and/or orientation and a target location and/or orientation; and align the primary reference feature with the target location and/or orientation.

The primary reference feature may occur once for a respective workpiece.

The sensor system may comprise a sensor, which may be a camera. A distance between a sensor of the sensor system and the workpiece may be between 10 mm and 30 mm, optionally approximately 20 mm.

The primary reference feature may be selected from a group comprising: an arrangement of one or more cavities; a moulded feature on the workpiece; or a contour or profile of the workpiece.

The primary reference feature may be a predetermined arrangement of a plurality of cavities.

The controller may be configured to store or receive information relating to a base model of the workpiece, the base model including information relating to one or more secondary parameters of the base model, and a plurality of element locations on the base model. The sensor system may be configured to detect a secondary parameter relating to a selected area of the workpiece, and to transmit information relating to the detected secondary parameter to the controller. The controller may be configured to determine a deviation between the detected secondary parameter and a corresponding secondary parameter of the base model, and to calculate an updated model for the selected area of the workpiece based on the deviation, the updated model comprising updated element locations in the selected area of the workpiece.

The secondary parameter may be selected from the group comprising: a difference between a location of a first secondary reference feature in the selected area of the workpiece and a location of a second secondary reference feature in the selected area of the workpiece; a difference between an orientation of a first secondary reference feature in the selected area of the workpiece and an orientation of a second secondary reference feature in the selected area of the workpiece; and a statistical or mathematical parameter relating to a secondary reference feature in the selected area of the workpiece.

One of the secondary reference features may be defined by the primary reference feature.

The or each secondary reference feature may be selected from the group comprising the following features: an arrangement of one or more cavities; a moulded feature of the workpiece, or a contour or profile of the workpiece.

The sensor system may be configured to detect a further secondary parameter relating to a further selected area of the workpiece, and to transmit information relating to the detected further secondary parameter to the controller. The controller may be configured to determine a deviation between the further detected secondary parameter and the corresponding secondary parameter of a corresponding area of the base model, and to calculate an updated model for the further selected area of the workpiece based on the deviation, the updated model comprising updated element locations in the further selected area of the workpiece.

The system may comprise a decorative element applicator for applying the decorative element to the workpiece, and the controller may be configured to cause the applicator to apply a decorative element to the workpiece at an updated element location based on the updated model.

The invention also extends to a method of aligning a workpiece for automatic application of a decorative element to the workpiece, the workpiece having a primary reference feature common to all workpieces of that type. The method comprises: arranging the workpiece on a moveable support; detecting the primary reference feature on the workpiece; determining an offset between a detected primary reference feature location and/or orientation and a target location and/or orientation; and aligning the primary reference feature with the target location and/or orientation.

The step of locating the primary reference feature on the workpiece may comprise imaging the primary reference feature using a camera. The step of determining an offset between the location and/or orientation of the primary reference feature and a target location and/or orientation may comprise processing the image using a controller.

The method may comprise determining a plurality of element locations on the workpiece by: detecting a secondary parameter relating to a selected area of the workpiece; determining a deviation between the detected secondary parameter and a corresponding secondary parameter of a base model, the base model including information relating to a plurality of element locations on the base model; and calculating an updated model for the selected area of the workpiece based on the deviation, the updated model comprising updated element locations in the selected area of the workpiece.

The method may further comprise moving the moveable support to align an updated element location of the workpiece with an element applicator.

The method also extends to a method of making an article, the article comprising a plurality of decorative elements at respective element locations. The method comprises: aligning the workpiece according to the method describes above; and applying a decorative element to an element location on the workpiece.

In all of the methods or apparatus described above, the workpiece may be a decorative article, preferably an article of jewellery. The workpiece may be a decorative article comprising multiple interconnected parts. The interconnected parts may be movable relative to one another, for example as in links of a chain.

The decorative element may be a decorative element of glass, ceramic, glass ceramic, precious or semi-precious stone, resin, plastics material or metal, and may preferably be a jewellery element such as a ground faceted element.

Features of any one aspect or embodiment of the invention may be used, alone or in appropriate combination, with other aspects and embodiments as appropriate.

BRIEF DESCRIPTION OF THE DRAWINGS

One or more embodiments of the invention will now be described, by way of example only, with reference to the accompanying drawings, in which:

FIG. 22 shows a schematic side view of the carrier of FIG. 20 and the Type 1 holder of FIG. 3 or FIG. 6, the carrier and holder in a disengaged position;

FIG. 23 shows a schematic plan view of the carrier of FIG. 20 and the Type 1 holder of FIG. 3 or FIG. 6, the carrier and holder in a first partially engaged position;

FIG. 24 shows a schematic side view of the carrier of FIG. 20 and the Type 1 holder of FIG. 3 or FIG. 6, the carrier and holder in a second partially engaged position;

FIGS. 25*a* and 25*b* show a schematic side view and a schematic plan view, respectively, of the carrier of FIG. 20 and the Type 1 holder of FIG. 3 or FIG. 6, the carrier and holder in a third partially engaged position;

FIG. 26 shows a schematic side view of the carrier of FIG. 20 and the Type 1 holder of FIG. 3 or FIG. 6, the carrier and holder in an engaged position;

FIGS. 45*a* and 45*b* show a schematic side view and a schematic plan view, respectively, of the carrier of FIG. 20 and the Type 1 holder of FIG. 3 or FIG. 6, the carrier and holder in a second partially disengaged position, and the manipulator arm of FIG. 38 and holder 'docked';

FIG. 46 shows a schematic side view of the carrier of FIG. 20 and the Type 1 holder of FIG. 3 or FIG. 6, the carrier and holder in a disengaged position, and the manipulator arm of FIG. 38 and holder 'docked';

FIG. 47 shows a perspective view of the manipulator arm of FIG. 38 supporting a workpiece in the workpiece working region of the working volume of FIG. 1*a;*

DETAILED DESCRIPTION OF EMBODIMENTS OF THE INVENTION

A process and apparatus for applying a decorative element to a workpiece in accordance with an embodiment of the present invention will now be described with reference to the accompanying figures. In the following description, the workpiece is described as being a decorative article and, in particular, an article of jewellery, although it will be appreciated that the described process may be used in the application of decorative elements to any article comprising one or more decorative elements, such as a watch, a pen or a personal accessory, for example.

As has been described previously in relation to known processes, each workpiece is predominantly manufactured from metal, although it will be appreciated that any one of a number of suitable materials may be used. In addition to metal, the workpiece may comprise a mouldable material, which can facilitate the manufacture of a workpiece having complex and/or multi-coloured three-dimensional features. In the forgoing description, the mouldable material is exemplified as Epoxy clay, though it will be appreciated that any suitable mouldable material may be used.

The decorative elements that are applied to the workpiece can be any suitable decorative elements, for example, crystals, gemstones, beads, pearls, or other ornamental components. The decorative elements may be of any suitable shape, and may be made of any suitable material, such as glass, ceramic, glass-ceramic, plastic, or precious or semi-precious stones. In the forgoing example, the decorative elements are faceted elements made of crystal glass.

Figure 1A:
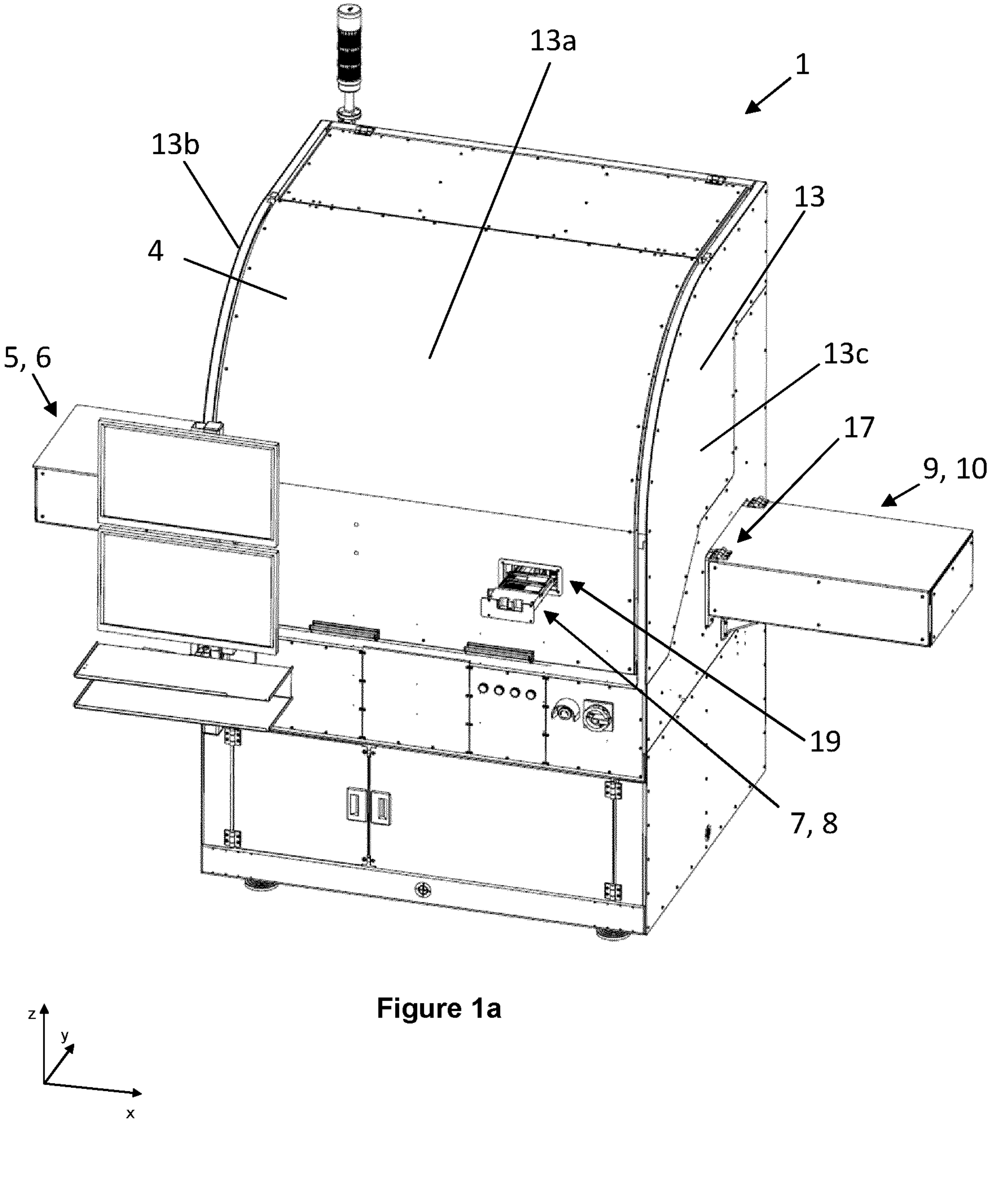
FIG. 1*a* shows a schematic perspective view of a machine for applying a decorative element to a workpiece in accordance with an embodiment of the invention, the machine having a working volume, a workpiece insertion location, an element insertion location and a workpiece removal location.
Figure 1B:
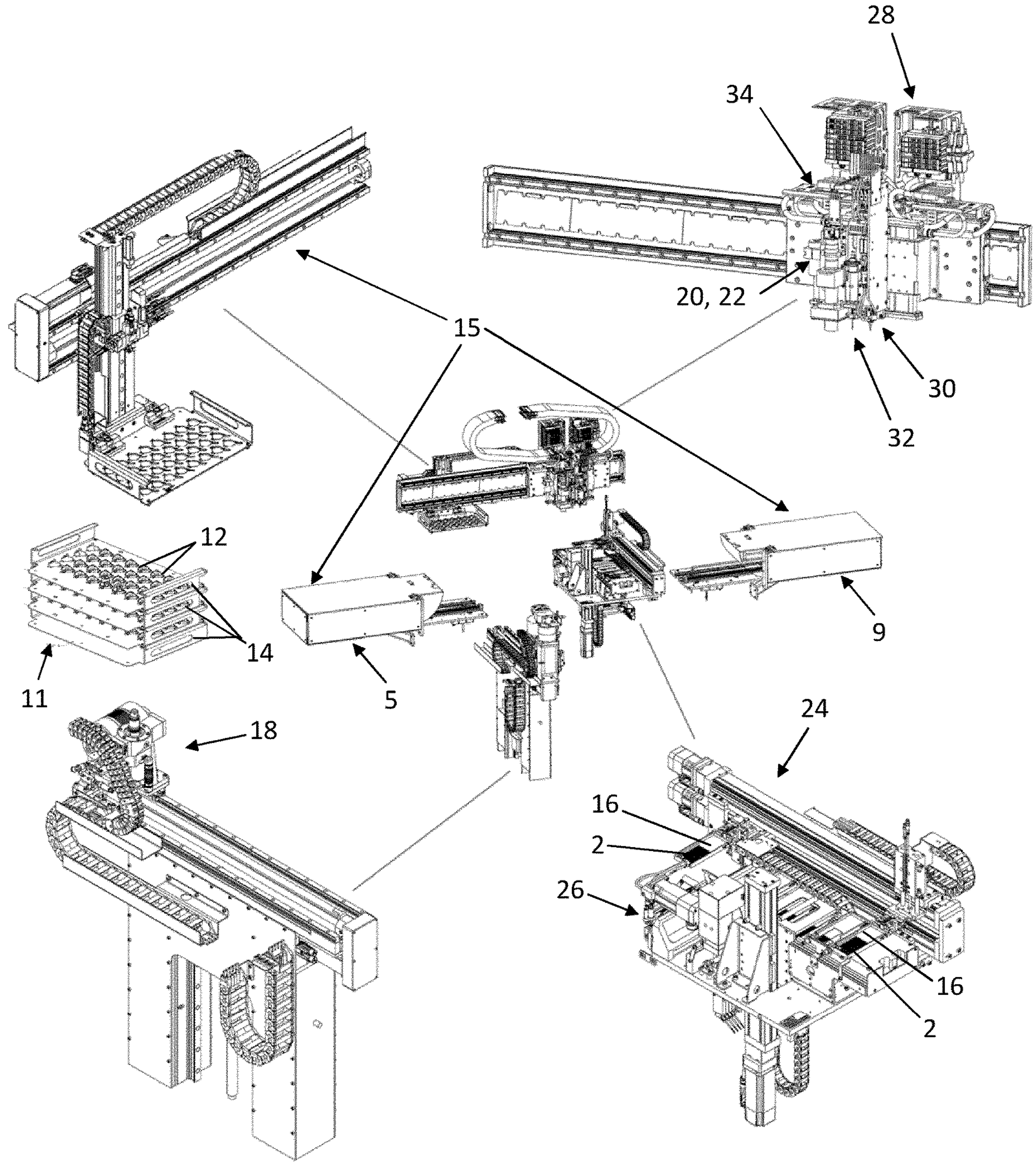
FIG. 1*b* shows an exploded perspective view of the working volume of FIG. 1*a*, the working volume comprising: a workpiece carrier system; a workpiece transporter system; a workpiece manipulation system; a workpiece locating system, an element location system, an element presentation system and an element application system.

Referring to FIGS. 1*a* and 1*b*, apparatus in the form of a machine 1 for applying a decorative element 2 to a workpiece 3, or decorative article, is shown. A brief overview of the machine 1 and its components will now be provided.

Brief Overview of the Machine

The machine 1 comprises an enclosed working volume 4, in which the decorative elements (not visible in FIGS. 1*a* and 1 *b*) are applied to the workpiece. As shown in FIG. 1*a*, two insertion locations in the form of drawers protrude from the working volume 4: a workpiece insertion location 5 in the form of a workpiece input drawer 6, into which one or more workpieces can be placed at a time, and an element insertion location 7, which takes the form of an element input drawer 8 for the insertion of decorative elements into the machine 1. A workpiece removal location 9, in the form of a workpiece output drawer 10, also protrudes from the working volume 4.

In use, workpieces are fed into the workpiece insertion location 5 and decorative elements 2 are fed into the element insertion location 7. The machine 1 automatically applies the decorative elements 2 to the workpieces, and the workpieces, now with decorative elements 2 applied, are fed out of the machine to the workpiece removal location 9. The only manual input required from a user is therefore to feed in and remove batches of workpieces and decorative elements 2.

The machine 1 achieves a fast, highly accurate, and fully-automated application of decorative elements 2 to workpieces by incorporating multiple complex and synergistic systems into a single machine. A brief overview of the different systems will now be provided with reference to FIG. 1*b*, which shows the structure of the machine 1 inside the working volume 4.

Before being arranged in the workpiece insertion location 5, multiple workpieces (not shown) are arranged on a workpiece carrier system 11. The carrier system 11 comprises a plurality of workpiece holders 12 and a plurality of carriers 14. Each holder 12 is configured to hold one or more workpieces, and each carrier 14 is configured to carry one or more holders 12. In this way, a single carrier 14 can carry multiple workpieces, which may be workpieces of the same or different types.

The machine 1 comprises a workpiece transporter system 15 that is configured to transport the carrier 14 and associated workpieces from the workpiece insertion location 5, through the working volume 4 of the machine 1 for the application process, and out of the working volume 4 into the workpiece removal location 9.

At the element insertion location 7, the elements 2 are arranged on an element support 16 inside the element input drawer 8 (see FIG. 1*a*): this can be achieved either by 'pouring' the elements 2 onto an element support 16 already arranged in the element input drawer 8, or by placing an element support 16 already supporting elements 2 into the element input drawer 8. The machine 1 is configured to transport the element support 16 and associated elements 2 from the element insertion location 7 into the working volume 4.

To ready a workpiece 3 for application, the machine 1 comprises a workpiece manipulation system 18 that is configured to remove a single workpiece holder 12 and associated workpiece from the workpiece carrier system 11, and transport it to a workpiece working region within the machine 1.

The machine 1 also comprises a workpiece locating system 20 that is configured to identify a reference feature on the workpiece, and to locate and orient the reference feature precisely at a target location and orientation, so as to ensure that application process takes place with the workpiece correctly located and oriented.

The machine 1 further comprises an element location system 22 that is configured to determine the desired element locations on the workpiece, based on characteristics of two reference features. With the workpiece correctly located and oriented, and the desired element locations determined, the machine 1 has a high degree of certainty of the position of every element location on the workpiece, and the workpiece is ready for application.

To ready the elements 2 for application, the machine comprises an element presentation system 24 (of which the element support 16 forms a part) that is configured to sort the elements 2 into predefined element presentation locations on the element support 16, and to present the elements 2 for application. The element presentation system 24 comprises an element sensor system 26 configured to monitor the elements 2 when presented on the element support 16 (for example, to monitor element presence and orientation at an element location, and to monitor quality factors such as size, shape, and colour) and to select or de-select elements 2 for application based on this element monitoring.

The machine 1 is also provided with an element application system 28 for applying the readied elements 2 to the readied workpiece. The element application system 28 includes an element applicator 30 for transferring decorative elements 2 to the readied workpiece and depositing them precisely at the pre-determined element locations.

If the elements 2 are Epoxy clay set, the element applicator 30 may be configured to apply the element 2 directly to the Epoxy clay at the pre-determined element location.

However, for cases where the elements 2 are cavity set, the element application system 28 includes an adhesive applicator 32, configured to dispense adhesive into each cavity before the corresponding element 2 is deposited. The application system 28 also includes an adhesive regulation system 34 that is configured to assess a characteristic of the element location, and optionally in combination with a characteristic of the element 2 as determined by the element sensor system 26, to determine an optimal quantity of adhesive to be applied by the adhesive applicator 32. The optimal quantity of adhesive is determined as, for example, a quantity that allows a sufficiently high bond strength between the element 2 and the workpiece, without having excess adhesive that overspills the cavity to the detriment of the aesthetic of the article.

In the embodiment now described the element application system 28 further comprises an element retriever (not visible in FIG. 1*b*, but visible in FIG. 64*a*), in the form of a decorative element retriever arm, configured to retrieve an element 2 from the element support 16 and transfer it to the element applicator 30: however, the element retriever 36 may also be omitted, and the element applicator 30 may be configured to retrieve an element 2 directly from the element support 16, such that the element applicator 30 also acts as an element retriever 36.

The adhesive regulation system 34 may also act as a quality control system that is used for quality control purposes. For example, the quality control system may be configured to monitor the element locations after the respective elements 2 have been deposited in place. In this way, the system can check whether the element 2 has been successfully and properly applied, or whether there is excess adhesive present, and can alert a user to take action if appropriate.

As will be apparent in the following description, the various systems of the machine 1 described above may overlap with one another to some extent. For example, a particular machine component may be employed by several systems within the machine 1.

The various systems of the machine 1 described above are controlled by a control arrangement (not shown in FIGS. 1*a* and 1*b*) comprising one or more controllers. For simplicity, a single machine controller is referred to in the course of the forgoing description, which carries out the control functions of all the systems. However, it will be appreciated that in practice, the control arrangement may comprise multiple controllers carrying out different functions. For example, each of the systems described may have its own controller to carry out control functions only for that system. Embodiments are also envisaged in which each system has a plurality of controllers for carrying out a sub-set of control functions for that system. A single controller may also carry out control functions for multiple systems, or multiple parts of multiple systems.

The controller may comprise an electronic processor having an electrical input configured to receive an input signal, and an electrical output configured to output an output signal, and an electronic memory device electrically coupled to the electronic processor and having a memory stored therein. The electronic processor may be configured to access the memory device and execute the instructions stored therein so as to process the input signal and output and appropriate output signal in dependence on the input signal.

The systems and components of the machine 1 will now be described in more detail, starting with the workpiece carrier system 11.

Workpiece Carrier System

Figure 2:
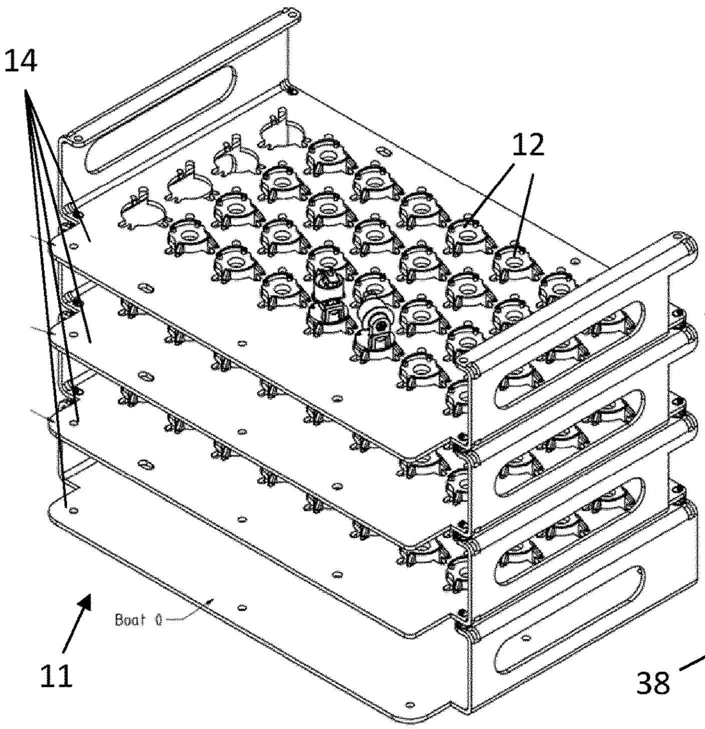
FIG. 2 shows a perspective view of the workpiece carrier system of FIG. 1*b;*

Referring to FIG. 2, the workpiece carrier system 11 comprises a plurality of workpiece holders 12, each configured to hold one or more workpieces, and one or more carriers 14 configured to carry one or more holders 12. In this example, the system 11 comprises a plurality of carriers 14, which can be stacked vertically.

A plurality of different carrier types and holder types can be provided, to allow a modular system that can accommodate many different article types in different combinations. The references 12*a*, 12*b* and 12*c* will be used to respectively refer to first, second, and third example types of holders 12. Similarly, the references 3*a*, 3*b*, 3*c*, 3*d* and 3*e* will be used to respectively refer to first, second, third, fourth and fifth example workpieces 3.

Figure 3:
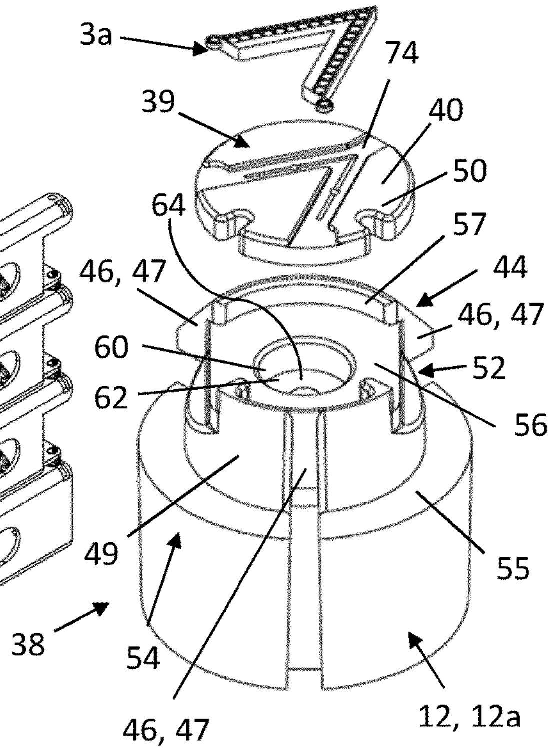
FIG. 3 shows a first perspective view of a first variant of a Type 1 holder of the workpiece carrier system of FIG. 1*b*, with a workpiece supported by the holder.
Figure 4:
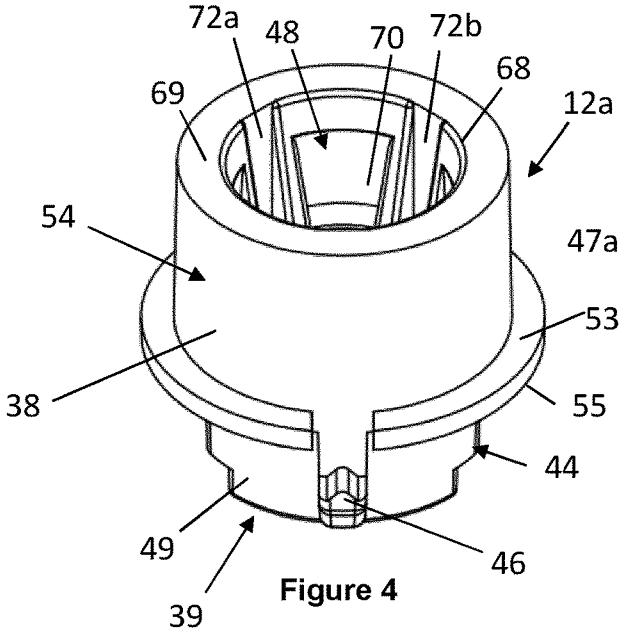
FIG. 4 shows a second perspective view of the Type 1 holder of FIG. 3.

Turning to FIGS. 3 and 4, and considering first the holders 12, each holder 12 comprises a main body 38 that supports a workpiece-holding region 39 configured to hold the workpiece 3*a* and present it for application of decorative elements 2, and a carrier-engaging region 44 comprising carrier-engaging features 46 configured to engage with the carrier 14 to mount the holder 12 to the carrier 14. The holders 12 also support a connecting feature 48 (see FIG. 4) that is configured to engage with a corresponding connecting feature on the machine 1 to allow manipulation of the holder 12, as will be described in detail later.

In this example, the workpieces 3*a* are articles of jewellery or other decorative objects. Since articles of jewellery may take many different forms, having different shapes and sizes, many different holders having different constructions of the workpiece-holding region 39 are required to provide an appropriate arrangement for holding and presenting the different workpieces. Different types of holders having different workpiece-holding regions will now be described.

Holder Type 1

Type 1 holders 12*a* are suitable for holding workpieces in which all element locations face substantially the same direction, for example substantially flat pieces such as flat pendants.

The holder 12*a* of FIGS. 3 and 4 is a Type 1 holder. Referring to FIG. 3, in holders of this type, the workpiece-holding region 39 is provided on a removable piece 40 that can be attached to and removed from the main body 38. The workpiece-holding region 39 comprises a substantially horizontal workpiece-holding surface 50 that is moulded specifically to the shape of the workpiece 3*a* so as to hold the workpiece 3*a* in place.

The main body 38 comprises first and second sections or parts, each of generally cylindrical formation. The first or upper section 52 supports the removable piece 40, and hence the workpiece-holding region 39 and also defines the carrier-engaging region 44. The second or lower section 54 defines the connecting feature 48.

The upper section 52 comprises an upward-facing surface 56 that supports the workpiece-holding region 39. The upward-facing surface 56 is substantially flat except for two features that help the main body 38 to support the removable piece 40. Firstly, the upward-facing surface 56 is provided with a protrusion 57 that acts as an engagement feature to engage with a corresponding engagement feature (not shown) on the removable piece 40. Secondly, the upward-facing surface 56 is provided with a recess 60 defining a chamber 62 that opens onto the upward-facing surface 56. A bore 64 extends from the base of the chamber 62 through the main body 38. In use, the removable piece 40 closes off the chamber 62, and the bore 64 can be connected to a vacuum system (not shown) to evacuate air from the bore 64 and the chamber 62, thereby fixing the removable piece to the holder 12*a*.

Figure 5:
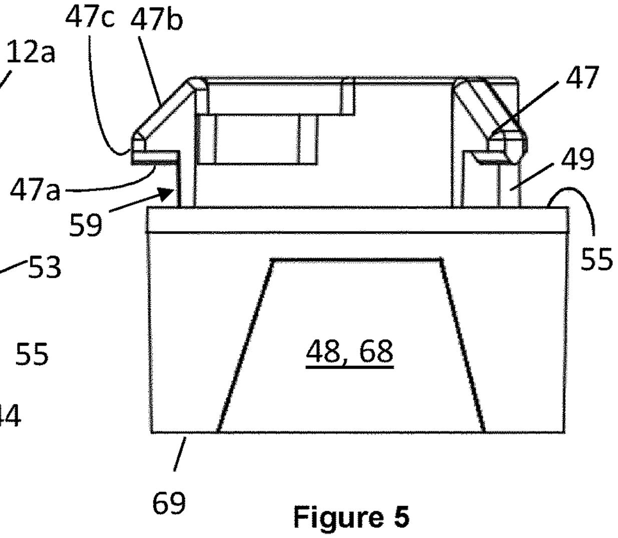
FIG. 5 shows a cross-sectional view of the Type 1 holder of FIG. 3.

The upper section 52 also comprises three protrusions 47 that protrude outwardly from an outer annular surface 49 at a base of the upper section 52. Together, these protrusions 47 define the carrier-engaging features 46. The protrusions 47 are spaced at regular angular spacings around the annular surface 49: in this example at spacings of 120 degrees. Referring to FIG. 5, each protrusion 47 has a substantially flat downward-facing surface 47*a*, and a sloping upper surface that slopes downwardly 47*b*. The flat downward-facing surface and the sloping upper surface are joined by a vertical outward-facing surface 47*c*.

In the embodiment of FIGS. 3 and 5, the lower section 54 is of greater diameter than the upper section 52. In this way, where the upper and lower sections meet, a shoulder 55 is defined where the lower section 54 extends beyond the upper section 52. In other embodiments, such as the embodiment of FIG. 4, the upper and lower sections 52, 54 may be of the same diameter, and a collar 53 of increased diameter may be defined around an upper part of the lower section 54, such that the shoulder 55 is defined where the collar 53 meets the upper section 52.

The protrusions 47 of the upper section 52 extend outwardly as far as the outer surface of the lower section 54. Downwardly, the protrusions 47 of the upper section 52 do not extend all the way down the lower section 54, so that a spacing 59 is defined between the protrusions 47 and the shoulder 55.

Referring to FIGS. 4 and 5, the connecting feature 48 is defined on an underside of the lower section 54. In this example, the connecting feature 48 is a female formation and comprises a recess 68 formed in the base 69 of the main body 38. The recess 68 is substantially conical or frustoconical, and is of the same dimensions as a corresponding conical or frustoconical protrusion that defines a corresponding connecting feature on the machine 1, as will be later described. The connecting feature 48 also comprises locking features 70 defined by locking recesses 72 in the form of a pair of channels 72*a*, 72*b* that run adjacent to the recess 68, such that an open face of each channel 72*a*, 72*b* opens into the recess 68. In use, these channels 72*a*, 72*b* accommodate locking features in the form of protruding lugs provided on the corresponding connecting feature on the machine 1.

Turning now to the removable piece 40 that defines the workpiece-holding surface 50, different removable pieces may be appropriate for high-volume or lower-volume workpieces.

For high-volume workpieces, as shown in FIG. 3, the removable piece 40 may be specially produced to have a rigid workpiece-holding surface 50 having contoured recesses 74 that correspond to the contours of the workpiece 3*a*, such that the workpiece 3*a* fits securely on the surface 50. In this case the removable piece 40 may be a removable disc that is made, for example, from metal, though any suitable shape and material may be used.

On a base surface (not shown) of the removable piece 40 opposite the workpiece-holding surface 50, the removable piece 40 comprises engagement features (not shown) in the form of recesses that are configured to engage with the corresponding engagement features 58 on the main body 38.

One or more bores extend through the removable piece 40, between the base surface and the workpiece-holding surface 50. At the workpiece-holding surface 50, the contoured recesses 74 open into a shallow chamber (not shown). The chamber is open at its top surface, and is closed off by the workpiece 3*a* when the workpiece 3*a* is arranged in the removable piece 40.

When the removable piece 40 is arranged on the main body 38, the bores in the removable piece 40 align with the chamber 62 in the main body 38. When the bore 64 in the main body 38 communicates with the vacuum system in the machine 1, air is also removed from the bore and chamber in the removable piece 40, so that the workpiece 3*a* is held in place on the workpiece-holding surface 50 by the vacuum created in the chamber.

Figure 6:
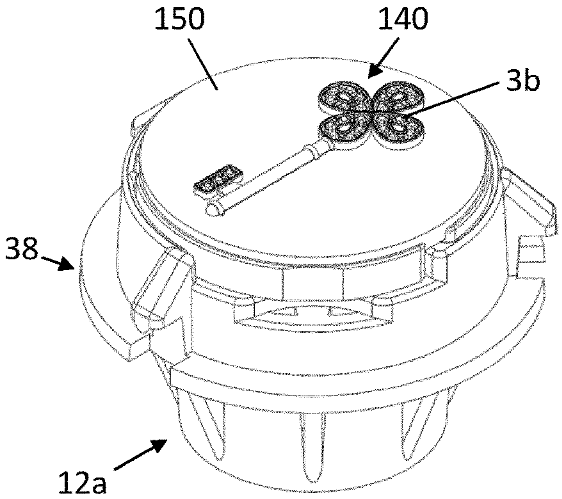
FIG. 6 shows a first perspective view of a second variant of a Type 1 holder of the workpiece carrier system of FIG. 1*b*, with a workpiece supported by the holder.

For lower volume pieces, or for pieces for which geometric variation can be significant from piece to piece, it may not be economical to specially-produce a removable piece 40. In this case, a generic removable piece 140 is provided, illustrated in FIGS. 6 and 7, having a mouldable workpiece holding surface 150 that can be moulded to match the contours of any type of workpiece.

Figure 7:
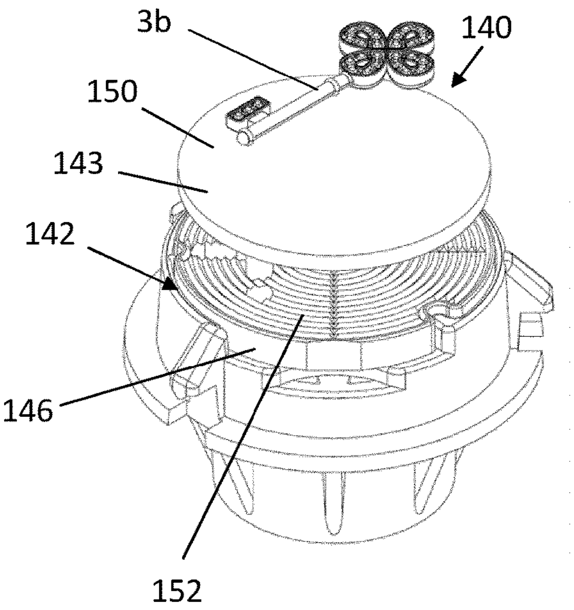
FIG. 7 shows an exploded perspective view of a removable piece of the Type 1 holder of FIG. 6.

In this case, referring to FIG. 7, the removable piece 140 is provided as a tray 142 that is filled with a mouldable material 143. The tray 142 comprises a base (not visible) and a side wall 146 surrounding the base, which together define an internal volume. An underside of the tray 142 is provided with engagement features 148 that are configured to engage with the corresponding engagement features 58 on the main body 38.

The base is provided with one or more protrusions that protrude into the internal volume of the tray 142: in this case the protrusions take the form of concentric ridges 152. The ridges 152 are of the same height, and in this way act to support the workpiece 3*b* at a specific, pre-determined height above the base 144.

The internal volume of the tray 142 is filled with a mouldable material 143 such as a thermoplastic material. In this example, the mouldable material 143 is initially solid and unmouldable at room temperature, but becomes mouldable when heated above a threshold temperature, in this case 100° C. The mouldable material 143 initially has a height that is slightly greater than the height of the ridges 152, such that it protrudes above them.

To set the workpiece 3*b* in the removable piece 140, the workpiece 3*b* is placed on top of the mouldable material 143 so that it overlies the ridges 152. The mouldable material 143 is heated so that it becomes mouldable, and under the action of gravity, the workpiece 3*b* sinks down into the mouldable material 143. As it sinks, the mouldable material 143 moulds flows around the workpiece 3*b* and moulds to its contours. The workpiece 3*b* continues to sink until it reaches the ridges 152 within the internal volume, at which point movement is arrested, and the workpiece 3*b* is fixed at the correct height. The mouldable material 143 is allowed to set, fixing the workpiece 3*b* in place.

The tray 142 may then be fixed to the main body 38, using the engagement features and vacuum system mentioned above.

Holders of this type are therefore able to accommodate a variety of different workpieces of different shapes and sizes, using a single main body design with interchangeable pieces that define an appropriate work-piece holding surface.

Holder Type 2

Figure 8:
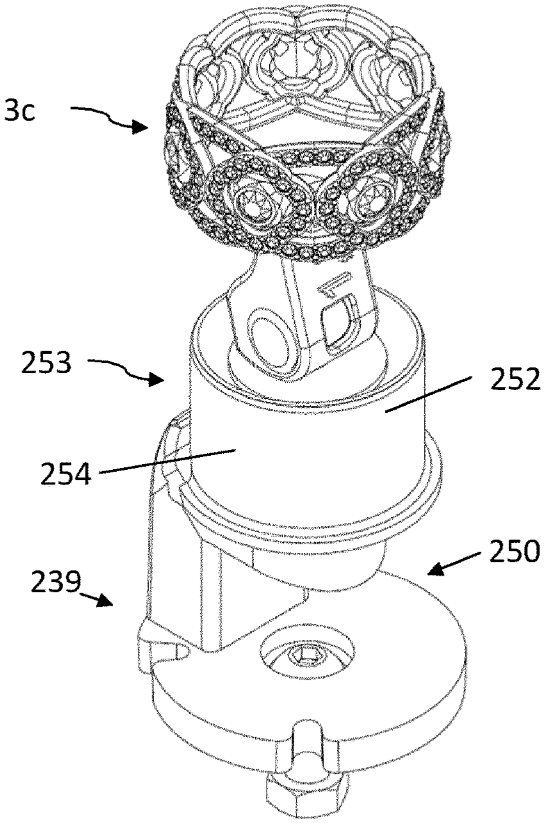
FIG. 8 shows a perspective view of a Type 2 holder of the workpiece carrier system of FIG. 1*b* ready to receive a workpiece in the form of a ring, the Type 2 holder comprising a clamping arrangement having a clamping piece and a compression arrangement.
Figure 9:
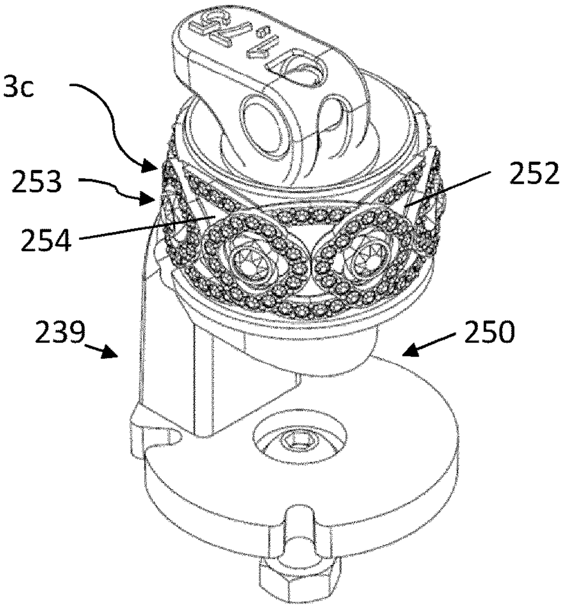
FIG. 9 shows a perspective view the holder of FIG. 8 with the ring in place on the holder.

Type 2 holders are suitable for holding small rigid annular workpieces, such as rings. Holders of this type comprise a main body that is identical to the main body 38 of a Type 1 holder 12*a*. In this case, the main body supports a clamping arrangement 250, shown in FIGS. 8 and 9 that is configured to hold the annular workpiece 3*c*.

The clamping arrangement 250 includes a clamping piece 252 having an outward-facing annular clamping surface 254, which in use lies in contact with the internal surface of the annular workpiece 3*c*. The clamping surface 254 is expandable (i.e. the diameter of the annulus can be increased) so as to be capable of expanding against the internal surface of the ring 3*c*, to clamp the surface 254 against the ring 3*c*, thereby holding the ring 3*c* securely in place.

Figure 10:
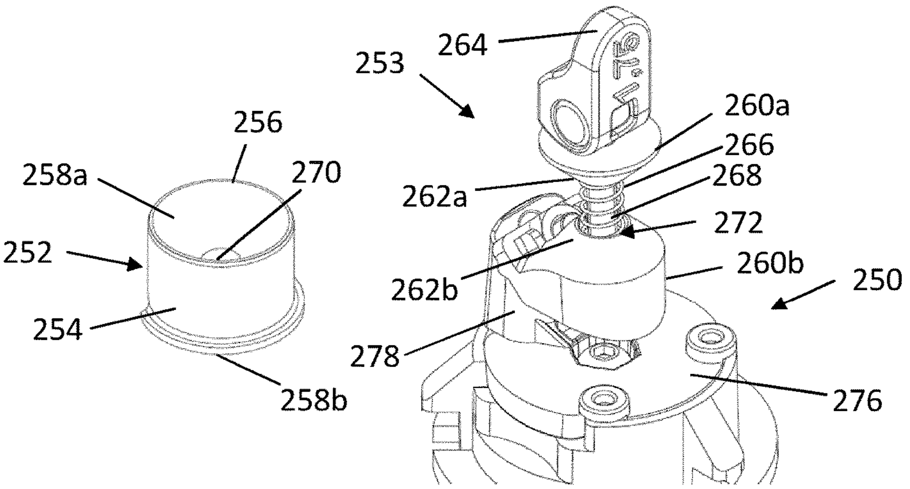
FIG. 10 shows an exploded perspective view of the clamping arrangement of FIG. 8.

More specifically, as best seen in FIG. 10 which shows the clamping piece 252 separated from the rest of the clamping arrangement 250, the clamping piece 252 is a substantially cylindrical body 256 having frustoconical recesses 258*a*, 258*b* at the top and bottom. The body 256 is made of a deformable material having a positive Poisson ratio, meaning that compression in a compression direction will cause expansion in the directions orthogonal to the compression direction.

The clamping piece 252 is held in a compression arrangement 253 that can selectively compress the clamping piece 252 in a compression direction. The clamping piece 252 is removable from the compression arrangement 253, and clamping pieces of different sizes may be provided having recesses of substantially the same size and shape, so that rings of different diameters can be easily accommodated on different clamping pieces within the same compression arrangement 253.

Referring still to FIG. 10, the compression arrangement 253 comprises two compression pieces 260*a*, 260*b* having corresponding frustoconical formations 262*a*, 262*b* that sit inside the frustoconical recesses 258*a*, 258*b* of the clamping piece 252, such that the clamping piece 252 is sandwiched between the compression pieces 260*a*, 260*b*. The compression pieces 260*a*, 260*b* are movable together and apart by means of a clamping lever 264.

To permit this movement, the compression pieces 260 are joined by a compression spring 266 and a compression rod 268. Both the compression rod 268 and compression spring 266 extend through a central bore in the clamping piece 252, and the compression rod 268 extends through the centre of the spring 266.

One of the compression pieces 260*a*, 260*b* is a fixed compression piece 260*a* that is fixedly attached to both the compression rod 268 and the compression spring 266. The other piece is a moveable compression piece 260*b* that is fixedly attached to the compression spring 266, but comprises a central aperture 272 through which the compression rod 268 can freely slide.

The clamping lever 264 is arranged such that, upon actuation, the lever 264 pushes the moveable compression piece 260*a* so that it slides over the compression rod 268, towards the fixed compression piece 260*b*, thereby moving the compression pieces 260*a*, 260*b* together. This movement compresses the clamping piece 252 between the compression pieces 260*a*, 260*b*.

Figure 11:
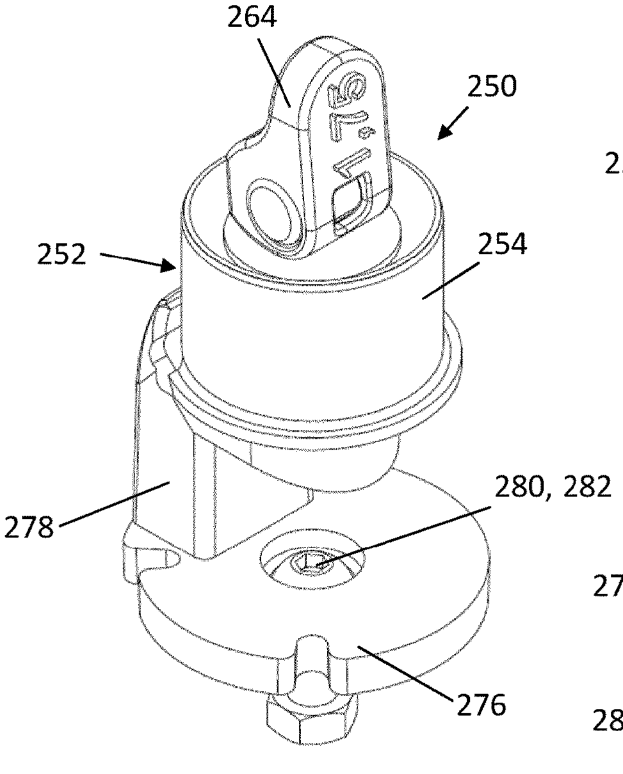
FIG. 11 shows a perspective view of the clamping arrangement of FIG. 8, with a clamping lever of the compression arrangement in a de-actuated position.
Figure 12:
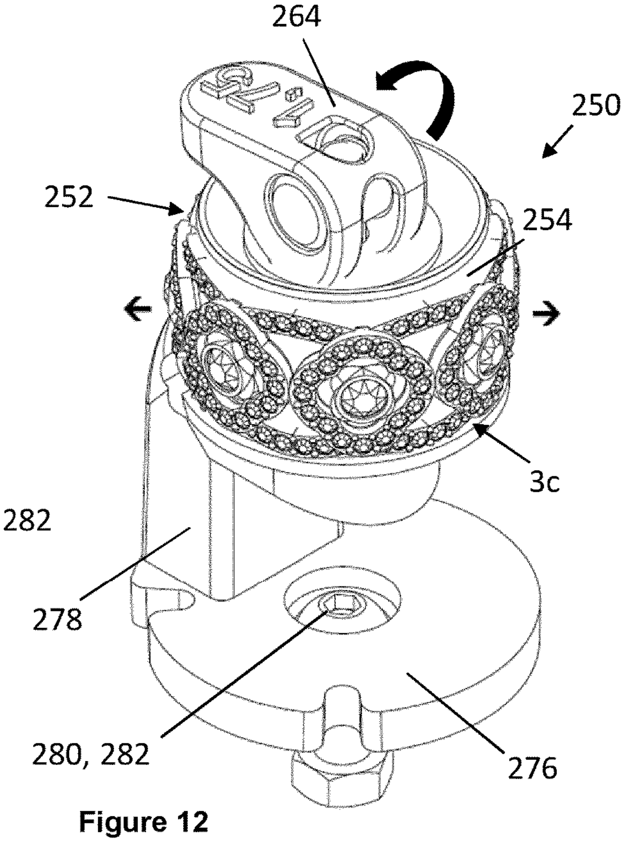
FIG. 12 shows a perspective view of the clamping arrangement of FIG. 8, with a clamping lever of the compression arrangement in an actuated position, to clamp the ring.

As shown in FIGS. 11 and 12, which illustrate the clamping arrangement 250 with the lever 264 actuated and de-actuated, because of the positive Poisson ratio of the clamping piece 252, the compression causes the clamping piece 252 to expand radially, such that the diameter of the annular clamping surface 254 increases. When a rigid annular workpiece 3*c*, such as the ring 3*c* shown in FIGS. 11 and 12, is arranged over the clamping surface 254, this increase in the diameter of the clamping surface 254 causes the clamping surface 254 to clamp against the inner surface of the ring 3*c*.

To remove the ring 3*c*, a user can simply de-actuate the lever 264, upon which the compression spring 266 will force the compression pieces 260 apart, thereby removing the compressive force from the clamping piece 252 and allowing the clamping surface 254 to retract, releasing the workpiece 3*c*.

Referring back to FIG. 10, the clamping arrangement 250 is connected to the main body 38 of the holder 12*b* via a connection piece 274, which comprises a base plate 276 and a connection post 278.

Referring to FIGS. 11 and 12, the base plate 276 comprises engagement features 280 that engage with corresponding engagement features 58 on the main body 38, so as to mount the connection piece 274 to the main body 38. In this case, the base plate 276 is provided with a bolt 282 that can engage with a threaded bore (not shown) in the holder 12*b*.

Figure 13:
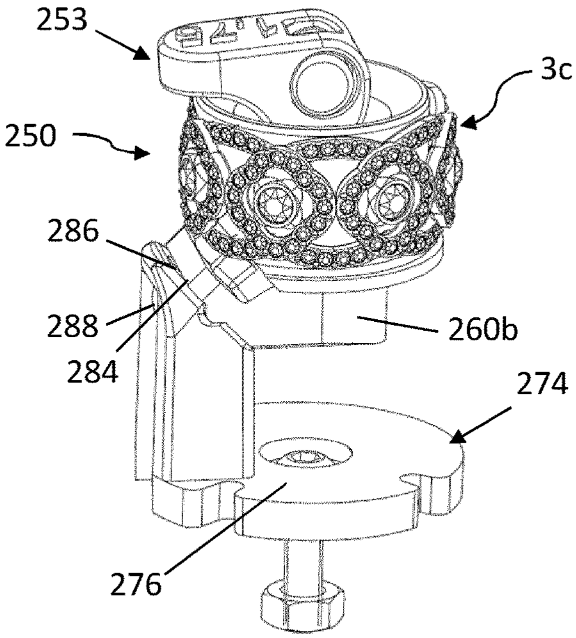
FIG. 13 shows a perspective view of the clamping arrangement of FIG. 8 in a first orientation.

Referring to FIG. 13, the connection post 278 protrudes upwardly from the base plate 276. The connection post 278 comprises a contact surface 284 that in use lies against a corresponding contact surface 286 on the clamping arrangement 250. The contact surface 284 is arranged at an acute angle to the base plate 276: in this case, the contact surface 284 is defined by an upper surface of the connection post 278 and lies at a 45 degree angle to the base plate 276.

The connection post 278 also comprises an engagement means 288 that is configured to engage with a corresponding engagement means (not visible) on the clamping arrangement 250 to fix the clamping arrangement 250 in place. In this example, the engagement means 288 is a bolt that protrudes from the contact surface 284 of the connection post 278.

The lower or fixed compression piece 260*b* defines the contact surface 286 of the clamping arrangement 250. The contact surface 286 of the fixed compression piece 260*b* lies at an acute angle to the compression direction defined by the compression arrangement 253, and in this example lies at a 45 degree angle to the compression direction.

In this example, the engagement means on the clamping arrangement 250 comprises an aperture at the contact surface 286 of the fixed compression piece 260*b* through which the bolt 288 of the connection post 278 can extend. By inserting the bolt 288 into the aperture, the contact surfaces 284, 286 can be brought together into contact with one another. A nut can be tightened or loosened around the bolt 288 to secure or release the compression arrangement 253 to the connection post 278.

Figure 14:
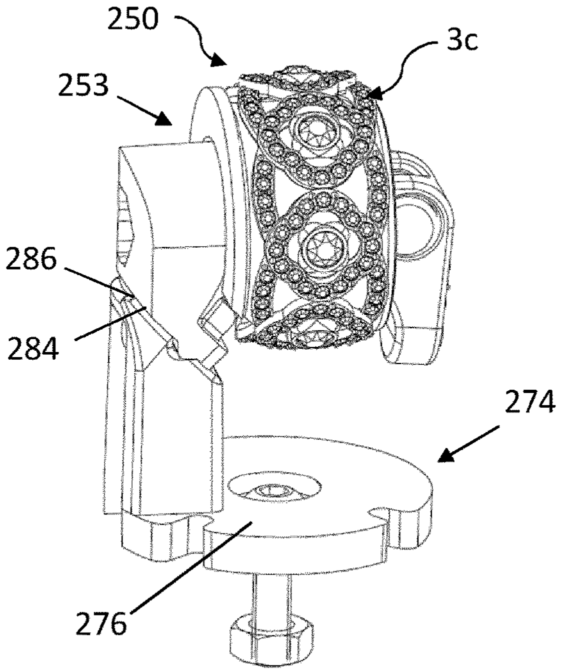
FIG. 14 shows a perspective view of the clamping arrangement of FIG. 8 in a second orientation.

The bolt 288 and aperture arrangement allows the contact surface 286 of the compression arrangement 253 to rotate against the contact surface 284 of the connection post 278 if the nut 292 is slightly loosened. As illustrated in FIGS. 13 and 14, because the contact surfaces 284, 286 are at 45 degrees to the base plate 276, rotating the compression arrangement 253 in this way causes the compression arrangement 253, and hence the entire clamping arrangement 250, to pivot between a first configuration shown in FIG. 13 in which the compression direction and hence the central axis of the annular workpiece 240 is vertical, and a second configuration shown in FIG. 14 in which the compression direction and hence the central axis of the annular workpiece 240 is horizontal. This allows the clamping arrangement 250 to switch quickly and easily between two configurations, according to the arrangement that is most appropriate for the workpiece.

For use, the clamping arrangement 250 is connected to the base plate 276 of the connection piece 274, and the base plate 276 is mounted to the main body 38 of the holder 12*b*, using the engagement features and vacuum system already described above.

Holder Type 3

Figure 15:
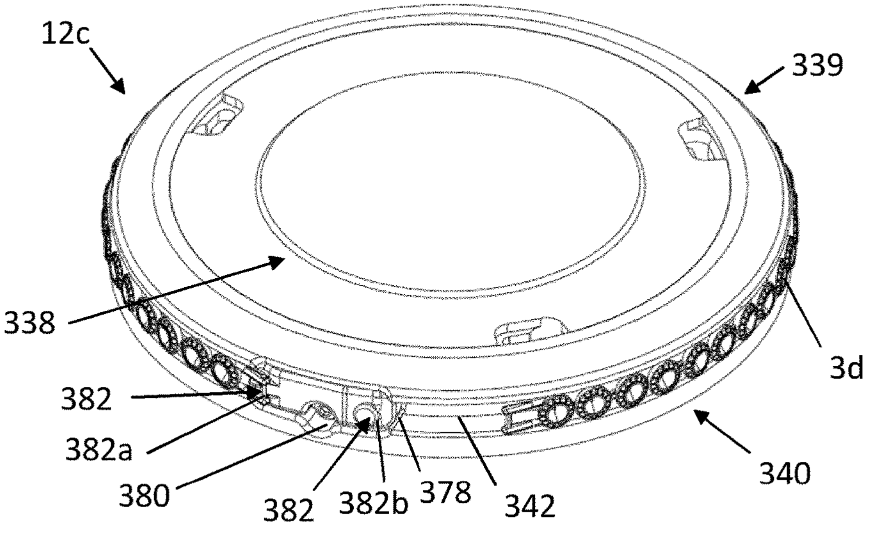
FIG. 15 shows a perspective view of a first variant of a Type 3 holder of the workpiece carrier system of FIG. 1*b;*
Figure 16A:
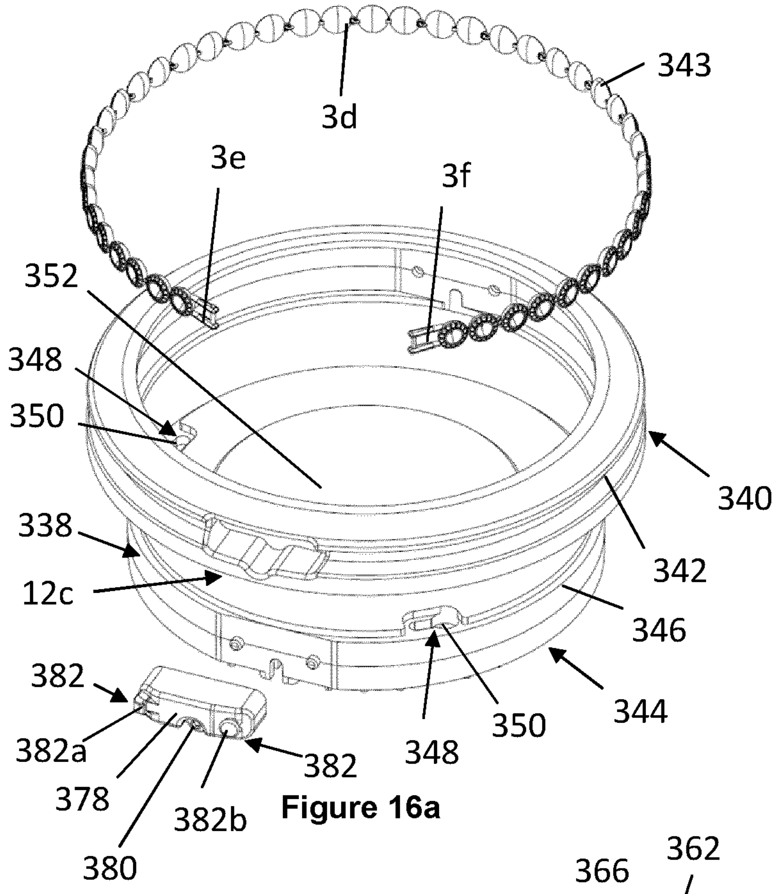
FIG. 16*a* shows an exploded perspective view of the Type 3 holder of FIG. 15.
Figure 16B:
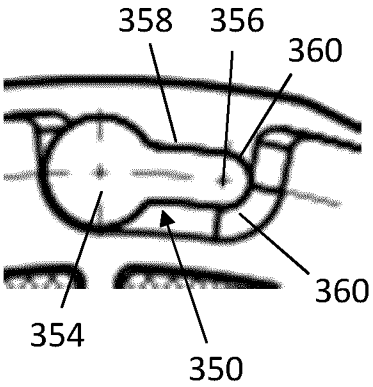
FIG. 16*b* shows a schematic plan view of a carrier-engaging feature of the Type 3 holder of FIG. 15.

Type 3 holders 12*c* are suitable for holding larger annular workpieces 3*d*, such as necklaces or bracelets. Referring to FIGS. 15, 16*a* and 16*b*, in holders 12*c* of this type, the workpiece-holding region 339 is defined on a removable annular piece 340. The removable annular piece 340 defines an outward-facing annular contact surface 342, which in use lies in contact with the internal surface 343 of the annular workpiece 3*d* (see FIG. 16*a*).

Holders 12*c* of this type are configured such that the removable annular piece 340 wraps around the main body 338 of the holder 12*c*. The main body 338 of a holder 12*c* of this type therefore differs from the main body 38 of the holders 12*a*, 12*b* described above.

In the embodiment of FIGS. 15 and 16*a*, the main body 338 of this holder 12*c* is a simple disc-shaped piece 344 having an outward-facing annular surface 346.

The carrier-engaging features 348 are defined by apertures 350 in the disc 344. FIG. 16*b* shows one of the apertures 350 in close-up plan view, and reveals that the aperture 350 is elongate along a direction substantially parallel to the circumference of the disc 344. At an end region of the aperture 350 that is relatively anti-clockwise when viewed from an upper side 352 of the disc 344, the aperture 350 has a circular portion 354 with a relatively large diameter, and at an end region of the aperture 350 that is relatively clockwise, the aperture 350 has a circular portion 356 with a relatively small diameter. The geometric centres of the circles 354, 356 that define the large and small diameter portions 354, 356 are separated by an angular offset, and a neck portion 358 of the aperture 350 joins the large and small diameter portions 354, 356 together.

In the small diameter circular portion 356, the aperture 350 is surrounded by abutment surfaces 360 at both the upper and lower surfaces of the aperture 350. The small diameter circular portion 356 may be provided by a separate insert or an integral protrusion that protrudes into the elongate aperture 350 to reduce its dimensions. In this case, the abutment surfaces 360 are provided on the protrusion or insert.

In use, protrusions on the carrier 14 in the form of posts will extend through the apertures 350 to mount the holder 12*c* on the carrier 14, as will be explained in more detail later.

Figure 17:
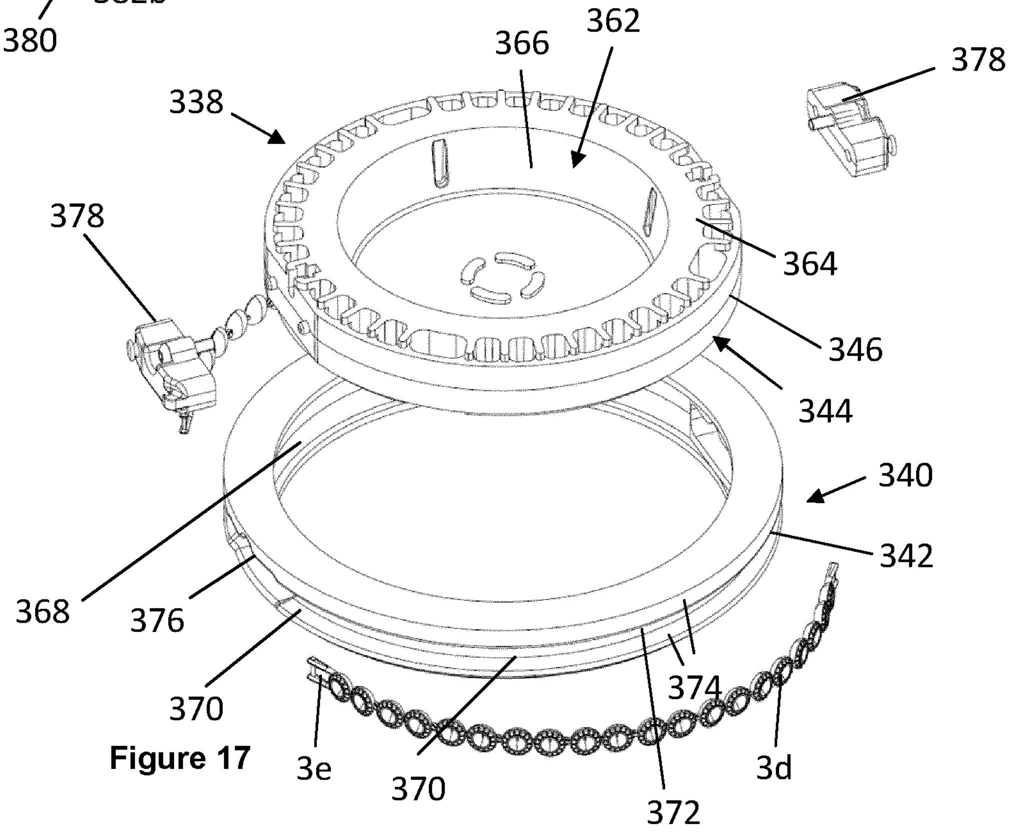
FIG. 17 shows an exploded perspective view of a second variant of a Type 3 holder of the workpiece carrier system of FIG. 1*b;*

Referring to FIG. 17, a connecting feature 362 is defined on an underside 364 of the disc 344, and as in the main body 38 of a Type 1 holder 12*a*, the connecting feature 362 is a female formation and comprises a recess 366 that is substantially conical or frustoconical, and is of the same dimensions as a corresponding conical or frustoconical protrusions that defines a corresponding connecting feature on the machine 1.

An internal annular surface 368 of the removable annular piece 340 is substantially the same dimensions as the outward-facing annular surface 346 of the main body 338. In this way, the removable annular piece 340 can fit tightly over the disc-shaped piece 344 of the main body 338. An external annular surface of the removable annular piece 340 defines the outward-facing annular contact surface 342.

For flexible annular workpieces, such as necklaces or bracelets made from multiple links, the removable annular piece 340 may be configured to accommodate multiple different workpiece designs, having for example different shapes and sizes of links and/or different over lengths. The annular workpiece 3*d* of FIGS. 15 to 17 is a piece of this type.

Referring back to FIG. 16*a*, in this case, the external annular surface 342 of the removable annular piece 340 comprises a groove 370 that defines a base wall 372 and side walls 374. The groove 370 is shaped to accommodate an annular workpiece, such that the base wall 372 of the grove 370 defines the outward-facing annular contact surface 342.

The removable annular piece 340 comprises an opening 376 in the external annular surface 342. A fixing piece 378 is provided that matches the shape of the opening 376. With the removable annular piece 340 in place around the outward-facing annular surface of the disc 346, the fixing piece 378 is inserted into the opening 376 and fixed to the disc 344 by means of a bolt 380. This arrangement of the fixing piece 378 helps to secure the removable annular piece 340 in place on the disc 344.

The fixing piece 378 also comprises fixing features 382 to allow the workpiece 3*d* to be fixed to the holder 12*c*. At least one of the fixing features 382 complements a clasp or other fixing feature on the workpiece 3*d*. In this example, a first fixing feature 382 on a first side of the fixing piece 378 is a fixing hook 382*a*, which is configured to engage with a feature such as a bar or loop formation on the workpiece 3*d*.

Another fixing feature 382 may correspond to the other clasp or fixing feature on the other end of the workpiece 3*d*, or as in the example may be a fixing post 382*b*. In this case, the fixing post 382*b* is configured to engage with an O-ring (not shown), which provides a link between the fixing post 382*b* and the clasp or fixing feature on the other end of the workpiece 3*d*.

In use, the clasp 3*e* or fixing feature at the first end of the workpiece 3*d* is fixed to the fixing hook 382*a*. The workpiece 3*d* is then wrapped around the holder 12*c*, within the groove 370, such that the internal surface of the workpiece 3*d* is in contact with the outward-facing annular contact surface 342 defined by the base wall 372 of the groove 370. An O-ring of appropriate size is connected to the clasp 3*f* at the other end of the workpiece 3*d*, and to the fixing post 382*b*. The O-ring is selected so as to be pulled slightly taut when it is secured in place, thereby holding the workpiece 3*d* securely against the holder 12*c*. O-rings of different sizes can be used to accommodate workpieces of different lengths.

In a variation of this holder 12*c*, shown in FIG. 17, the removable annular piece 340 comprises multiple openings 376 in the external annular surface 342, and multiple fixing pieces 378 are provided that match the shapes of the openings 376. Each fixing piece 378 comprises two fixing features 382 in the manner described above. In this way, multiple shorter workpieces 3*d* can be fixed between adjacent fixing pieces 378, such that multiple workpieces can be held by the holder 12*c*.

For larger rigid annular workpieces, such as bangles or chokers that are of rigid construction, the removable annular piece 340 may need to be specially produced to accommodate the contours of the internal annular surface of the workpiece. This may be particularly the case if the internal annular surface is complex and is nota smooth surface.

Figure 18:
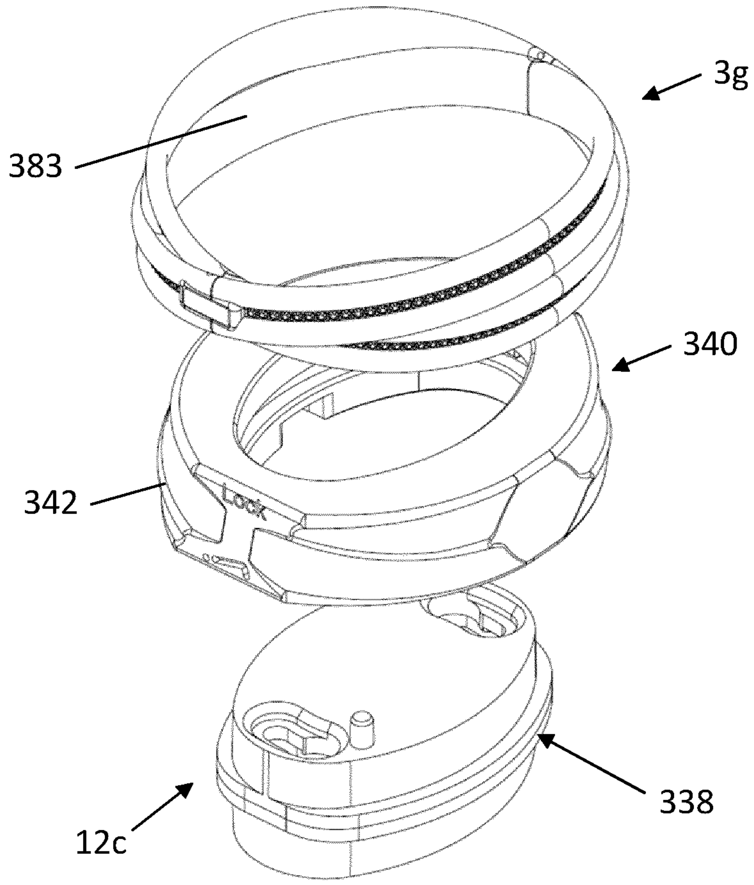
FIG. 18 shows an exploded perspective view of a third variant of a Type 3 holder of the workpiece carrier system of FIG. 1*b;*
Figure 19:
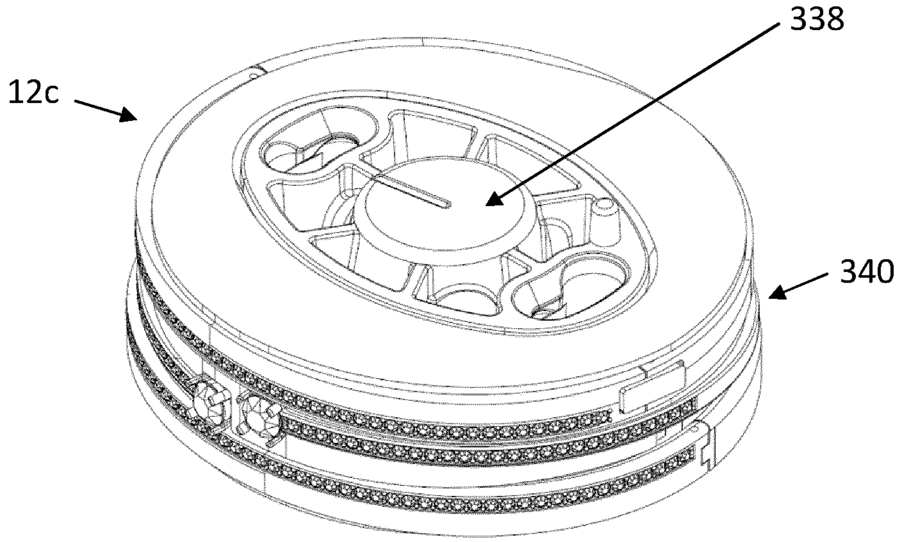
FIG. 19 shows a perspective view of a fourth variant of a Type 3 holder of the workpiece carrier system of FIG. 1*b;*

Examples of this are shown in FIGS. 18 and 19. In these examples, the contours of the outward-facing contact surface 342 of the removable annular piece 340 are designed to match the contours of an internal annular surface 383 of a workpiece 3*g*. The removable annular piece 340 may be made of a rigid material in this embodiment, for example a metal or plastics material. The workpiece 3*g* can therefore simply be arranged to lie tightly against the outward-facing contact surface 342, and can be secured in place with an appropriate fixing means. In these examples, the main body 338 is not circular, but is generally oval in cross section. However, it will be appreciated that the main body 338 can be any suitable shape.

Carrier

Different embodiments of the carrier 14 will now be described with reference to FIGS. 20 to 28.

Figure 20:
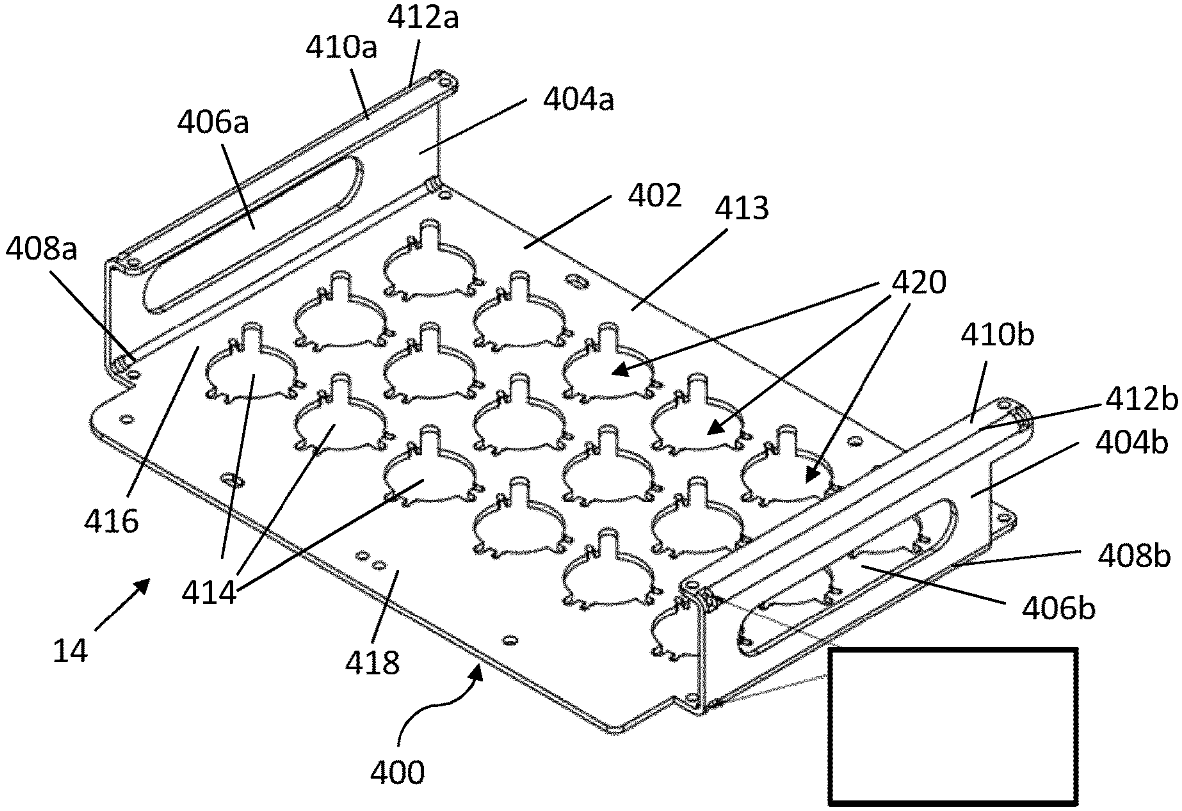
FIG. 20 shows a perspective view of a carrier of the workpiece carrier system of FIG. 1*b*, for use with the Type 1 holder of FIG. 3 or FIG. 6 or the Type 2 holder of FIG. 8.

FIG. 20 illustrates an embodiment of the carrier 14 that is configured for use with holders 12 having the main body 38 of holder 12*a* of Type 1 above, with protrusions 47 that act as carrier-engaging features 46. The carrier 14 comprises a substantially tray-shaped body 400 having a base 402 and left and right side walls 404*a*, 404*b* that extend upwardly from the base 402.

The left and right sidewalls 404*a*, 404*b* each comprise elongate apertures 406*a*, 406*b* that act as handles, allowing the carrier 14 to be gripped on each side by hand. Each side wall 404*a*, 404*b* meets the base 402 at its lower end 408*a*, 408*b*, and extends into an upward-facing flange 410*a*, 410*b* at its upper end 412*a*, 412*b*. The upward-facing flanges 410*a*, 410*b* extend inwardly from each side wall 404*a*, 404*b*, and act as supports that facilitate stacking of multiple carriers, one on top of another. The flanges 410*a*, 410*b* are provided with apertures that can accommodate bolts to fix the carriers together in a stack.

The base 402 is a substantially flat plate 413 that defines a plurality of holder locations 414. An upper surface 416 of the plate 413 may support a QR or RF code (not shown) that identifies the contents of the carrier 14. A flange 418 extends rearwardly from the plate 413, and in use facilitates gripping of the carrier 14 by a gripper.

Figure 21:
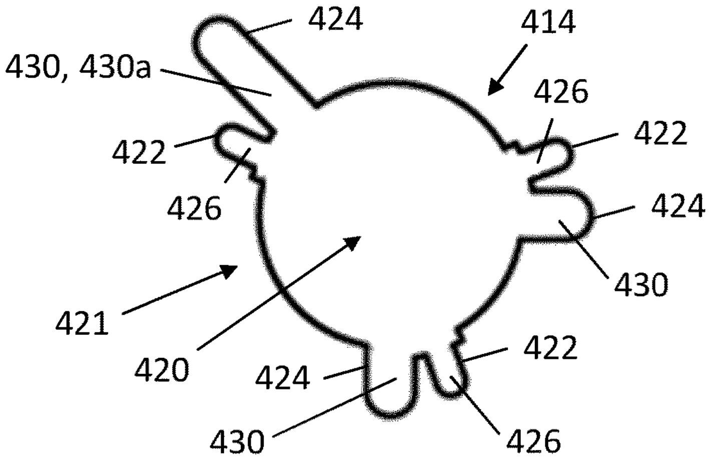
FIG. 21 shows a schematic plan view of an aperture of a base of the carrier of FIG. 20.

At each holder location 414, the plate 413 is provided with a formation comprising a central aperture 420, a set of holder-engaging features 422, and a set of holder-withdrawal features 424, as described in more detail in relation to FIG. 21.

FIG. 21 illustrates a single holder location 414 in isolation. The central aperture 420 is substantially circular, with a diameter that is slightly greater than a diameter of the upper section 52 of the main body 38 of the Type 1 holder 12*a*, but less than the diameter of the lower section 54 of the main body 38 of the Type 1 holder 12*a*. In this way, the upper section 52 of the main body 38 can pass through the central aperture 420, but the lower section 54 cannot.

The holder-engaging features 422 are recesses 426 that extend radially away from a perimeter of the central aperture 420. The recesses 426 have a width and length that is slightly greater than a corresponding width and length of the protrusions 47 on the upper section 52 of the main body 38 that define the carrier-engaging features 46 of the Type 1 holder 12*a*. The recesses 426 are also spaced apart to define a relative angular spacing that corresponds to the relative angular spacing of the protrusions 47 (in this case, 120 degrees). In this way, the protrusions 47 can be aligned with, and accommodated in, the recesses 426.

The recesses 426 are open at the upper surface 416 of the plate 413, but extend only part-way through the thickness of the plate 413. Each recess 426 is therefore not open at a lower surface 428 of the plate 413, but defines a base wall (not shown) that prevents movement of an object, such as a protrusion, through the thickness of the tray 400 in the region of the recess 426. Thus, when the protrusions 47 are aligned with, and accommodated in, the recesses 426, the protrusions 47 contact the base walls of the recesses 426, such that the recesses 426 act to support the protrusions 47, and hence the holder 12*a*, on the carrier 14.

The holder-withdrawal features 424 are elongate openings 430 that extend radially away from the perimeter of the central aperture 420. The openings 430 and the central aperture 420 are continuous with each other to define a single combined aperture 421.

The openings 430 are similar in size, shape and arrangement to the recesses 426 of the holder-engaging features 422, also having a width that is slightly greater than a corresponding width of the protrusions 47 on the upper section 52 of the main body 38 and a relative angular spacing that corresponds to the relative angular spacing of the protrusions 47, so that the openings 430 can align with and accommodate the protrusions 47.

All but one of the openings 430 additionally have a length that is only slightly greater than a corresponding length of the protrusions 47 of the main body 38. The remaining opening 430*a* is longer in length, extending further away from the perimeter of the central aperture 420 than the other openings 430. This arrangement provides the controller with a reference, or 'zero', position, allowing the controller to determine the orientation of the openings 430 and holder-engaging features 422 by reference to the location and orientation of the longer opening 430.

Unlike the recesses 426, the openings 430 do extend through the thickness of the plate 413 and are hence open to both the upper and lower surfaces 416, 428 of the plate 413. In this way, objects can pass through the thickness of the tray 400 in the region of the openings 430. The openings 430 are also slightly longer and slightly wider than the recesses 426, so as to allow for greater tolerance in alignment between the openings 430 and the protrusions 47.

The openings 430 are angularly offset from the recesses 426 by a small distance. For the holders 12*c* depicted in FIGS. 15 and 16, this angular offset is between 1 degree and 10 degrees, and may be approximately 8 degrees, for example. For holders of other types and configurations, the angular offset may be between 15 and 25 degrees, and may be approximately 20 degrees, for example.

The engagement and disengagement between a carrier 14 and a Type 1 holder 12*a*, and removal of the holder 12*a* from the carrier 14 will now be described with reference to FIGS. 22 to 26.

As shown in FIG. 22, to engage a holder 12*a* at a holder location 414 in the carrier 14, the carrier 14 is arranged to face upwardly, with the side walls 404*a*, 404*b* extending upwardly from the base 402. The holder 12*a* is also arranged to face upwardly, and is arranged beneath the carrier 14.

The holder 12*a* is moved towards the carrier 14 so as to approach the carrier 14 at the selected holder location 414 from below. As shown in FIG. 23, the upper section 52 of the main body 38 is aligned with the circular portion of the aperture 420, and the protrusions 47 on the upper section 52 of the main body 38 are aligned with the elongate openings 430. With the holder 12*a* and aperture 420 aligned in this way, the upper section 52 of the main body 38 is passed upwardly through the aperture 420 from below, with the protrusions 47 passing through the elongate openings 430, into the position shown in FIG. 24.

When the shoulder 55 of the main body 38 reaches the plate 413, the shoulder 55 abuts the plate 413 in the region surrounding the aperture 420, and the lower section 54 of the main body 38 cannot pass through the aperture 420 because it is too large. At this point, because of the spacing between the protrusions 47 and the shoulder 55, the protrusions 47 are located above the plate 413.

The user then rotates the holder 12*a* by the angular offset as defined between the elongate openings 430 and the recesses 426, so that the protrusions 47, still above the plate 413, are aligned with the recesses 426, as shown in FIGS. 25*a* and 25*b*. The user than allows the holder 12*a* to move downwardly a small distance, as shown in FIG. 26, so that the protrusions 47 are accommodated in the recesses 426. In this configuration, the protrusions 47 on the holder 12*a* are engaged with the recesses 426 on the carrier 14, and thus the holder 12*a* is mounted to the carrier 14, with the upper section 52 of the main body 38 above the plate 413, and the lower section 54 of the main body 38 below the plate 413.

Additional holders 12*a* can be mounted to the other holder locations 414 on the carrier 14 in the same way, until the carrier 14 is fully-loaded and ready to be loaded into the machine 1.

To remove a holder 12*a* from the carrier 14, the above process is carried out in reverse. The protrusions 47 on the holder 12*a* are disengaged from the recesses 426 on the carrier 14 by lifting the holder 12*a* up in a disengaging direction until the shoulder 55 contacts the underside of the plate 413 and the protrusions 47 are clear of the recesses 426. In this configuration, the holder 12*a* is disengaged from the carrier 14.

The holder 12*a* is then rotated back by the same annular offset until the protrusions 47 align with the elongate openings 430. The holder 12*a* is then moved downwardly in a withdrawal direction, so that the upper section 52 of the main body 38 passes through the aperture 420 and the protrusions 47 pass through the elongate openings 430, thereby withdrawing the holder 12*a* until the holder 12*a* is clear of the carrier 14 and is free to be removed.

The above engagement features are used to mount holders of Type 1 or 2 to the carrier, or holders of Type 3 that have substantially the same main body as holders of Type 1. In the case of holders of Type 1 or 2, the workpiece is supported on the upper section 52 of the main body 38, and thus is held above the plate 413 of the carrier 14 when the holder and associated workpiece is mounted to the carrier 14. For holders of Type 3 that have substantially the same main body as holders of Type 1, the workpiece is supported on the lower section 54 of the main body 334, and thus is held below the plate 413 of the carrier 14 when the holder 12*c* and associated workpiece is mounted to the carrier 14.

Figure 27:
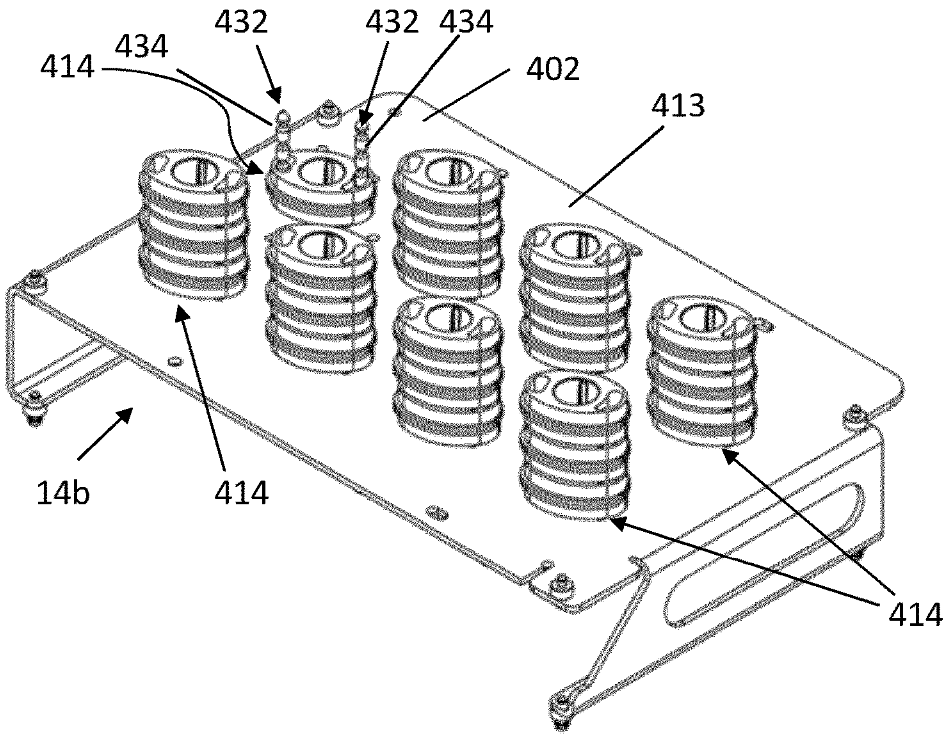
FIG. 27 shows a perspective view of a carrier of the workpiece carrier system of FIG. 1*b*, for use with the Type 3 holder of FIG. 15, FIG. 17, or FIG. 18.

An alternative carrier 14*b* with alternative engagement features 432 may be used to mount holders 12*c* of Type 3 where the main body 338 of the holder 12*c* is a simple disc 344. An example of such a carrier 14*b* is shown in FIG. 27.

In this case, the form of the carrier 14*b* is substantially the same as the carrier 14 of FIG. 20, except that the engagement features 432 of the plate 413 take the form of posts 434, which may be mounted to the plate 413 of the carrier 14*b* via apertures (not shown) provided in the plate 413, such that the posts 434 hang downwardly from the plate 413 when the carrier 14*b* is in use. Note that FIG. 27 shows the carrier 14*b* inverted, with a base 402 of the carrier 14*b* facing upwards, such that the posts 434 extend upwardly in FIG. 27. In this example, two posts 434 are associated with each holder location 414, with the posts 434 being arranged on left and right sides of the holder location 414.

Figure 28:
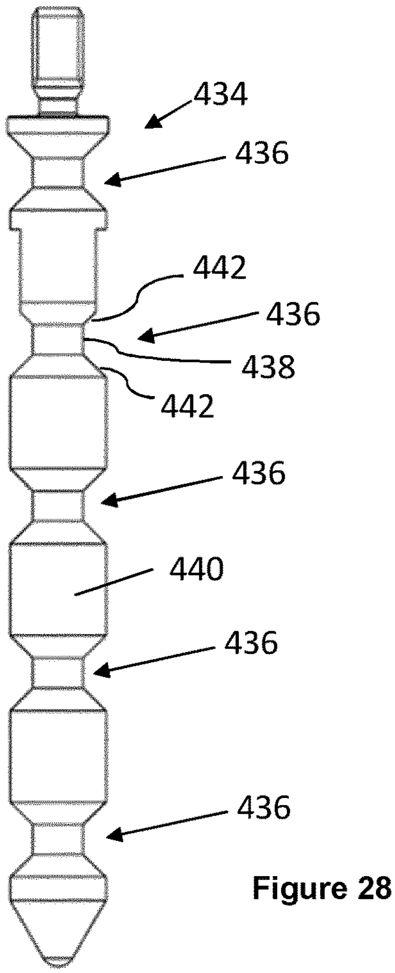
FIG. 28 shows a schematic side view of an engagement feature, or post, of the carrier of FIG. 27.

FIG. 28 shows a post 434 in isolation, and reveals that each post 434 is provided with holder-engaging regions 436. Each holder-engaging region 436 takes the form of recessed regions 438 having a reduced diameter compared to a main body 440 of the post 434. Above and below the recessed region 438 of reduced diameter, abutment surfaces 442 slope outwardly away from the recessed region 438 of reduced diameter and extend the main body 440, to define a neck region.

In use, the recessed regions 438 engage with the carrier-engaging apertures 350 on the holders 12*c* that have been described above as shown in FIG. 16*b*. To allow for engagement and disengagement of the posts 434 on the carrier 14*b* and the apertures 350 on the holder 12*c*, the main bodies 440 of the posts 434 have a diameter that is slightly less than the portion 354 of larger diameter of the apertures 350, and the recessed regions 438 of the posts 434 have a diameter that is slightly less than the portion 356 of reduced diameter of the apertures 350.

To mount a holder 12*c* on the carrier 14*b*, the holder 12*c* is arranged beneath the plate 413 and the posts 434.

The apertures 350 provided in the disc-like main body 338 of the holder 12*c* are aligned with the posts 434, specifically such that the large diameter portion 354 of each aperture 350 aligns with a post 434. The holder 12*c* is then moved upwards so that the posts 434 are threaded through the large diameter portions 354 of the apertures 350. Upward movement continues until the apertures 350 align vertically with the recesses 438 that define the holder-engaging regions 436 of the posts 434.

The holder 12*c* is then rotated through the angular offset so as to cause the portion 356 of reduced diameter of the aperture 350 to slot into place over the region 438 of reduced diameter of the posts 434. In this configuration, the abutment surfaces 442 surrounding the recessed region 438 of reduced diameter contact the sloping abutment surfaces 442 on the posts 434, preventing downward and upward movement of the holder 12*c*, and thereby securing the holder 12*c* in place on the carrier 14*b*.

It should be appreciated that the holders 12*c* may alternatively be mounted to the carrier 14*b* with the carrier 14*b* arranged in the inverted configuration of FIG. 27, such that the holders 12*c* are lowered onto the posts 434 from above.

Because the posts 434 have multiple holder-engaging regions 436 at different lengths along the posts 434, multiple holders 12*c* may be secured to each pair of posts 434, and hence to each holder location 414, with the holders 12*c* stacked one on top of another. During the element application process, holder 12*c* may be removed from and returned to different locations to allow for access to different holders and hence different workpieces. To allow for this movement amongst different locations during the element application process, at least one holder location 414 must have only a single holder in place, so that access can be achieved for all holders.

Multiple carriers may be provided that are adapted to accommodate holders of different types, shapes and sizes.

To this end, apertures 420 and posts 434 of different shapes, sizes and locations, and in different combinations, may be provided on different carriers.

The carrier system described above therefore provides a highly adaptable modular system that can accommodate workpieces of any different type. Workpieces can be easily and securely arranged on holders, and multiple holders can be easily and securely arranged on carriers. The holders can be quickly and easily removed from and returned to the carrier during processing, making the carrier system particularly suitable for use in an automated process.

The fact that the carrier and holder are configured such that the holder is mounted to and removed from the carrier from below is particularly advantageous. As a result of this arrangement, workpieces can be located on an upper surface of a holder, so as to be generally upward-facing for easy application of decorative elements 2, but the holder can be mounted to and removed from the carrier while being supported only from below, leaving the workpiece clear, and not requiring any support from above, which might otherwise block access, or risk damage, to the workpiece.

Once the holders have been mounted to a carrier, the carrier is arranged in the machine at a workpiece insertion location. The basic structure of the machine body, including the workpiece insertion location, will now be described.

Machine Body

Referring back to FIGS. 1*a* and 1 *b*, the machine 1 has a body comprising a casing 13 within which the working volume 4 is defined.

The working volume 4 houses the majority of the machine components, including the workpiece carrier system 11, the workpiece transporter system 15, the workpiece manipulation system 18, the workpiece locating system 20, the element location system 22, the element presentation system 24 and the element application system 28.

Within the working volume 4, several operational regions are defined:

i) a workpiece receiving region where workpieces carried on the workpiece carrier system 11 are initially received into the working volume 4;

ii) a workpiece storage region where workpieces are stored in the working volume 4 ready for subsequent element application;
iii) a workpiece retrieval region where workpieces are retrieved from the workpiece carrier system 11;
iv) a workpiece working region, where elements 2, and optionally adhesive, are applied to the workpiece;
v) a workpiece exit region where workpieces carried on the workpiece carrier system 11 are placed to exit the working volume 4;
vi) an element receiving region, where elements are initially received into the working volume 4;
vii) an element storage region, where elements are stored on or in an element support 16 ready for subsequent application to a workpiece;
viii) an element sorting region where elements are sorted into element locations on the element support 16; and
ix) an element presentation region where elements are presented to the element application system 28 for application.

In the embodiment described, these regions overlap. It is envisaged that in other embodiments, however, the regions may be distinct regions of the machine 1 that do not overlap with one another, so as to allow the various machine components to operate simultaneously without interference.

Within the working volume 4 three orthogonal working directions are defined: x, y and z directions. In this embodiment, the directions are defined as follows:

the x direction is generally parallel to a line drawn between the workpiece receiving region and the workpiece exit region, i.e. parallel to a workpiece insertion direction;

the y direction is generally parallel to a line drawn between the element receiving region and the element storage region, i.e. parallel to an element insertion direction; and the z direction is generally perpendicular to the y and x directions, and is parallel to an application direction, defined as the direction in which is the applicator moves as it applies a decorative element 2 to the workpiece 3.

The x, y and z directions will also be referred to as x, y and z axes respectively in the following description.

Considering the casing 13 itself in more detail, referring to FIG. 1*a*, walls of the casing 13 surround the working volume 4 on all sides. A front wall 13*a* of the casing 13 is at least partially transparent, to provide a window through which a machine user can observe the working volume 4. The front wall 13*a* is hinged to the rest of the casing 13, such that it can be arranged between open and closed positions to selectively block access to the working volume 4. A safety switch (not shown) is arranged between the front wall 13*a* and the rest of the casing 13, and is activated and deactivated as the front wall 13*a* is opened and closed, such that the machine 1 can only operate when the front wall 13*a* is in the closed configuration. In this way, the front wall 13*a* can be opened for maintenance when the machine 1 is inactive, but must be closed as a safety measure during operation of the machine 1.

Selected walls of the machine casing 13 are provided with openings that communicate with the insertion and removal locations. In this embodiment, a left casing wall 13*b* is provided with a workpiece input opening (not visible) that communicates with the workpiece insertion location 5, and a right casing wall 13*c* is provided with a workpiece exit opening 17 that communicates with the workpiece removal location 9. The front wall 13*a* is provided with an element insertion opening 19 that communicates with the element insertion location 7. However, it will be appreciated that each of these openings may be provided in any suitable wall of the casing 13.

Figure 29:
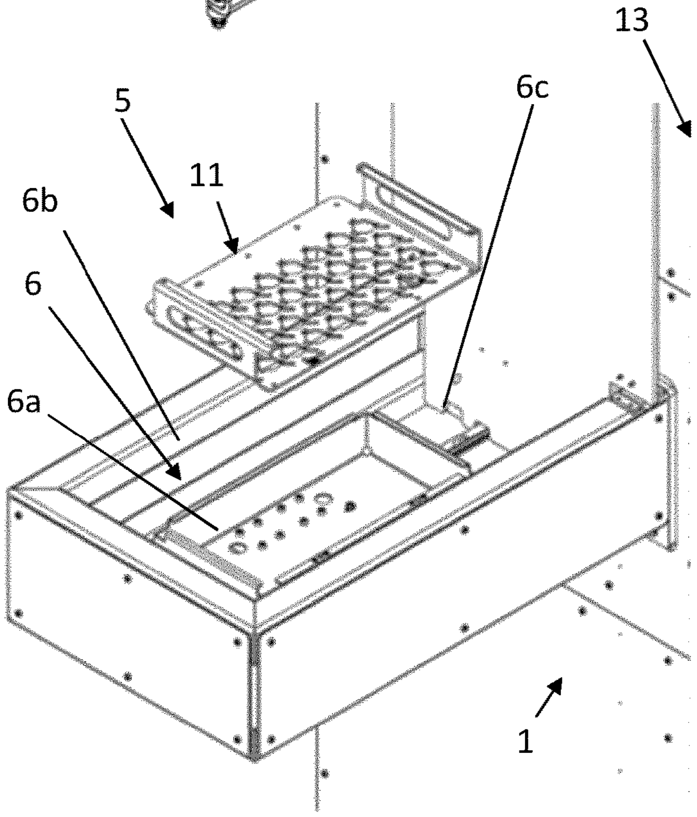
FIG. 29 shows a perspective view of the workpiece insertion location of the machine of FIG. 1*a;*

Referring to FIG. 29, which shows the workpiece insertion location 5, which is substantially identical to the workpiece removal location 9, the workpiece insertion location 5 and the workpiece removal location 9 respectively comprise a workpiece input drawer 6 and a workpiece output drawer 10. The input and output drawers 6, 10 protrude from the body of the machine 1. Each drawer 6, 10 is substantially tray shaped, defining a base 6*a*, 10*a* for receiving a workpiece carrier system 11, an open top face 6*b*, 10*b* through which the workpiece carrier system 11 can be arranged on, or removed from, the base 6*a*, 10*a*, and an open face 6*c*, 10*c* adjoining the respective workpiece opening in the machine casing 13, to allow the workpiece carrier system 11 to pass between the drawer 6, 10 and the working volume 4. The open top face 10*b*, 10*b* may optionally be provided with a movable lid (not shown).

Each drawer 6, 10 comprises a carrier sensor (not shown) configured to determine whether a workpiece carrier system 11 is arranged on the base 6*a*, 10*a*.

The machine 1 comprises a workpiece transporter system 15, shown in FIG. 1*b*, configured to transport the workpiece carrier system 11 from the workpiece input drawer 6, through the machine 1, and to the workpiece output drawer 10. The workpiece transporter system 15 will be described in more detail below in the section entitled 'Workpiece transporter system'.

A barcode scanner (not shown) may be optionally employed as the workpiece carrier system 11 is fed into the working volume 4, to read a unique identification code on the carrier, such as a QR or RF code. This barcode allows the controller to access information about the workpiece carrier system 11, including which workpieces are held by the carrier and their location in the carrier, and to take certain actions based on that information, as will be described in more detail later.

As can be seen in FIG. 1*a*, the element insertion location 7 comprises an element input drawer 8 that protrudes from the body of the machine 1. The drawer 8 is substantially tray shaped, defining a base for receiving an element support 16 into or onto which elements 2 can be arranged, an open top face through which the element support 16 and/or elements 2 can be inserted and/or removed, and an open face adjoining the element insertion opening 19 in the machine casing 13, to allow the element support 16 to pass between the drawer 8 and the working volume 4.

Figure 53:
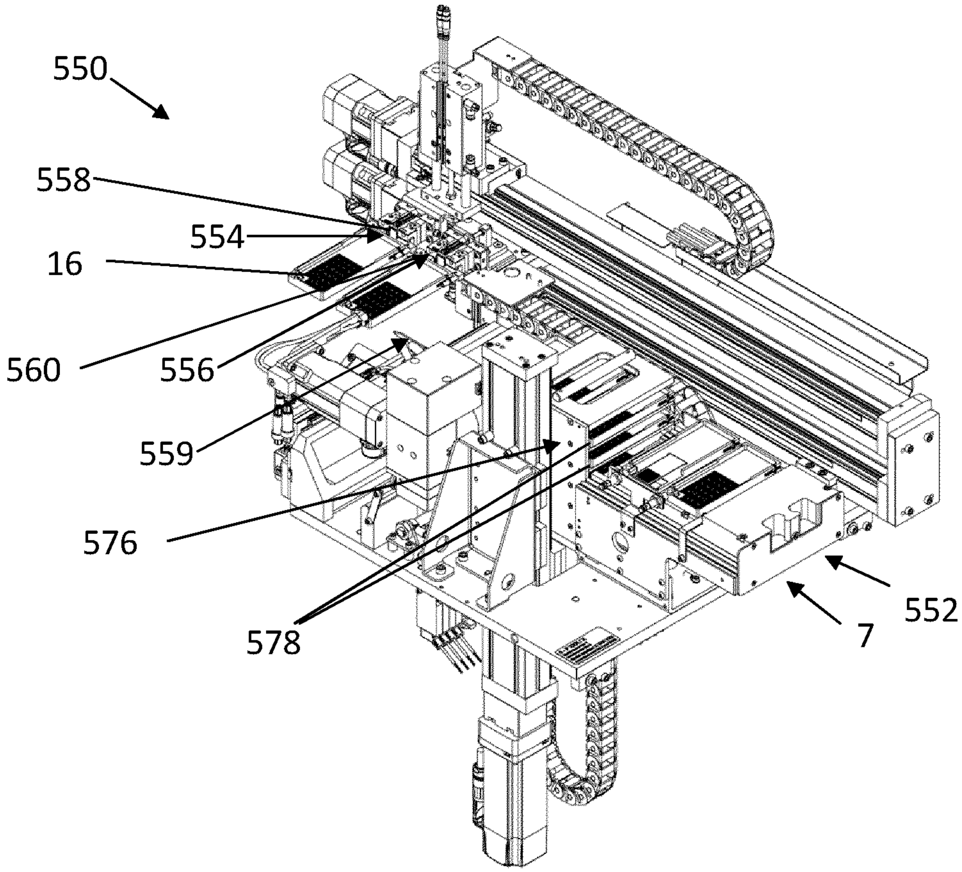
FIG. 53 shows a perspective view of the element transporter system of the machine of FIG. 1*a;*
Figure 54:
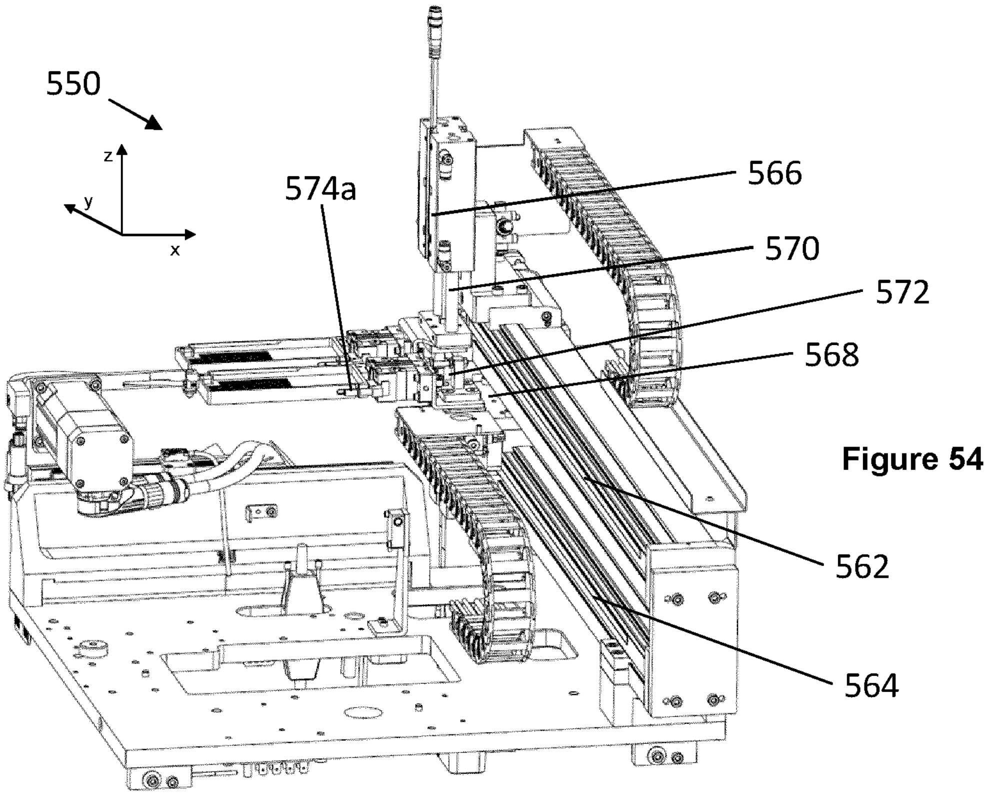
FIG. 54 shows another perspective view of the element transporter system of FIG. 53.

The machine 1 comprises an element transporter system, shown in FIGS. 53 and 54, configured to transport the element support 16 between the element input drawer 8 and the working volume 4. The element transporter system will be described in more detail below in the section entitled 'Element transporter system'.

Workpiece Transporter System

Figure 30:
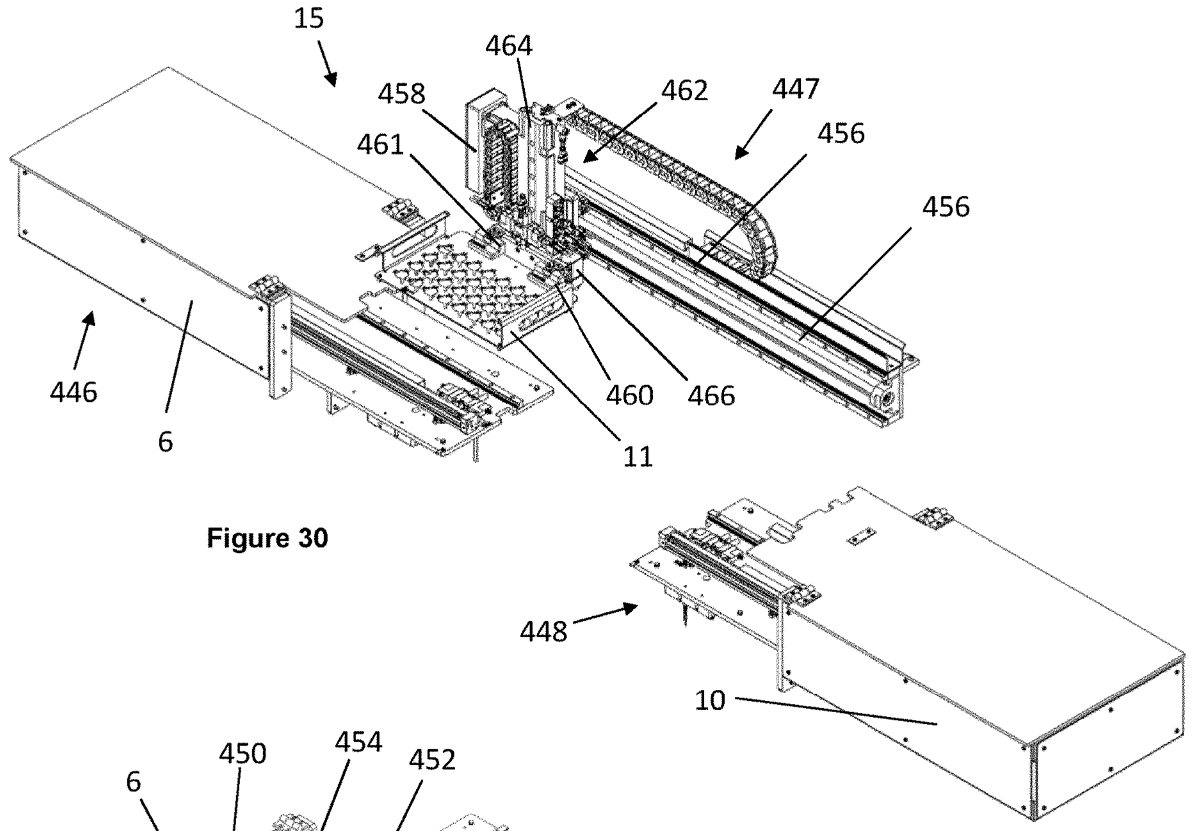
FIG. 30 shows a perspective view of the workpiece transporter system of FIG. 1*b;*

FIG. 30 shows the workpiece transporter system 15 in isolation and reveals that the workpiece transporter system 15 comprises first, second and third parts 446, 447, 448.

The first part 446 is configured to transport the workpiece carrier system 11 from the input drawer 6, through the workpiece opening, and into the workpiece receiving region of the working volume 4.

The second part 447 is configured to move the workpiece carrier system 11 within the working volume 4.

The third part 448 is configured to transport the workpiece carrier system 11 from the workpiece exit region, through the workpiece opening, and into the workpiece output drawer 10.

Figure 31:
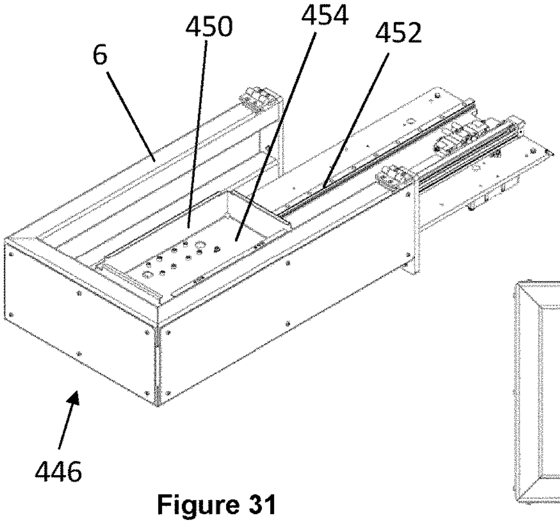
FIG. 31 shows a perspective view of a first part of the workpiece transporter system of FIG. 30, the first part comprising a support and a rail.
Figure 32:
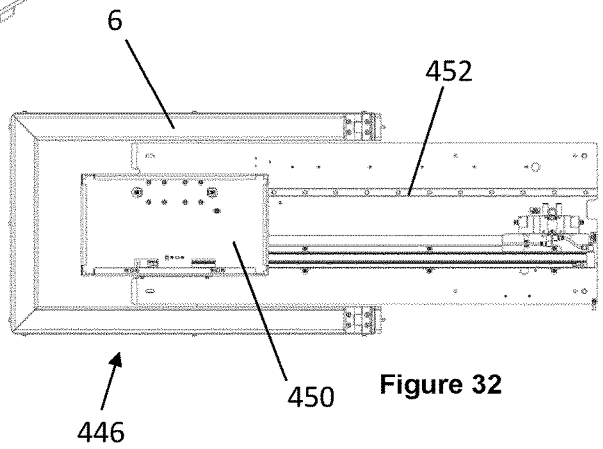
FIG. 32 shows a plan view of the first part of FIG. 31.

Considering each part in turn, referring to FIGS. 31 and 32, the first part 446 of the workpiece transporter system 15 comprises a support 450 that is configured to support the workpiece carrier system 11 and that is moveable between the input drawer 6 and the workpiece receiving region. In this embodiment, the first part 446 comprises a rail 452 that extends between the input drawer 6 and the workpiece receiving region, and the support 450 takes the form of a platform 454 that is mounted to and movable along the rail 452.

The machine 1 comprises a controller for controlling the movement of the platform 454. The controller is configured to receive a signal from the carrier sensor indicating if a workpiece carrier system 11 is present on the platform 454, and on receipt of such a signal, to output a signal to cause the platform 454 and hence the workpiece carrier system 11 to move along the rail 452 to the workpiece receiving region. Once the workpiece carrier system 11 has been removed from the platform 454, the platform 454 can return to the input drawer 6, ready to receive the next workpiece carrier system 11.

In other embodiments, the rail 452 and platform 454 may optionally be replaced with a conveyor that extends between the input drawer 6 and the workpiece receiving region, and the controller may be configured to advance the conveyor to move the workpiece carrier system 11 from the input drawer 6 to the workpiece receiving region.

As noted above, the second part 447 of the workpiece transporter system 15 is configured to move the workpiece carrier system 11 within the working volume 4. More specifically, the second part 447 of the workpiece transporter system 15 is configured to remove the workpiece carrier system 11 from the workpiece receiving region, to store the workpiece carrier system 11 in the workpiece storage region, to repeatedly move the carrier system 11 back and forth between workpiece storage region and the workpiece retrieval region, for retrieval of workpieces 3, and storage of the workpiece carrier system 11 and remaining workpieces 3 during the subsequent application process, and to move the workpiece carrier system 11 to the workpiece exit region.

Figure 33:
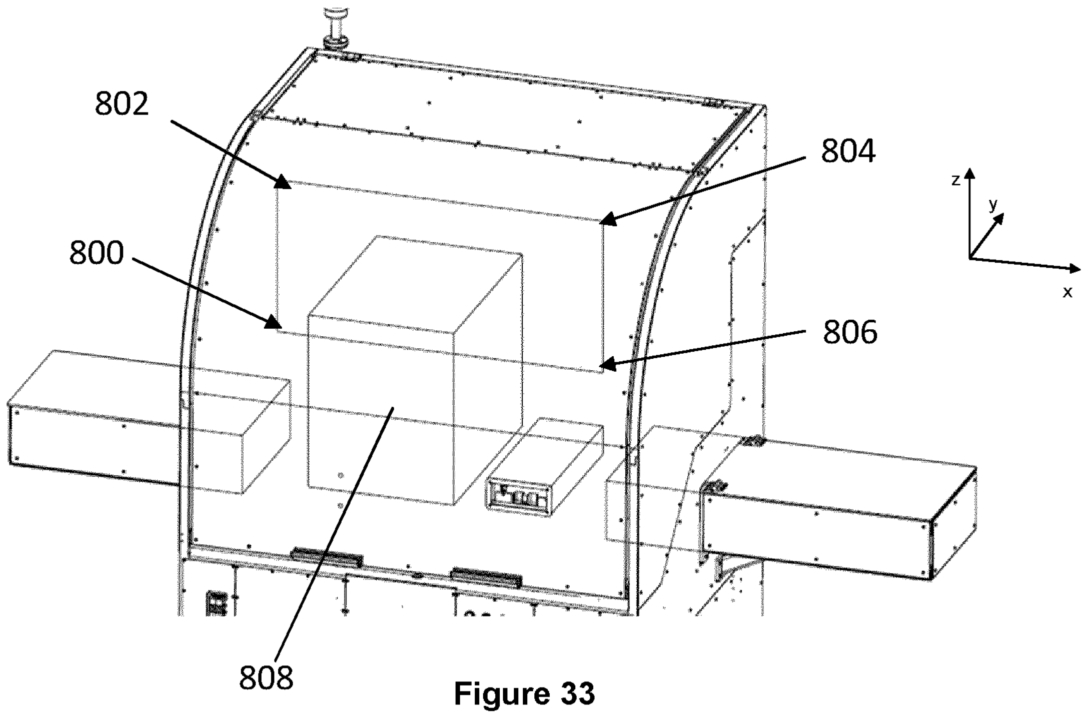
FIG. 33 shows a schematic perspective view of the working volume of FIG. 1*a*, the working volume comprising various regions.

Referring to FIG. 33, in the embodiment shown, the workpiece receiving region 800, workpiece storage region 802, workpiece retrieval region 804 and workpiece removal region 806 are all located generally at the rear of the working volume 4, and are located generally in the same x-z plane. In this case, the four regions are arranged to define four corners of a rectangle, beginning at the bottom left with the workpiece receiving region 800, moving clockwise up along the z axis to the workpiece storage region 802, right along the x axis to the workpiece retrieval region 804 and down along the z axis to the workpiece exit region 806, though other arrangements of these regions are also envisaged. Thus, the second part 447 of the workpiece transporter system 15 must be configured to allow movement up, down, left and right, in the z and x directions, between the four regions.

Referring back to FIG. 30, the second part 447 of the workpiece transporter system 15 comprises a horizontal rail 456, a horizontal carriage 458 mounted to the rail 456, and a gripper 460 that is supported by a support 461, and configured to grip the workpiece carrier system 11.

To achieve the required horizontal movement the horizontal rail 456 extends horizontally in a direction from the workpiece storage region 802 to the workpiece retrieval region 804, and the horizontal carriage 458 is mounted to and movable along the horizontal rail 456.

To achieve the required vertical movement, the support 461 is supported on the horizontal carriage 458 via an extendable arm 462. The extendable arm 462 is configured to allow movement of the gripper 460 upwards and downwards in a vertical direction, from the workpiece receiving region towards the workpiece storage region. To this end, the extendable arm 462 comprises a vertical rail 464 and a vertical carriage 466 that supports the support 461 and, in turn, the gripper 460. The vertical carriage 466 is mounted to and movable along the vertical rail 464.

The machine controller is configured to control operation of the second part 447 of the workpiece transporter system 15, including operation of the gripper 460, movement of the support 461 along the rails 456, 464, and the extension and retraction of the extendable arm 462. In this way, the controller controls movement of the second part 447 of the workpiece transporter system 15 between the workpiece receiving region, the workpiece storage region 802, the workpiece retrieval region 804 and the workpiece exit region 806.

Figure 34:
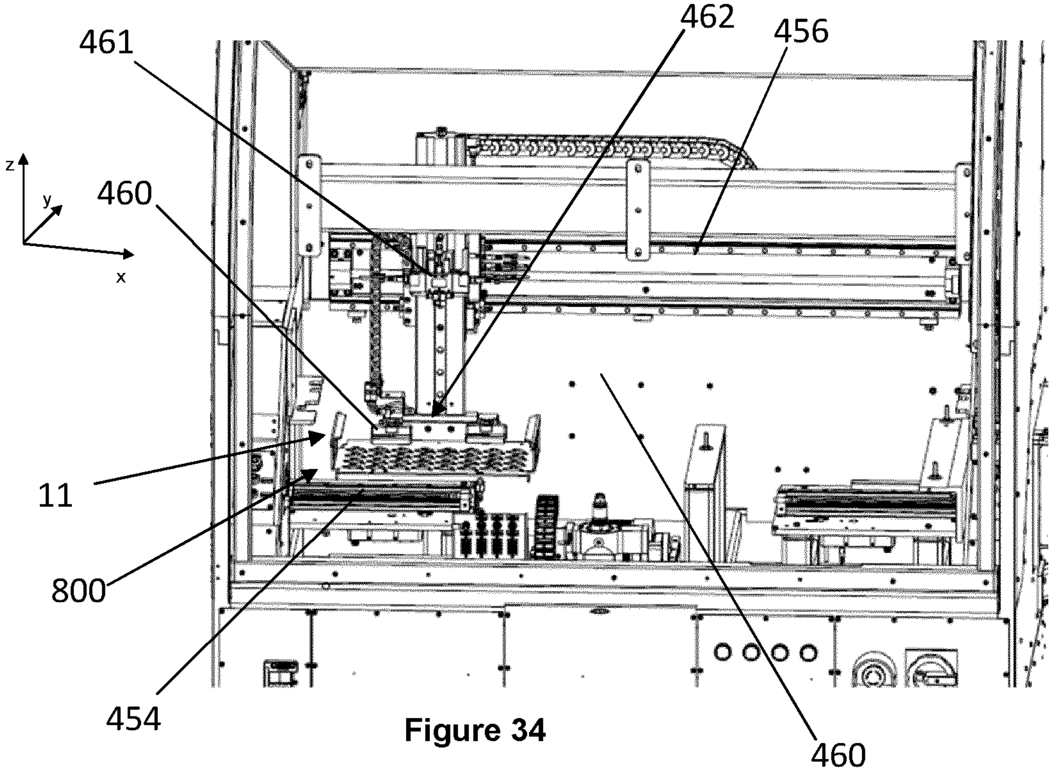
FIG. 34 shows a perspective view of the working volume of FIG. 1*a* and, in particular, shows a gripper of the workpiece transporter system of FIG. 30 positioned at a workpiece receiving region of the working volume and gripping the workpiece carrier system of FIG. 1*b;*
Figure 35:
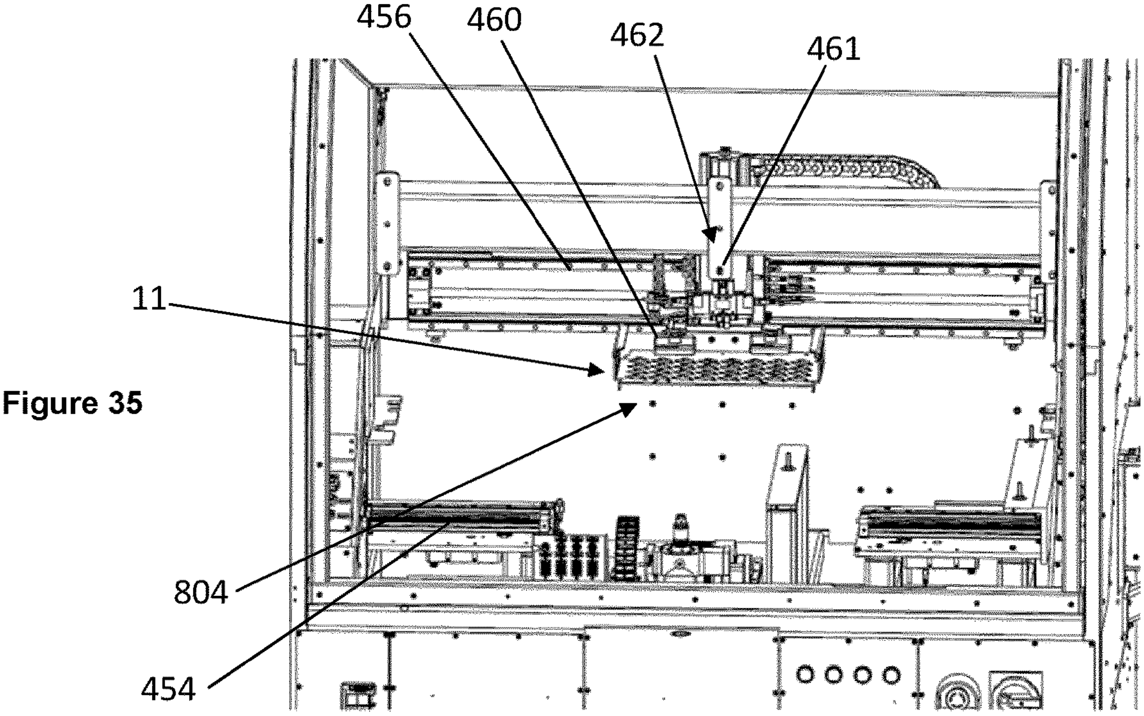
FIG. 35 shows a perspective view of the gripper of FIG. 34 positioned at a workpiece retrieval region of the working volume and gripping the workpiece carrier system of FIG. 1*b;*
Figure 36:
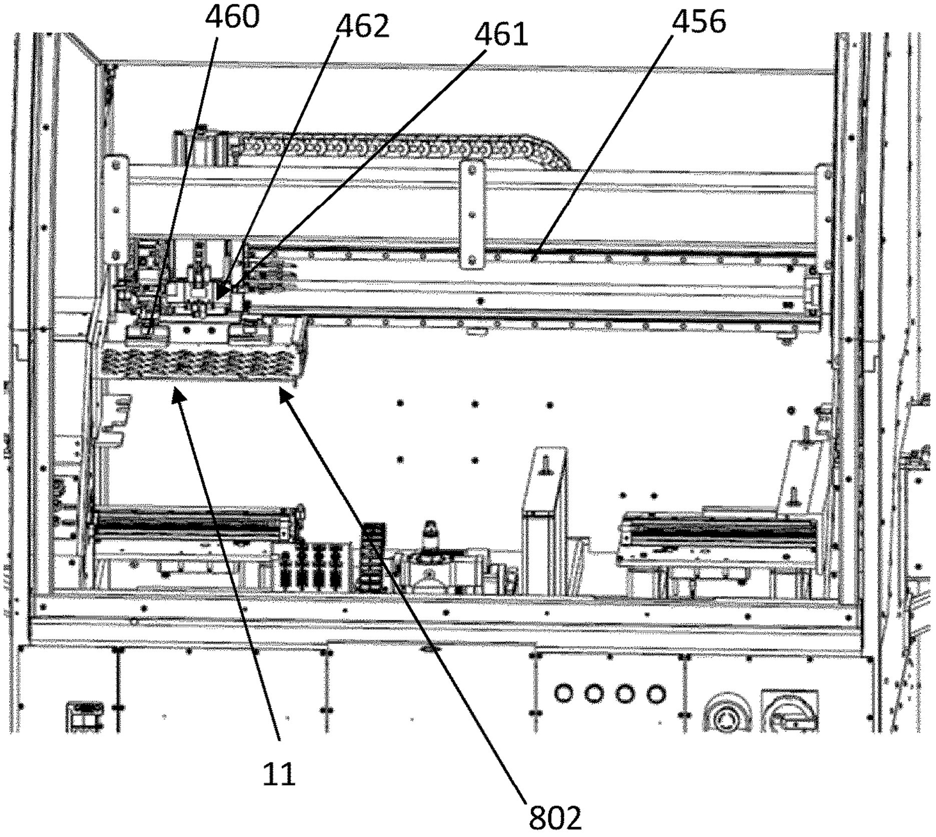
FIG. 36 shows the gripper of FIG. 34 positioned at a workpiece storage region of the working volume and gripping the workpiece carrier system of FIG. 1*b;*
Figure 37:
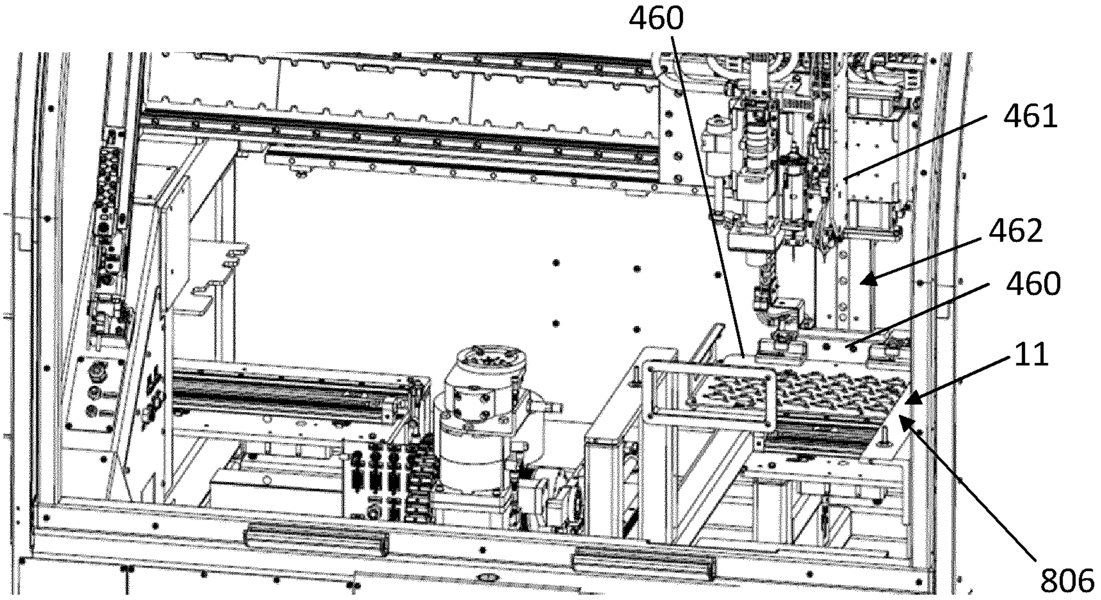
FIG. 37 shows a perspective view of the gripper of FIG. 34 positioned at a workpiece exit region of the working volume and gripping the workpiece carrier system of FIG. 1*b;*

In use, once the workpiece carrier system 11 has been delivered to the workpiece receiving region 802 by the platform 454 of the first part 446 of the workpiece transporter system 15, the controller is configured to output signals to cause the second part 447 of the workpiece transporter system 15 to undertake the following operation:

a) cause the gripper 460 to move to the workpiece receiving region 800 by extending the extendable arm 462 to an extended position and moving the support 461 along the rail 456 to a left-ward position, as shown in FIG. 34;
b) cause the gripper 460 to grip the workpiece carrier system 11;
c) cause the gripper 460 to move to the workpiece retrieval region 804, as shown in FIG. 35, by retracting the extendable arm 462 into a retracted position and moving the support 461 along the rail 456 to a right-ward position, thereby removing the workpiece carrier system 11 from the platform 454 and moving it to the workpiece retrieval region 804 for retrieval of a workpiece 3;
d) after retrieval of a workpiece 3, cause the gripper 460 to move to the workpiece storage region 802, as shown in FIG. 36, by moving the support 461 along the rail 456 to the left-ward position while retaining the extendable arm 462 in the retracted position;
e) after completion of the application process, cause the gripper 460 to return to the workpiece retrieval region 804 shown in FIG. 36, by moving the support 461 along the rail 456 to a right-ward position while retaining the extendable 462 arm in the retracted position, to allow return of the workpiece 3 to the carrier 13, and retrieval of a new workpiece 3;
f) repeat steps d) and e) until all workpieces 3 have been retrieved and returned to the carrier 14;
g) after the final workpiece 3 has been returned to the carrier 14, cause the gripper 460 to move to the workpiece exit region 806, as shown in FIG. 37, by extending the extendable arm 462 to an extended position while retaining the support 461 in the right-ward position;
h) cause the gripper 460 to release the workpiece carrier system 11 into the workpiece exit region 806.

Optionally, after or during step c), the controller may be configured to cause the platform 454 of the first part 446 of the workpiece transporter system 15 to return to the workpiece input drawer 6, ready to receive a new workpiece carrier system 11.

Turning now to the third part 448 of the workpiece transporter system 15, and referring back to FIGS. 30, 31 and 32, the third part is substantially identical to the first part 446, but works in reverse, to cause a platform (not visible in FIG. 30) to move from the workpiece exit region 806 to the workpiece output drawer 10, where the workpiece carrier system 11 can be removed from the platform. Once the workpiece carrier system 11 has been removed from the platform, the platform can return to the workpiece exit region 806, ready to receive the next workpiece carrier system 11.

By virtue of the workpiece input and output drawers 6, 10 and the workpiece transporter system 15, the workpiece insertion and exit locations 4, 8 are physically separated from the working volume 4 and hence the other moving elements of the machine 1, so that the operator is able to load the carrier system 11 into the workpiece insertion location 4 and remove it from the workpiece removal location 8 safely, while the machine 1 is in operation. Because of this safety feature, and because of the use of separate parts of the transportation system 16 for initial delivery and final removal of the carrier system 11 from the working volume 4, the machine 1 does not need to stop the application process as carrier systems 11 are loaded into and removed from the machine 1. Instead, the user has an entire carrier cycle in which to load a new workpiece carrier system 11 into the machine 1, and to remove the completed carrier system 11 from the machine 1, at any convenient time during that cycle, and the application process will continue uninterrupted.

Once the workpiece holders 12 have been arranged in the machine 1 on the workpiece carriers 14, the holders 12 can be removed from the carriers 14 and manipulated within the working volume 4 of the machine 1 by the workpiece manipulation system 18, which will now be described in more detail.

Workpiece Manipulation System

Referring to FIG. 33, the workpiece manipulation system 18 is configured to move workpieces 3 between the workpiece storage region 802 and the workpiece working region 808, to locate and orient the workpiece 3 in a desired reference location and orientation within the workpiece working region 808, and to manipulate the workpieces 3 within the workpiece working region 808 for application of the elements 2 at the individual element locations.

Figure 38:
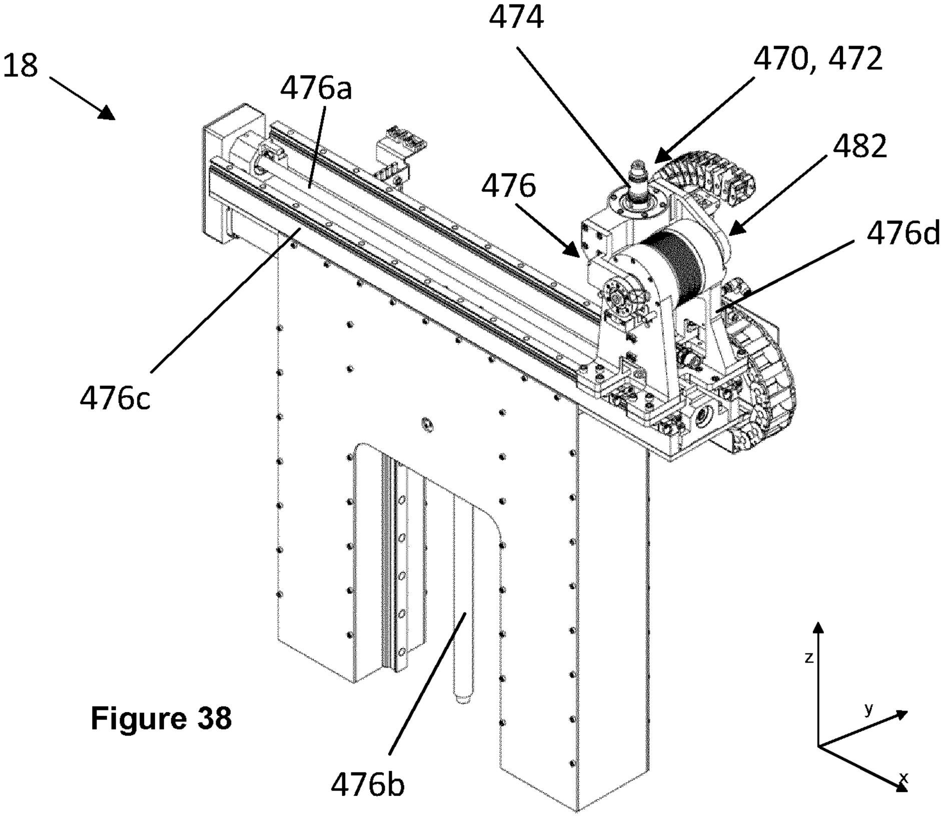
FIG. 38 shows a perspective view of the workpiece manipulation system of FIG. 1*b*, the workpiece manipulation system comprising a manipulator arm for supporting a workpiece.

Referring to FIG. 38, which shows the workpiece manipulation system 18 in isolation, the machine 1 comprises a moveable support 470 in the form of a manipulator arm 472 that is configured to support a holder 12 and its associated workpiece 3, to enable the holder 12 and workpiece 3 to be moved within the workpiece working region 808.

The manipulator arm 472 comprises an elongate body 474 that engages with the workpiece holder 12, and an actuator arrangement 476 onto which the elongate body 474 is mounted.

Figure 39:
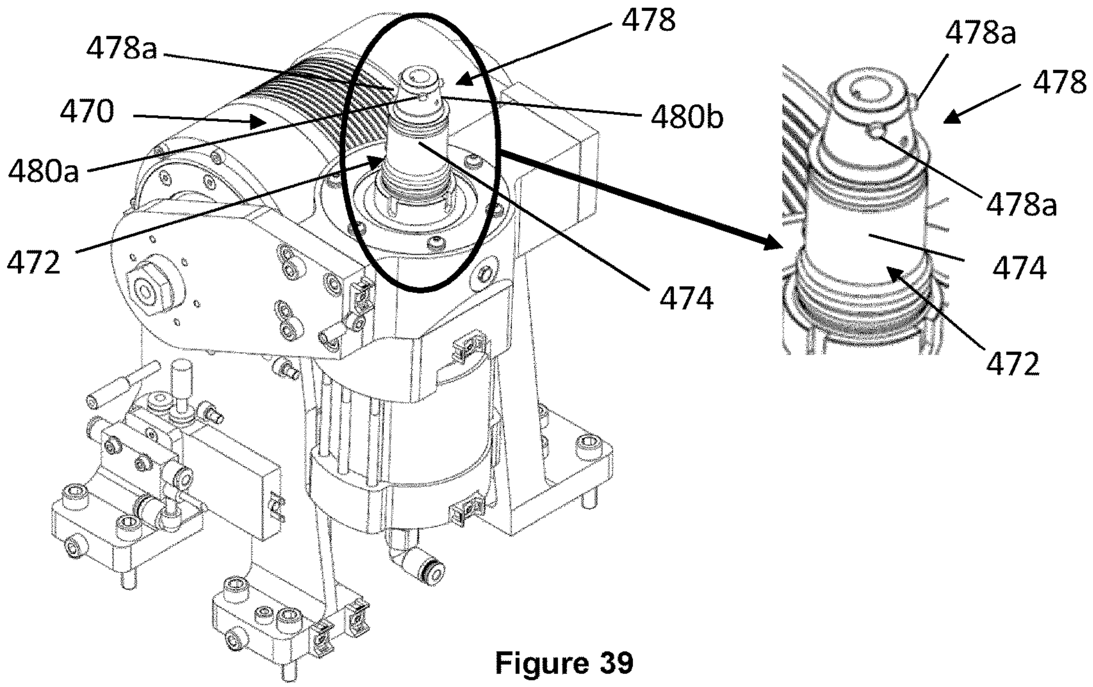
FIG. 39 shows a perspective view of the manipulator arm of FIG. 38.

As shown in FIG. 39, particularly the close-up inset which shows the elongate body 474 in detail, a connecting feature 478 is provided at the end of the elongate body 474, in the form of a protrusion 478*a*. The protrusion 478*a* has substantially the same contours as the recess that defines the connecting feature 48 on the holder 12, such that the protrusion 478*a* on the manipulator arm 472 will fit snugly into the corresponding recess on a holder 12. In this example, therefore, the protrusion 478*a* is frustoconical. A locking feature 480 in the form of a pair of protruding lugs 480*a*, 480*b* is provided on the frustoconical protrusion 478*a*.

The actuator arrangement 476 is configured to allow freedom of movement and orientation of the workpiece 3 within the workpiece working region 808.

Referring back to FIG. 38, the actuator arrangement 476 comprises horizontal and vertical tracks 476*a*, 476*b*, horizontal and vertical carriages 476*c*, 476*d*, and an actuating body 482 mounted to one of the carriages 476*c*.

The elongate body 474 is mounted to the actuating body 482.

The horizontal track 476*a* runs along the y-direction, and the horizontal carriage 476*c* is movably mounted to the horizontal track 476*a* for horizontal movement. The vertical track 476*b* is mounted to the horizontal carriage 476*c*. The vertical track 476*b* runs along the z-direction, and the vertical carriage 476*d* is mounted to the vertical track 476*b* for vertical movement.

Figure 40:
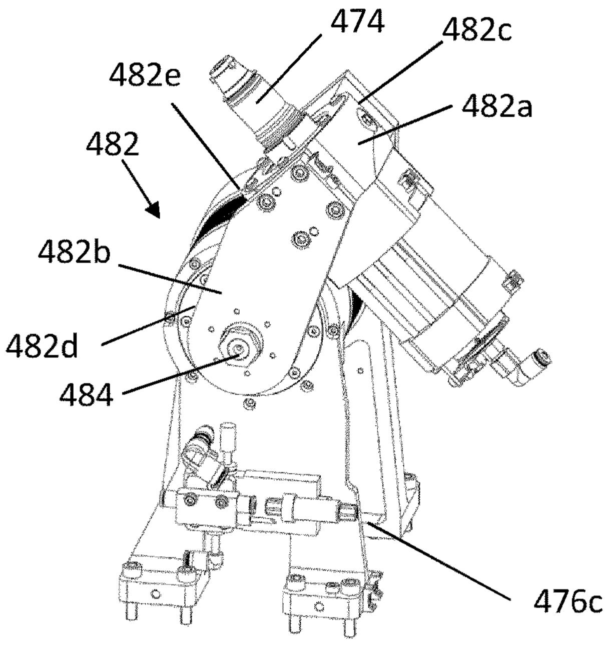
FIG. 40 shows a first side view of an actuator arrangement of the manipulator arm of FIG. 38.
Figure 41:
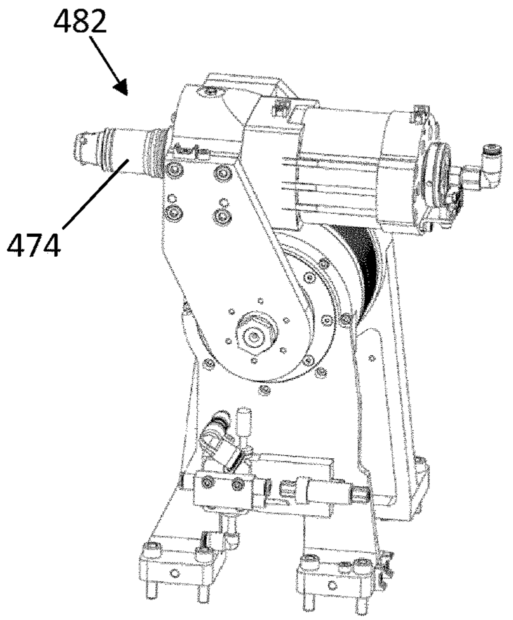
FIG. 41 shows a second side view of the actuator arrangement of FIG. 40.

Referring to FIG. 40, which shows the actuating body 482 in more detail, the actuating body 482 is mounted to the horizontal carriage 476*c* so as to allow pivotal movement of the actuating body 482 about the y-axis of the machine 1. To this end, the horizontal carriage 476*c* comprises a pivot rod 484 that extends parallel to the y-axis. The actuating body 482 comprises a main body 482*a* that is located away from the pivot rod 484, and left and right pivot arms 482*b*, 482*c* that extend towards the pivot rod 484. The left and right pivot arms 482*b*, 482*c* meet the rod 484 at pivot cylinders 482*d*, 482*e*, having bores (not visible) that accommodate ends of the pivot rod 484. The pivot cylinders 482*d*, 482*e* can be caused to pivot around the pivot rod 484, thereby causing the pivot arms 482*b*, 482*c* and main body 482*a* to pivot also. Finally, referring back to FIG. 39 the elongate body 474 is mounted to the actuator body 482 so as to allow rotation of the elongate body 474 about its elongate axis. In the orientation of the elongate body 474 shown in FIG. 39, the elongate body 474 extends generally parallel to the z axis, such that this rotation is about the z axis. However, it will be appreciated that if the actuating body 482 has rotated the elongate body 482 about the x axis such that the elongate body 474 extends generally parallel to the y axis, as shown in FIG. 40, this rotation will instead be a rotation about the y axis. Intermediate axes between the y and z axes are also possible depending in the degree of rotation of the actuating body 482, for example as shown in FIG. 41.

Thus, the actuator arrangement 476 is configured to allow translation of the holder 12 and associated workpiece 3 in directions parallel to they and z axes, and rotation of the holder 12 and associated workpiece 3 about rotation axes parallel to the y, x and z axes.

It will be appreciated that the arrangement described does not permit translation along directions parallel to the x axis. However, the machine 1 provides for relative x-axis movement for all necessary components by other means. For example, as has been described above, the workpiece transporter system 15 can cause the carrier 14, and hence workpiece holders 12, to move in the x direction, so that relative x-axis movement can be effected between the manipulator arm 472 and the workpiece holders 12 in the carrier 14. As will be described later, the element applicator 30 and adhesive applicator 32 each move parallel to the x axis, so that relative x-axis movement can be effected between the workpiece 3 and the element applicator 30 and adhesive applicator 32. In this way, whilst the manipulator arm 472 can only move in two of the three dimensions, relative movement between the manipulator arm 472 and other machine components (including workpiece holders 12 in the carrier 14, the element applicator 30 and the adhesive applicator 32) is possible in all three dimensions.

The actuating arrangement 476 comprises motors that are arranged to effect movement in all the possible directions. The controller is configured to output appropriate signals to cause the motors to move to effect the required movement.

When the machine 1 is to begin work on a particular selected workpiece, the controller will instruct the actuator arrangement 476 to cause the manipulator arm 472 to remove the corresponding workpiece holder 12 from the carrier 14. This process has two stages: in a first stage the manipulator arm 472 is connected to the holder 12, and in a second stage the manipulator arm 472 disengages and removes the holder 12 from the carrier 14 and brings it to the workpiece working region.

To begin the process, the controller sends a signal to the workpiece transporter system 15 cause the carrier 14 to be moved to the workpiece retrieval region. Within the workpiece retrieval region, a particular x-axis position is selected that aligns the selected holder 12 with the manipulator arm 472 in the x axis.

The controller then sends a signal to the actuator arrangement 476 to move the manipulator arm 472 along the y axis until the selected holder is aligned with the manipulator arm 472 in the y axis. The manipulator arm 472 is specifically arranged such that the lugs 480*a*, 480*b* on the protrusion 478*a* of the manipulator arm 472 are angularly aligned with the channels 72*a*, 72*b* in the recess.

Figure 42:
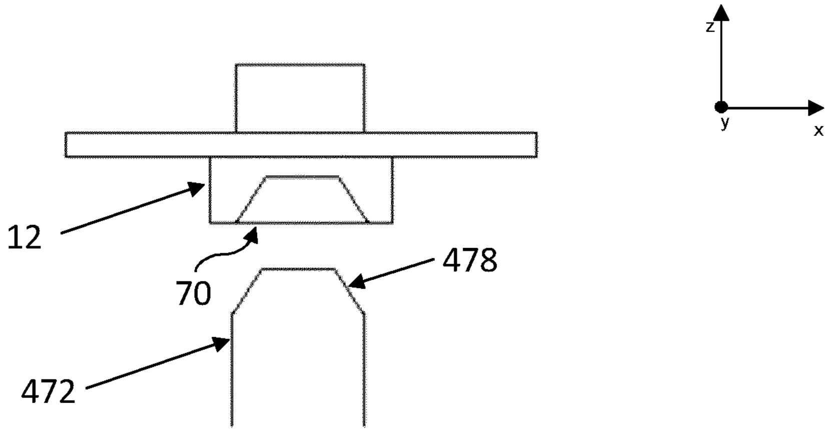
FIG. 42 shows a schematic side view of the carrier of FIG. 20 and the Type 1 holder of FIG. 3 or FIG. 6, the carrier and holder in an engaged position, and the manipulator arm of FIG. 38 aligned with the holder.

The manipulator arm 472 and the selected holder 12 are now in an aligned configuration, shown in FIG. 42, with the connecting feature 478 of the manipulator arm 472 directly beneath the corresponding connecting feature 70 on the holder 12.

Figure 43:
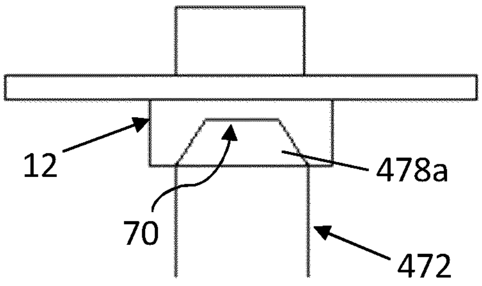
FIG. 43 shows a schematic side view of the carrier of FIG. 20 and the Type 1 holder of FIG. 3 or FIG. 6, the carrier and holder in an engaged position, and the manipulator arm of FIG. 38 and holder 'docked'.

The controller then sends a signal to the actuator arrangement 476 to move the manipulator arm 472 vertically upward along the z axis, until the protrusion 478*a* of the manipulator arm 472 is located inside the connecting feature 70 of the holder 12, as shown in FIG. 43. As the protrusion 478*a* of the manipulator arm 472 is moved into the connecting feature 70 of the holder, the lugs 480*a*, 480*b* on the protrusion 478*a* move upwardly through the channels 72*a*, 72*b* adjacent to the recess (not visible in FIG. 43). In this way, the manipulator arm 472 and holder 12 'dock', so that the manipulator arm 472 connected to the holder 12, with the lugs 480*a*, 480*b* located in the corresponding channels 72*a*, 72*b*.

Once the connecting feature 478 of the manipulator arm 472 has contacted the connecting feature 70 of the holder 12, the second stage begins.

Figure 44A:
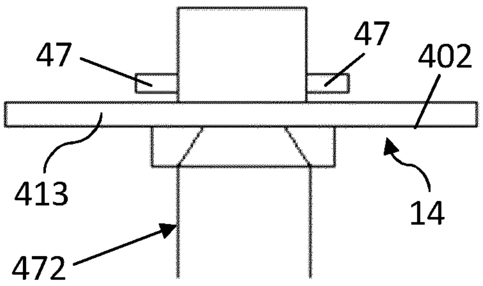
FIGS. 44*a* and 44*b* show a schematic side view and a schematic plan view, respectively, of the carrier of FIG. 20 and the Type 1 holder of FIG. 3 or FIG. 6, the carrier and holder in a first partially disengaged position, and the manipulator arm of FIG. 38 and holder 'docked'.
Figure 44B:
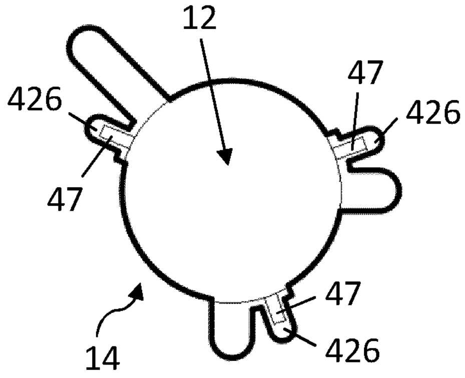

To begin this second stage, the controller simply allows upward movement of the manipulator arm 472 to continue a short distance. This continued upward movement acts to lift the holder 12 upwardly so that the protrusions 47 on the holder 12 move out of the recesses 426 on the base 402 of the carrier plate 413, as shown in FIGS. 44*a* and 44*b*, thereby disengaging the holder 12 from the carrier 14.

The controller then causes the elongate body 474 of the manipulator arm 472 to rotate about the z axis, by the pre-determined offset angle. The lugs 480*a*, 480*b* of the manipulator arm 472 lock against the channels 72*a*, 72*b* of the holder 12 (not visible in FIGS. 44*a* and 44*b*), thereby ensuring that as the elongate body 474 rotates, the holder 12 rotates with it.

Once the elongate body 474 and holder 12 have rotated through the offset angle, the protrusions 47 are aligned with the openings 430 in the plate 413, as shown in FIG. 45. As shown in FIG. 46, the controller then causes the manipulator arm 472 to move downwardly in the z direction, so as to withdraw the holder 12 through the aperture 420 in the plate 413 of the carrier 14, thereby removing the holder 12 completely from the carrier 14.

The controller then causes the actuator arrangement 476 to move the manipulator arm 472, and hence the holder 12, into the workpiece working region, as shown in FIG. 47.

The manipulator arm 472 therefore provides a simple means for manipulating workpiece holders 12 in every way that is required in the machine 1. In particular, the connecting feature 478 allows the manipulator arm 472 to connect quickly, easily and securely to the holder 12, and the actuating arrangement 476 allows all the degrees of flexibility that are required for the process within the working volume 4 of the machine 1.

It is particularly advantageous that a single upward direction acts as both a connection direction for effecting connection between the manipulator arm 472 and the holder 12, and a disengagement direction for effecting disengagement of the holder 12 from the carrier 14. In this way, a single upward movement can be used to both connect the manipulator arm 472 to the holder 12 and to disengage the holder 12 from the carrier 14, allowing both processes to occur simultaneously, thereby increasing efficiency and throughput of the machine 1.

Once the workpiece 3 has been successfully arranged in the workpiece working region, the workpiece 3 is more precisely aligned and oriented, so that it is ready for application of the decorative elements 2. This alignment and orientation is carried out by the workpiece locating system 20, which will now be described.

Workpiece Locating System

When a particular workpiece is arranged in a holder 12, the holder 12 may give a certain degree of freedom as to the precise location and orientation of the workpiece 3 within the holder 12. To avoid the need for a user to precisely locate and orient each workpiece 3 in its holder 12 (which would be difficult and time-consuming, and may not even be possible to the required degree of accuracy), and to ensure precision placement of elements 2 on the workpiece 3 at precise element locations, the machine 1 is configured to align the workpiece 3 automatically and precisely to a pre-determined target location and orientation.

This alignment and orientation is effected by the workpiece locating system 20, which is configured to locate and orient the workpiece 3 at a target location and a target orientation within the working volume 4 of the machine 1.

For this purpose, each workpiece of a particular type, such as a particular design of ring or a particular design of pendant, is allocated a primary reference feature. The primary reference feature may for example be identified by designers during the design process.

The primary reference feature is common to all workpieces of a particular type. The primary reference feature is also selected to be unique amongst the features of a particular workpiece, i.e. the primary reference feature should only appear once on the workpiece. Optionally, the primary reference feature may be selected to be small enough relative to the size of the workpiece such that identification of the primary reference feature provides the controller with an indication of the exact positioning of the workpiece in the workpiece working region in the machine 1. For example, the primary reference feature may be a feature that is moulded into the body of the workpiece, or a particular arrangement of element-receiving cavities.

Figure 48:
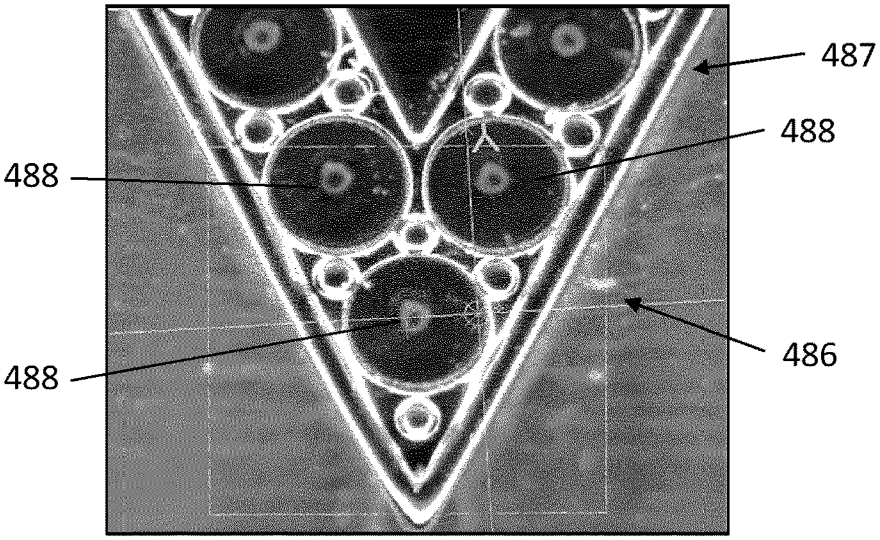
FIG. 48 shows a plan view of a primary reference feature of a workpiece to which a decorative element is to be applied by the machine of FIG. 1*a;*

FIG. 48 shows an example primary reference feature 486 of a workpiece 3 comprising a V-shaped pendant. In this example, the primary reference feature 486 is an arrangement of cavities 488 at the point of the 'V'. The nature of the primary reference feature will vary according to the nature of the workpiece.

Figure 49:
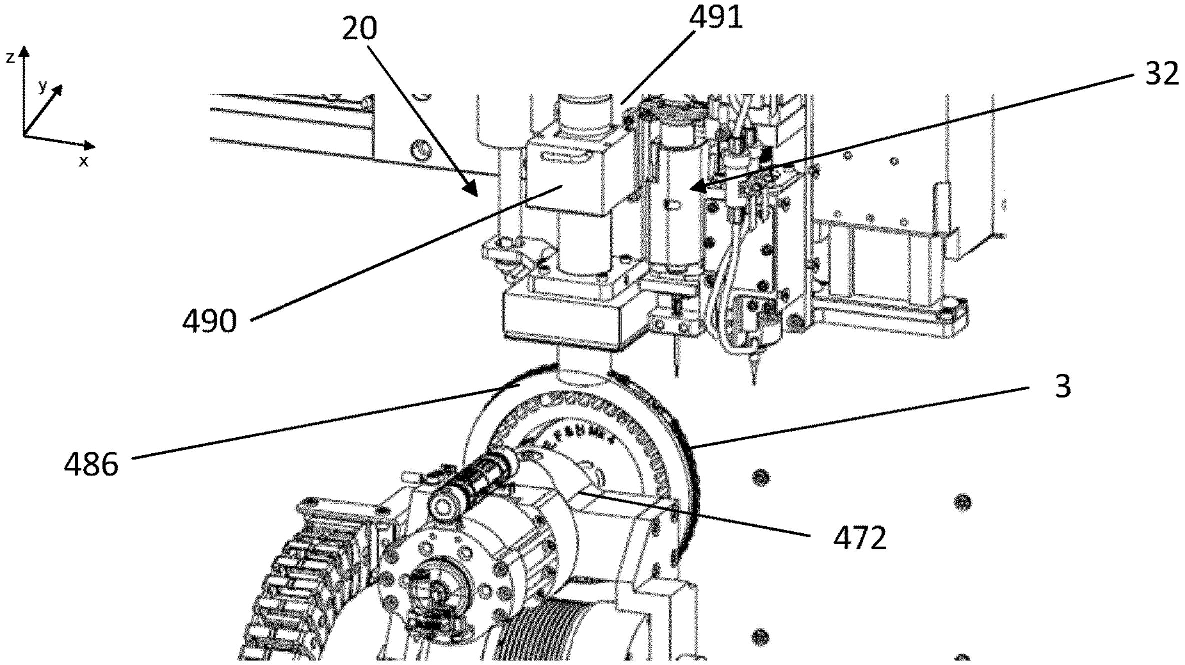
FIG. 49 shows a perspective view of the workpiece locating system of FIG. 1*b;*

Referring to FIG. 49, the workpiece locating system 20 comprises a sensor system and a controller, which is configured to process information from the sensor system, and output a signal to the manipulator arm 472, to cause the manipulator arm 472 to move to arrange the workpiece at the target location and target orientation.

The sensor system comprises a sensor, embodied here as a camera 490. The camera 490 is arranged in the working volume 4 of the machine 1 such that, when the workpiece 3 has been arranged in the working region by the manipulator arm 472, the camera 490 is able to view at least a part of the workpiece 3. In this embodiment, as shown in FIG. 49, the camera 490 is arranged on the same carriage 491 as the adhesive applicator 32, such that the camera 490 is able to view the workpiece 3 directly to take an appropriate reading if the carriage 491 is arranged over the workpiece 3. The camera 490 is preferably spaced no more than approximately 30 mm from the workpiece 3 when the image is captured.

Figure 50:
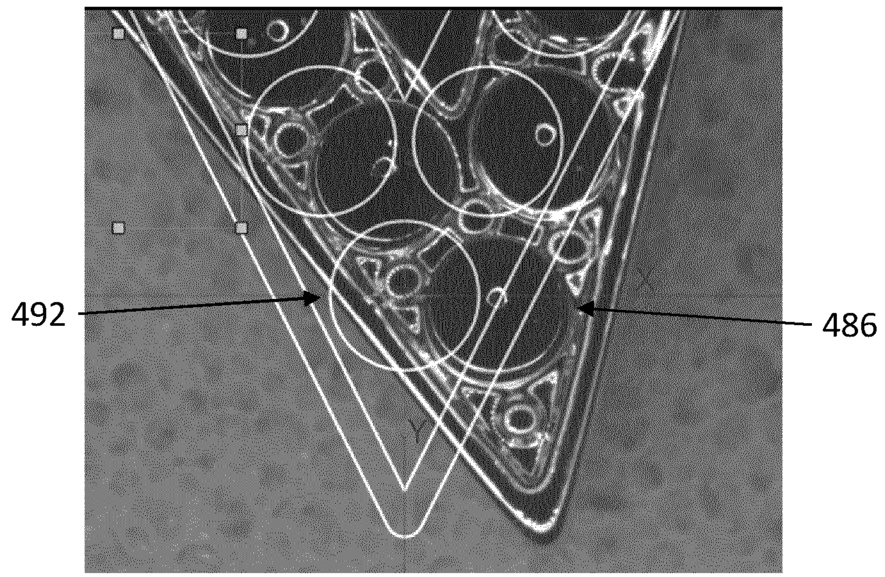
FIG. 50 shows a plan view of the primary reference feature of FIG. 48 and a target location of the primary reference feature.

The controller is configured to store or receive, and process the following information:

i) a reference image of the primary reference feature 486 on the workpiece 3, sent by the camera 490, as shown in FIG. 49;
ii) information regarding the location of the camera 490 when the reference image was captured;
iii) information relating to a target location of the primary reference feature 486, corresponding to a specific location 492 within the workpiece working region, as shown in FIG. 50, which indicates the target location of the primary reference feature 486; and
iv) information relating to a target angular orientation of the primary reference feature 486, as shown in FIG. 50, which indicates the target orientation of the primary reference feature 486.

On receipt of the reference image from the camera 490, the controller is configured to:

a) determine from the reference image i) a location of the primary reference feature 486 in the image (the determined reference feature location) and ii) an orientation of the primary reference feature 486 in the image (the determined reference feature orientation);
b) calculate, based on the determined reference feature location, the known position of the camera 490, and the target reference feature location, a relative linear offset between the determined reference feature location and the target reference feature location;
c) calculate, based on the determined reference feature orientation and target reference feature orientation, a relative angular offset between the determined reference feature orientation and the target reference feature orientation; and
d) output a signal to the manipulator arm 472 to move the manipulator arm 472, and hence the workpiece 3
i) linearly such that the actual reference feature location aligns with the target reference feature location, and/or
ii) angularly such that the actual reference feature orientation aligns with the target reference feature orientation.

In practice, steps b) and c) may be carried on in several ways. For example, the controller may first calculate the actual reference feature location or orientation, and may then calculate an offset between the actual reference feature location or orientation and the target reference feature location or orientation. Alternatively, the controller may directly calculate the offset between the actual reference feature location or orientation and the target reference feature location or orientation.

The manipulator arm 472 is moved by the actuator arrangement 476 that has already been described above.

As noted above in the section entitled "workpiece manipulation system", the manipulator arm 472 may allow for translations only in the y and z directions, while movement of other components may be relied upon for relative translations in the x direction. The target location may therefore correspond only to target y and z co-ordinates. In some examples, the z co-ordinate may be fixed by parameters of the holder 12, and thus it may only be necessary to adjust the y co-ordinate, in which case the target location may correspond to a y co-ordinate only.

With the workpiece correctly located and oriented, the machine 1 then calculates the precise locations of the element locations on the workpiece 3, so that the decorative elements 2 can be applied at precisely the correct locations.

Element Location System

For a cavity-set workpiece 3, the element locations are defined by cavities, which are discrete locations that are pre-moulded into the workpiece 3. In this case, when an element 2 is applied to the workpiece 3, it is important that it is applied directly into a cavity. If an applicator attempts to apply an element 2 off-centre with respect to a cavity, or at a location where no cavity is present, the element 2 will not be correctly or successfully applied, and the element 2 may sustain damage. Similarly, it is important that adhesive is applied precisely into the cavity, to avoid excess adhesive on other parts of the main body that might be visible in the finished article, thereby impacting the aesthetic of the article.

For an Epoxy clay-set workpiece 3, there are no specific element locations pre-set by the workpiece 3, and elements 2 could be applied anywhere in the Epoxy clay. To ensure the correct pattern of elements 2, and to ensure that all the elements 2 will fit on the workpiece 3, the element locations must be determined before the application process begins. Furthermore, because Epoxy clay is mouldable, applying an element 2 into the Epoxy clay will cause displacement of Epoxy clay in the vicinity of the element 2 which will affect the overall shape of the Epoxy clay. The element application can therefore distort the shape in undesirable ways. This displacement, and the dynamic shape variation, can be modelled to predict the behaviour of the Epoxy clay on element application so as to minimise or control the shape distortion, for example by controlling the element locations, and the order in which elements 2 are applied.

If all workpieces of a particular type are absolutely identical, with no dimensional variability due to the manufacturing process, the element locations can be known to be identical for every workpiece. A base model can be developed for a particular workpiece design, including the known element locations, and can be supplied to the controller. The controller can then instruct the machine 1 to apply elements at the element locations in the base model.

However, in reality, manufacturing tolerances mean that there is some dimensional variability between workpieces, and thus element locations are not absolutely identical in workpieces of the same type. A difference even of the order of 0.025 mm between an expected element location and an actual element location can be enough to compromise the quality of an article, and manufacturing tolerances typically exceed this order of magnitude. Thus, in reality, the actual element locations would deviate from those of the base model.

For a small number of cavities of a cavity-set article, the precise element locations could be readily determined empirically, for example by direct imaging, and the base model could be updated using only these empirically-determined locations. However, such a process would be prohibitively time-consuming for a large workpiece with many element locations. It would also be unfeasible for an Epoxy clay-set article, where there are no pre-set element locations on the workpiece to image.

The element location system provides a balance between the two extremes of a purely theoretical model that would not be sufficiently accurate, and empirically-determined locations that would be accurate but unacceptably time consuming. To this end, the element location system combines a base model for a particular workpiece design with a small number of empirically-obtained parameters of the actual workpiece, and develops an updated model that provides more accurate element locations in an efficient timescale.

Figure 51:
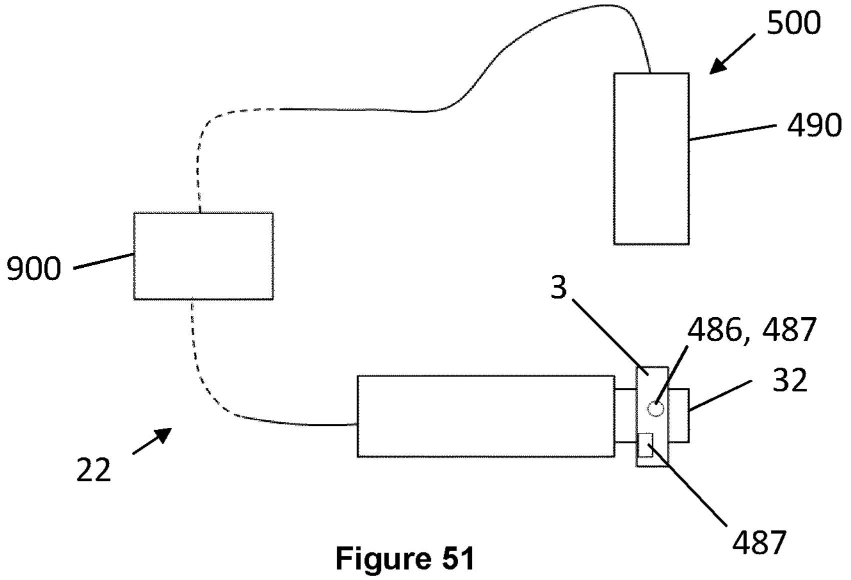
FIG. 51 shows a schematic view of the element location system of FIG. 1*b;*

Referring to FIG. 51, the element location system 22 comprises a sensor system 500 and a controller 900. In the described embodiment, the sensor system 500 comprises a sensor in the form of a camera, which in this case is the same camera as the camera 490 of the workpiece locating system 20, i.e. the camera 490 provided on the carriage 491 that supports the adhesive applicator 32.

The sensor system 500 is configured to determine a secondary parameter of a particular workpiece area. This is compared to an expected secondary parameter of the same workpiece area on the base model, and a deviation is calculated between the expected and measured secondary parameters. The base model is then updated in dependence on the deviation, to give an updated model with more precise information regarding the actual element locations of the workpiece 3.

The element location system 22 carries out the update and calculates an updated model with updated element locations for a particular workpiece area and a particular set of element locations within it. The area may be the entire workpiece 3, such that the set may contain all the element locations, or the area may be only a part of the workpiece 3, such that the set may contain only a portion of the element locations of the workpiece 3. Different calculations and updates may then be carried out for different workpiece areas.

Using different calculated models for different workpiece areas can be beneficial because different areas may deviate from the base model in different ways. For example, as a result of the manufacturing process, some areas may be particularly susceptible to elongation in a particular direction, whereas others may be particularly susceptible to rotate or skew about a particular axis. Workpiece areas can be decided according to these different deviation tendencies, so as to balance a need for speed and efficiency against the aim of providing an accurate overall calculated model for the entire workpiece 3. The secondary parameter calculated by the sensor system 500 may take several forms. In one example, the sensor system 500 makes use of the first and second secondary reference features 487 in the workpiece area, and determines a characteristic of each of the first and second secondary reference features 487, which is assigned a characteristic value. The secondary parameter is the difference between the characteristic value of the first secondary reference features and the characteristic value of the second secondary reference feature. The characteristic may for example be a linear or angular position within the working volume 4 such that the secondary parameter is a linear or angular offset between the first and second secondary reference features 487.

As with the primary reference feature 486, the two secondary reference features 487 are common to all workpieces of that type and may similarly be features that are moulded into the workpiece 32, or a specific arrangement of element-receiving cavities. The secondary reference features 487 should only appear once within the particular workpiece area, and should be relatively small compared to the size of the workpiece 32.

In a further example, a single secondary reference feature is sufficient to provide a secondary parameter. For example, the secondary parameter may be a size or orientation of a secondary reference feature. This may be appropriate if the manufacturing process for the workpiece has very small tolerances for example.

In some cases, the primary reference feature 486 described above may also act as one of the secondary reference features 487, and images and information already obtained in relation to the primary reference feature 486 may be re-used as part of the element location process. However, it will be appreciated that in other embodiments, the primary reference feature 486 may not be used, and a different reference feature may be used instead. If the elements 2 are to be Epoxy clay set, the Epoxy clay region may have a different profile or contour from one workpiece to another. In this case, the secondary parameter may be a gradient of the profile in a particular region, or a statistical or mathematical parameter that defines the shape of the profile. In this case, the camera 490 may take an image of the workpiece 32 in a particular viewing direction, and the controller 900 may determine the secondary parameter from the contour or profile displayed in that image. The camera 490 may take images of the workpiece from multiple angles to provide multiple secondary parameters that can be used to update the base model.

It is also envisaged that the controller 900 may additionally make use of tertiary reference features having tertiary reference parameters, to provide even greater confidence in the overall calculated model. In this case, the controller instructs the camera 490 mounted to the adhesive applicator 32 to take one or more images of the workpiece, including one or more tertiary reference features. The tertiary reference features may for example take the form of cavities that define the element locations.

Upon receipt of each captured image, the controller detects each element location within the captured image and carries out a comparison between the detected element locations and/or orientations and the locations and/or orientations of the updated element locations of the overall calculated model. The tertiary reference parameters may take the form of a deviation or offset between each detected element location and/or orientation and the location and/or orientation of a corresponding updated element location in the updated model.

If the controller determines that there is any deviation or offset between the element locations of the captured image and the corresponding element locations of the model, the controller further updates the model accordingly, providing a check of the overall calculated model, and producing a model that even more accurately represents the location of the element locations of the workpiece.

The controller of the element location system 22 is configured to store or receive, and to process the following information:

i) information relating to the workpiece base model, including a) expected element locations within a particular workpiece area and b) expected secondary parameters within the workpiece area;

ii) one or more reference images, containing images of one or more secondary reference features of the workpiece, sent by the camera 490; and iii) optionally, information regarding the location of the camera 490 when the or each reference image was captured.

On receipt of the reference image(s) from the camera 490, the controller is configured to process the images to measure the secondary parameter, and to calculate precise element locations based on the measured parameter and the base model, by carrying out the following steps:

a) determine from the reference image(s) and optionally the known position of the camera 490, a secondary parameter of the work piece area (the determined secondary parameter)

b) calculate, based on the determined secondary parameter of step b) and the base model information, a deviation between determined secondary parameter and the base model secondary parameter (the calculated deviation value);

c) optionally, repeat steps a) and/or b) to calculate additional calculated deviation values based on the same or additional reference images;

d) calculate, based on the base model information and the calculated deviation value(s), a calculated workpiece area model including precise element locations within the workpiece area.

In the example where the secondary parameter is a linear or angular offset between first and second secondary reference features, step a) involves determining from the reference image(s) and optionally the known position of the camera 490, i) a position or orientation of the first secondary reference feature ii) a position or orientation of the second and iii) the relative linear or angular offset between the position or orientation of the first secondary reference feature and the second secondary reference feature.

Calculating the deviation in step b) effectively provides the controller with an indication of the scale or alignment of the workpiece area relative to the expected scale or alignment according to the base model. If the deviation is high and positive (e.g. there is a larger than expected linear offset between the secondary reference features) this may be indicative of the workpiece being more elongated than expected in a particular direction. In this case, step e) may involve scaling the base model along that direction so as to account for the elongation in the calculated workpiece area model.

By allowing multiple deviation values to be calculated and used in the final modelling step, deviations in multiple dimensions can be taken into account in producing the final model. Furthermore, multiple different types of parameters may be used: for example linear and non-linear scaling and angular rotation may be taken into account.

The element location system 22 therefore allows the controller to account for variations in the size and shape of the workpiece 3, resulting from manufacturing tolerances, for example, and to calculate element locations with relative accuracy in a short period of time.

Once the updated model has been calculated, the updated element locations can also be determined for the particular workpiece area. The information relating to the updated element locations may take the form of an element location 'map', for example. This element location map can subsequently be used by the element application system 28 to control movement of the manipulator arm 472 and the decorative element applicator 30, to ensure application of the decorative elements 2 at the updated element locations.

Where the element location process is applied to multiple workpiece areas, the controller may be configured to cause the element location system 22 to calculate an updated model for the entire workpiece 3 before the element application process begins. Alternatively, the controller may be configured to cause the element location system 22 to determine an updated model for a first workpiece area, then to cause the element application system 28 to apply elements 2 to that first workpiece area, before an updated model is calculated for any subsequent workpiece areas.

The process by which the decorative elements 2 are inserted into the machine 1, transported and subsequently applied at the element locations will now be described in the following sections.

Element Support

As described above, at the element insertion location, the elements 2 are arranged at random on an element support 16 inside the element input drawer 8.

Figure 52A:
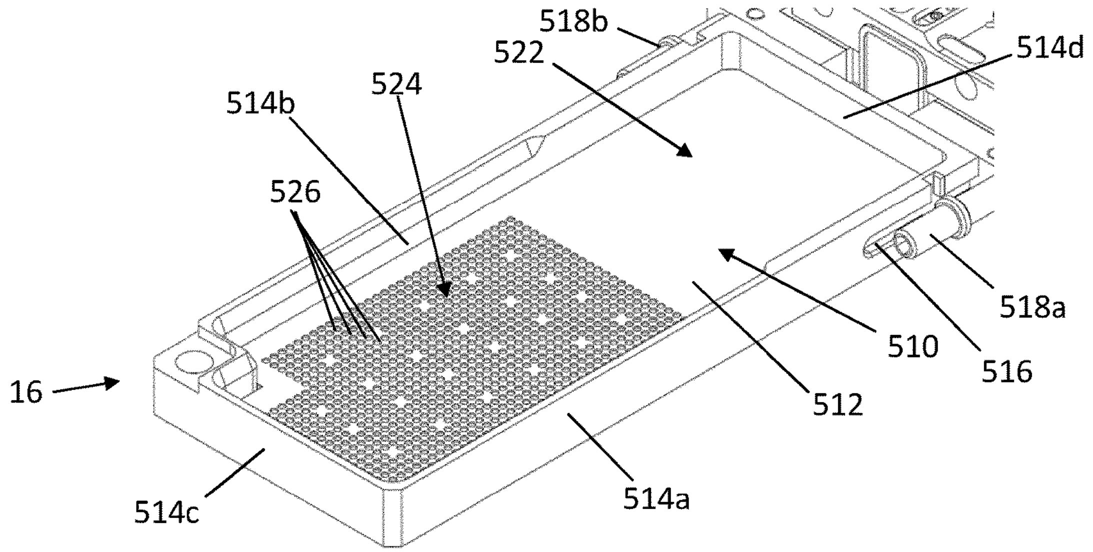
FIG. 52*a* shows a perspective view of an element support for supporting decorative elements in the machine of FIG. 1*a;*

Referring to FIG. 52*a*, the element support 16 takes the form of a tray 510, with a recessed rectangular base 512 bound by four upwardly-extending side walls 514: longer front and rear side walls 514*a*, 514*b*, and shorter left-hand and right-hand side walls 514*c*, 514*d*.

To facilitate handing of the element support 16 in the machine 1, the support 16 comprises elongated recesses 516 extending along outer surfaces of the front and rear side walls 514*a*, 514*b* of the support 16. The shape of the recess 516 complements that of gripper arms 518 that form part of an element transporter system of the machine 1, which is described later in the section entitled 'element transporter system'. In particular, in the described embodiment, each recess 516 is substantially semi-circular in a cross section taken perpendicular to a longitudinal axis of the recess 516, and extends partway along each side wall 514*a*, 514*b* from a right hand end of the element support 16.

The base 512 of the element support 16 comprises a loose-element area 522 and an element presentation area 524. In the loose-element area 522, the base 512 is substantially free of features. In the element presentation area 524, predetermined element presentation locations 526 are defined in the base 512, each of which is configured to support and present a respective decorative element 2 in a particular orientation. Each element presentation location 526 is defined by a recess or aperture in the base 512. In this example, the element presentation locations 526 are arranged in a grid-like structure, with regular spacings between neighbouring locations.

Figure 52B:
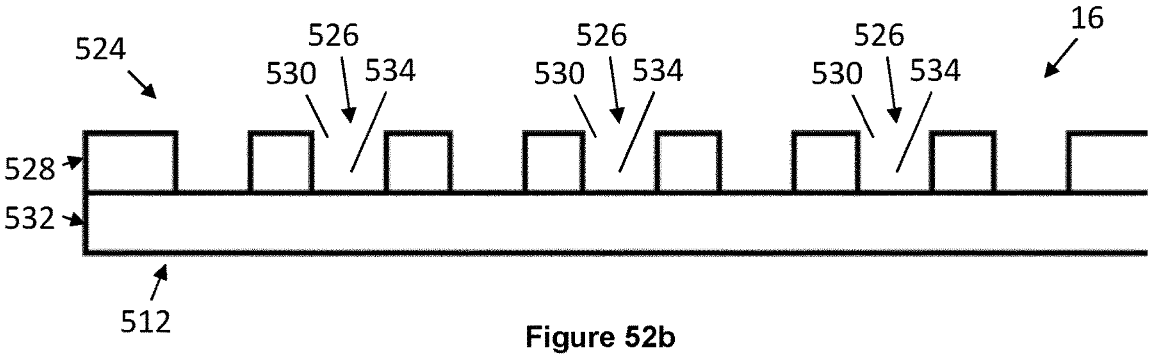
FIG. 52*b* shows a schematic cross-section of element presentation locations of the element support of FIG. 52*a;*

Referring to FIG. 52*b*, which shows the element presentation area 524 of the base 512 of the element support 16 in cross section, in this example, the base 512 of the element support 16 comprises two layered parts: a first or upper base part 528, having an aperture 530 at the position of each element presentation location 526; and a second or lower, base part 532 that is substantially planar with no apertures. When the first base part 528 is positioned atop the second base part 532, such that the two parts 528, 532 wholly overlap, the parts 528, 532 together form a recess 534 at each element presentation location 526.

The upper part 528 of the base 512 is formed as a single piece with the left, right, front and rear side walls 514*a*, 514*b*, 514*c*, 514*d*, such that the base 512 and side walls 514 together define a tray 510 with apertures 530 formed in the base 512. This tray 510 may typically be formed of a metal or plastics material, and for example may be a cast or moulded part. The lower part 532 of the base 512, which closes the apertures 530 in the tray 510, is made of a transparent material. For example, the lower part 532 is made of glass, or of a transparent plastics material such as a transparent acrylic. In this way, in the assembled element support 16, the base 512 of each recess 534 is transparent, so as to allow a line of sight through the base 512 of the tray 510 into the recess 534.

Figure 52C:
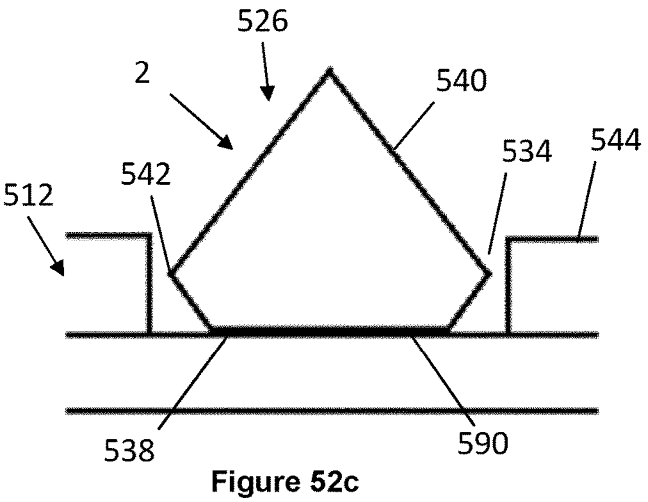
FIGS. 52*c* and 52*d* show a schematic cross-section and a plan view, respectively, of a decorative element in place in a recess of an element presentation location of FIG. 52*b;*
Figure 52D:
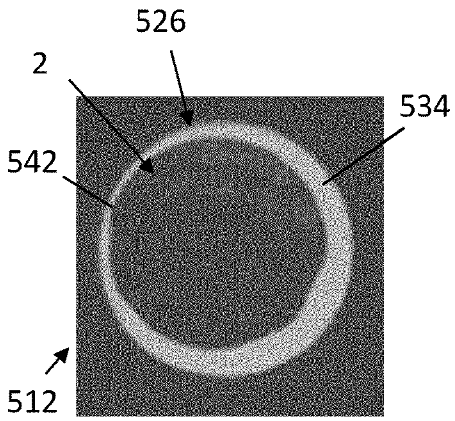

FIGS. 52*c* and 52*d* show an element 2 in place in the recess 534. In this example the element 2 is a faceted glass crystal comprising a flat table 538 and a pointed pavilion 540, joined by a girdle 542. These figures reveal that a dimension of each recess 534 is slightly greater than a dimension of the respective decorative element 2. In particular, each element presentation location 526 defines a circular recess 534 in an upper surface 544 of the base 512, and a diameter of this circular recess 534 is greater than a maximum diameter of the decorative element 2. This maximum diameter is the diameter of the decorative element 2 at its widest point: in this example, this maximum diameter is a diameter of the girdle 542 of the element 2 at its widest point.

As will be later described in the section entitled 'element presentation system' the configuration of the element support 16 allows elements 2 to be sorted quickly and easily into the element presentation locations 526 in a particular orientation, so that the elements 2 can be easily retrieved for application to the workpiece.

While the base 512 is depicted as being substantially horizontal across its entire area, it is envisaged that a part of the base 512 may be sloped. For example, in the element presentation area 524 the base 512 may be horizontal, while in the loose element area 522 the base 512 may slope downwardly away from the element presentation area 524, so as to guide movement of any decorative elements 2 not held in the recesses 534 away from the element presentation area 524.

For ease of manufacture and control, a single element support 16 is configured to hold decorative elements 2 of a single type. To this end, all the recesses 534 in the base 512 of the element support 16 are of the same shape and size. Different element supports 16 may be provided with different recess 534 shapes and sizes, so as to accommodate different decorative elements 2. For example, an element support 16 may be divided into two regions: one region having recesses 534 of a first shape and size, to accommodate a first element type; and another region having recesses 534 of a second shape and size, to accommodate a second element type. In this case, the element support 16 may be provided with a divider, to guard against mixing of the elements between the regions. It is envisaged that an element support 16 may additionally or alternatively be used to hold decorative elements of different colours simultaneously.

In one alternative embodiment of the element support 16, the base 512 can be formed of a single part rather than two layers. In this case, each element presentation location 526 can take the form of a recess in the upper surface of the single part that does not extend through to the lower surface. In this case, the entire base 512 may be made of a transparent material, or the base 512 may be transparent only beneath the recess.

In another alternative embodiment of the element support 16, each element presentation location 526 may take the form of an aperture extending all the way through the base 512. In this case, it will be appreciated that the diameter of the circular aperture is smaller than the maximum diameter of the decorative element 2, preventing the decorative element 2 from falling through the base 512. The element support 16 and its associated elements 2 are transported between the various regions of the machine 1 by way of an element transporter system, as will now be described.

Element Transporter System

Referring to FIG. 53 and FIG. 54, the element transporter system 550 comprises a shuttle 552 and at least two gripper systems 554, 556, each comprising a support gripper 558, 560.

The element transporter system 550 is configured to transport the element support 16 between four key regions: the element insertion location 7 at which the elements 2 are inserted into the machine 1, the element storage region where elements 2 are stored before use, the element sorting region where elements 2 are sorted into the presentation locations 526 on the support 16, and the element presentation region, in which the elements 2 are presented to the application system 28 for application to the workpiece 3. In the embodiment shown, these four storage regions are all located within the same y-z plane within the working volume 4, such that movement along only the y and z directions is required to move the element support 16 between these four regions.

The first and second support grippers 558, 560 are configured to move independently of one another across the four regions. To this end, as shown in FIG. 54, each support gripper system 554, 556 comprises a horizontal rail 562, 564 that extends along the y axis of the machine 1, and a carriage 566, 568 mounted to the rail 562, 564 for horizontal movement along it. Each support gripper 558, 560 is mounted to the carriage 566, 568 via an extension arm 570, 572 that is capable of raising and lowering the gripper 558, 560 in the z direction.

In this way, the grippers 558, 560 are controllable by the controller to move in the y-direction and in the z-direction in the working volume 4 of the machine 1.

The horizontal rail 562 of the first support gripper system 554 lies directly above the horizontal rail 564 of the second support gripper system 556. Both rails 562, 564 are of substantially the same length to allow the same range of horizontal movement for both support grippers 558, 560. In the first or upper gripper system 554 the carriage 566 and its related components are arranged generally above the extendable arm 570, while in the second or lower gripper system 556 the carriage 568 and its related components are arranged generally below the extendable arm 572. In this way, the carriages 566, 568 do not impede the region that lies between the vertical arms 570, 572. Thus the support grippers 558, 560 can move freely within the region between the arms 570, 572, with both support grippers 558, 560 able to access all locations between the arms 570, 572, without colliding with other parts of the transportation system 550. By retracting the first support gripper 558 upwardly, and the second support gripper 560 downwardly, one gripper can pass over the other as they move in the y-direction, thereby allowing the grippers 558, 560 to cross over each other.

The first and second support grippers 558, 560 are substantially the same and, considering the first support gripper 558 in more detail, the gripper 558 comprise a pair of gripper arms 574*a*, 574*b* (only one of which, 576*a*, is visible in FIG. 54). The two gripper arms 574*a*, 574*b* are configured to simultaneously move together and apart in the y-direction upon instruction from the controller, such that a spacing between the arms 574*a*, 574*b* can be reduced and increased respectively. When the controller instructs the gripper arms

574*a*, 574*b* to move together either side of the element support 16, the arms 574*a*, 574*b* are configured to locate in the recesses 516 of the element support 16, such that the support gripper 558 engages with the element support 16.

The process by which the element transporter system 550 transports the element support 16 through the machine 1 will now be described.

Once the element support 16 complete with decorative elements 2 is in position in the element input drawer, the support 16 is transported to the element receiving region of the machine 1 by the shuttle 552. This shuttle 552 may take the form of a conveyor or may be the element input drawer 8 itself, where transport of the element support 16 to the element receiving region is effected by insertion of the drawer 8.

As with the workpiece input drawer 6, the element input drawer 8 is physically separated from other moving elements of the machine 1, allowing the operator to load the element support 16 into the machine whilst the machine 1 is in operation. Allowing simultaneous loading and operation permits higher machine throughput than would otherwise be possible, and avoids the need for machine downtime while workpieces and decorative elements 2 are being loaded into the machine 1, thereby improving machine utilisation.

In response to a signal that the element support 16 has been received at the element receiving region, the controller causes the first support gripper 558 to align with the element support 16 at the element receiving region in the y-direction. The controller subsequently controls the first support gripper 558 to engage with the element support 16 and to move in the y-direction, transporting the element support 16 and elements 2 from the element receiving region to the element storage region of the machine 1.

Figure 55:
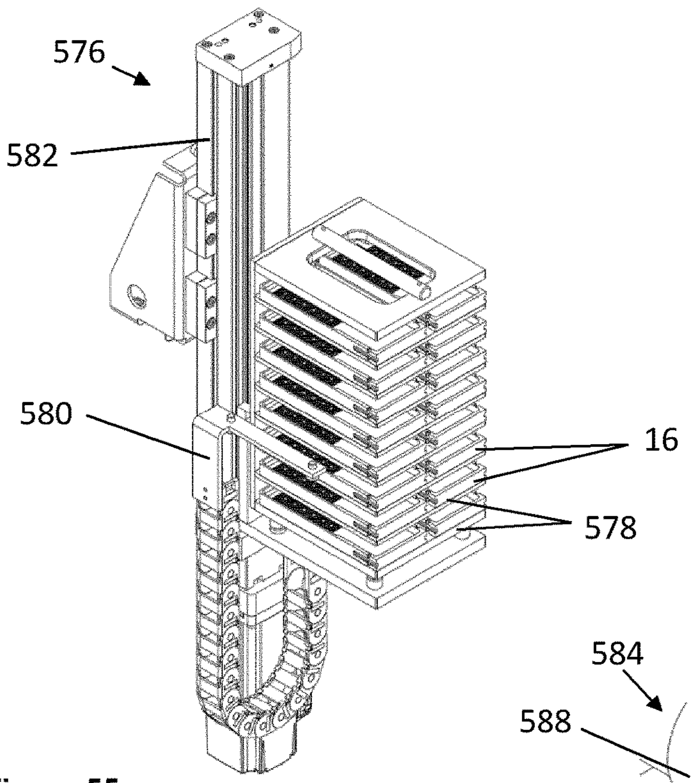
FIG. 55 shows a perspective view of an element cassette of the machine of FIG. 1*a;*

In the element storage region, the machine 1 is provided with an element cassette 576, shown in FIG. 53 and, in more detail, in FIG. 55. The element cassette 576 defines a plurality of support storage regions disposed vertically, one above the other, in the z-direction. Each of these support storage regions comprises a platform 578 that is capable of holding a single element support 16. In this way, the cassette 576 is capable of temporarily holding a plurality of element supports 16 in a stacked arrangement.

Referring to FIG. 55, the element cassette 576 is mounted to a carrier 580 configured to run along a track 582 that is parallel to the z-direction, such that the element cassette 576 can be moved upwardly and downwardly to various positions within the machine 1 as required, bringing different support platforms 578 into alignment with the grippers 558, 560.

When the first support gripper 558 reaches this element storage region, the first support gripper 558 is controlled to locate the element support 16 on a platform 578 within the element cassette 576 and the gripper arms 574 of the first support gripper 558 separate in the y-direction, such that the support gripper 558 disengages from the element support 16. In practice, locating the element support 16 within the element cassette 576 may comprise movement of both the element cassette 576 and the first support gripper 558.

The first support gripper 558 is then transported away from the element support 16. The element support 16 can be held in this element cassette 576 until the machine 1 is ready to proceed with the sorting operation.

When an element support 16 is to be retrieved for use, the controller outputs instructions to cause the first support gripper 558 and element cassette 576 to reverse the previous movement, moving back towards the element support 16 in the y- and/or z-direction. Once the first support gripper 558 is aligned with the element support 16, the controller instructs the first support gripper 558 to engage with the element support 16, and to transport the element support 16 in the y- and z-direction to the element sorting region 559, visible in FIG. 53 and shown in FIG. 56 and described in more detail below in the section entitled "element presentation system". The first support gripper 558 subsequently disengages with the element support 16 and moves away to a rest position or to perform another task.

In the event that the machine 1 is ready to sort the decorative elements 2 in an element support 16 just received at the element receiving region, it is envisaged that the controller can control the first support gripper 558 to transport the element support 16 directly to the element sorting region 559, effectively bypassing the element storage region and element cassette 576.

After sorting, when the elements 2 are required for application, the controller instructs the first support gripper 558 (not visible in FIG. 56 but visible in FIG. 53) to move in the y- and/or z-direction to align with the element support 16, to engage with the element support 16 and to transport the element support 16 from the element sorting region to the element presentation region. In the element presentation region, the element support 16 is held in position by the first support gripper 558.

In the element presentation region, the elements 2 are retrieved by the element application system 28 for application to the workpiece 3.

The second support gripper 560 is configured to operate the same sequence of steps as the first support gripper 558, and is controlled by the controller to operate simultaneously with the first support gripper 558. For example, while the first support gripper 558 holds the element support 16 in the presentation region, it is envisaged that the second support gripper 560 can simultaneously be transporting another element support 16 to the cassette 576 or to the sorting platform 578. In an alternative arrangement, the first and second support grippers 558, 560 may each carry out separate, dedicated steps of the sequence, such that both the first and second support grippers 558, 560 are used in the transportation of a single element support 16 from the element insertion location 7 to the element presentation region. The element presentation system 24, which is configured to sort the elements 2 into the element presentation locations 526 on the support 16, and to present and assess the elements 2 for application, will now be described in more detail.

Element Presentation System

Figure 56:
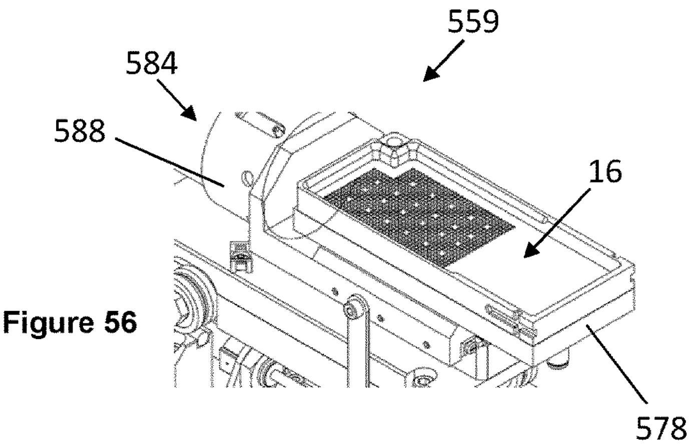
FIG. 56 shows a perspective view of the element support of FIG. 52*a* at an element sorting region of the working volume of FIG. 1*b;*
Figure 57:
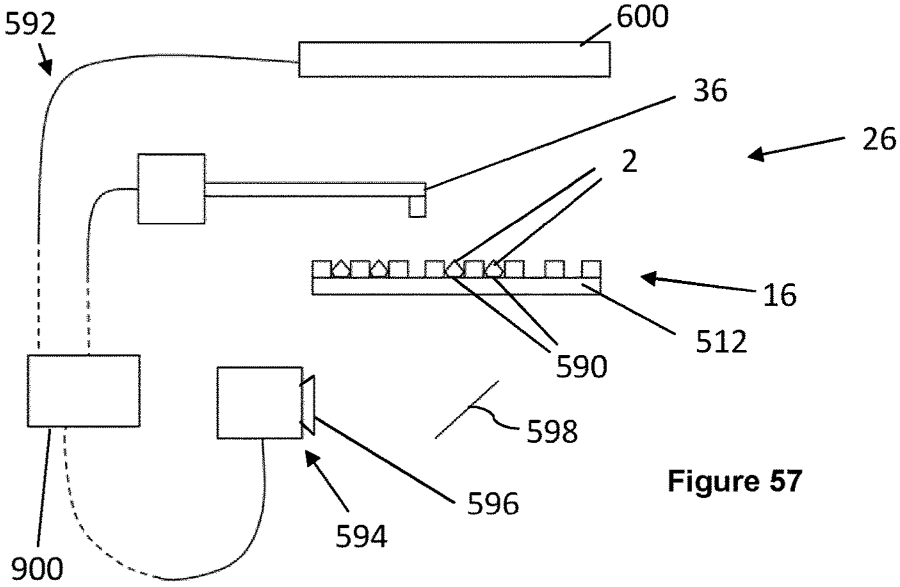
FIG. 57 shows a schematic view of the element presentation system of FIG. 1*b;*

Turning now to FIGS. 56 and 57, the element presentation system 24 comprises the element support 16 described above, actuation means 584 for vibrating the element support 16, an element sensor system 26 configured to detect or to monitor a characteristic of the decorative element, and the controller 900.

The actuation means 584 is located at the element sorting region, and takes the form of a planar sorting platform 578, attached at one end to a vibration module 588 (shown in FIGS. 55 and 56). The vibration module 588 is configured to vibrate the platform 578 back-and-forth in one direction: in this example, the x-direction. The first support gripper 558 of the element transportation system 550 is controlled to place the element support 16 on this sorting platform 578 prior to disengaging.

To execute a sorting operation, the element support 16 is arranged on the sorting platform 578, and the controller 900 transmits a signal to the vibration module 588, to vibrate the sorting platform 578 and element support 16 in a predetermined pattern. This vibration causes the elements 2 to move back and forth relative to the base 512 of the support 16, and the back and forth motion causes decorative elements 2 to fall into the respective recess 534, with a single element 2 in each recess 534.

Where the elements 2 are faceted crystals, for example of the type shown in FIG. 52*c*, the elements 2 have a strong tendency to fall into the recesses 534 in a particular orientation, assisted by a moment acting about the centre of gravity of each decorative element 2.

In particular, each decorative element 2 has a presentation face 590, which is intended to be visible when the element 2 is fixed to the workpiece and the article of jewellery is worn. For a faceted element 2, this presentation face 590 is typically the table 538 of the crystal. When the sorting platform 578 is vibrated, the elements 2 tend to fall into the recesses 534 such that this presentation face 590 is positioned downwardly within the recess 534, and is flush against the base 512, with the pavilion 540 pointing upwards, as shown in FIG. 52*c*. This inverted orientation is referred to as the 'presentation' orientation.

Once the sorting operation is completed, a majority of the recesses 534 are filled by respective decorative elements 2 for application to the workpiece 3, and the majority of these decorative elements 2 are in the presentation orientation. Any unsorted elements 2 will tend to congregate in the loose-element area 522 of the base 512, so as to leave the elements 2 in the recesses 534 accessible for retrieval.

After sorting, the elements 2 are ready for application, and the transportation system 550 transports the element support 16 to the element presentation region as has already been described above.

Once in the element presentation region, the element presentation system 24 is configured to monitor and assess the elements 2 presented on the element support 16.

Referring to FIG. 57, to this end, the element sensor system 26 of the element presentation system 24 comprises an image processing system 592, which includes a sensor 594, in the form of a camera 596, and a mirror 598 fixed in position in the machine 1 so as to sit beneath the base 512 of the element support 16 when the element support 16 is in the element presentation region. The mirror 598 is arranged at 45 degrees to the base 512 of the support 16 and at 45 degrees to the imaging direction of the camera 596, such that the mirror 598 faces both the camera 596 and the base 512 of the element support 16 at a 45 degree angle. In this way, the mirror 598 provides the camera 596 with a line of sight to the base 512 of the element support 16. Because the base 512 of the element support 16 is transparent at least in the element presentation locations 526, the element support 16 in turn provides the camera 596 with a line of sight to the decorative elements 2. Embodiments are also envisaged in which the camera 596 is arranged beneath the support 16 so as to image the element support 16 directly.

Advantageously, because the elements 2 are in the presentation orientation, with their presentation faces 590 being directed towards the transparent base 512, the line of site is provided to the presentation face 590 of each element 2. In this way, the camera 596 can image the presentation face 590.

Alternatively, a camera may be mounted to the decorative element applicator 30. In this event, it is envisaged that the controller 900 instructs movement of the camera in relation to the element support 16 and the element presentation locations 526 by causing the element applicator 30 to move in the x and z directions. Such an arrangement may be particularly beneficial when the decorative elements 2 have unusual or non-round cuts, or in which there is no geometric relationship between a presentation face of the decorative element 2 and a non-presentation face of the element 2 opposing this presentation face. Providing a camera with a view of the non-presentation face allows the controller 900 to detect and/or process the location, shape or contours of the decorative element 2 at the side of the element 2 at which it is to be retrieved by the element retriever arm 36, allowing the element retriever arm 36 to be accurately positioned with respect to the decorative element 2.

In the depicted embodiment, the mirror 598 is attached to the same carriage as the element retriever arm 36 (described in more detail later), which is moveable along the x axis. The element support 16 is movable along the y-axis by way of the second support gripper 560. This relative movement between the element support 16 and the mirror 598 can be controlled by the controller 900 to provide the camera 596 with a line of sight to one or more decorative elements 2 in different regions of the element support 16 in turn, while the elements 2 are being monitored. Coupling the mirror 598 to the element retriever arm 36 in this way ensures that the elements 2 imaged by the camera 596 correspond to the elements 2 that are to be retrieved by the element retriever arm 36.

The element presentation system 24 may additionally comprise a light source 600, the element support 16 being positioned between the 598 mirror and the light source 600, such that the light source 600 acts as a backlight for the camera 596. In this way, any decorative elements 2 present in the element support 16 are viewed by the camera 596 as darkened regions against a light background.

The camera 596 is configured to monitor or detect a number of characteristics of the decorative elements 2 held in the element support 12, such as element presence and orientation, and to monitor quality factors of the decorative elements 2, for example a shape parameter such as roundness, a colour parameter, a surface quality parameter, a dimension or an aspect ratio.

To monitor the presence of the decorative elements 2, for example, the camera 596 may be instructed by the controller 900 to take a number of images of the base 512 of the element support 16, and to transmit these images to the controller 900. The system 592 may comprise more than one light source, and a second light source may be positioned beneath the support 16, for example. With a single light source 600, the controller 900 can instruct the illumination of the support 16 using different light intensities, while, with multiple light sources, the controller 900 can control both the direction and intensity of illumination. In both cases, the controller 900 is able to capture and process images in which the illumination of the support 16 and decorative elements 2 varies.

Figure 58:
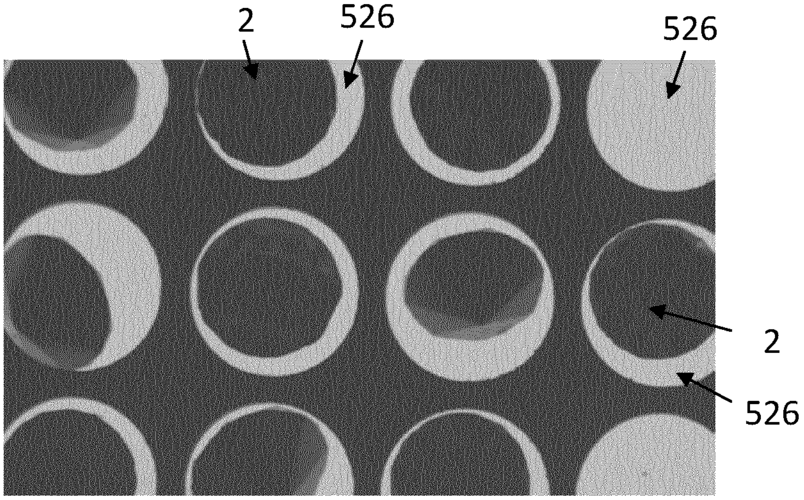
FIG. 58 shows an image of the element support of FIG. 52*a* captured by a camera of the element presentation system of FIG. 57.

An example of such an image is shown in FIG. 58. If an element presentation location 526 appears darkened in the image, a decorative element 2 is present is present at that location 526.

The controller 900 can therefore determine the number of locations 526 at which an element 2 is present. From this, the controller 900 can determine a fill rate for the element support 16, and can feed this information back into the element sorting process. For example, the fill rate may be used to determine whether the predetermined vibration pattern executed by the vibration module 588 needs modification, to increase the number of decorative elements 2 successfully locating in element presentation locations 526.

To monitor the orientation of a particular decorative element 2, the controller 900 is configured to capture one or multiple images of the element presentation location 526 of that particular decorative element 2, selecting the light source(s) used to illuminate the element presentation location 526 such that the nature of the illumination varies between images. The controller 900 determines an orientation of the decorative element 2 either through comparison of the images with stored image data, or through the analysis of the pattern of light and dark areas in the images and calculating a width or diameter of a darkened region in the images at a number of points and in a number of directions. Images are analysed using appropriate algorithms, and if the darkened region is determined to be oblong, or elongated in a particular direction, this may be an indication that the relevant decorative element 2 is not in the presentation orientation and that the presentation face 590 is not flush against the base 512 as expected.

The same images can be used by the controller 900 to determine a roundness of the particular decorative element 2, and the controller 900 can similarly analyse the images of the element presentation location 526 to determine whether the shape of the particular decorative element 2 is as expected. Again, the controller 900 can compare the images with stored image data, can analyse the evolution of light patterns between images, or can calculate the dimensions of darkened regions in the images.

In a simple scenario, an oblong darkened region corresponding to a particular decorative element 2 may be indicative of the decorative element 2 having poor roundness. The controller 900 can store or retrieve data corresponding to a threshold difference between a smallest diameter and a largest diameter of the darkened region. In the event that the difference between these diameters in the captured image exceeds the threshold difference, the controller 900 is configured to identify the decorative element 2 as defective. Further, if the largest diameter of the darkened region is determined to be smaller than a lower threshold value or larger than an upper threshold value for the maximum diameter of the decorative element 2, the controller 900 similarly identifies the decorative element 2 as defective, for being too small or too large for application to the workpiece 3.

It is envisaged that the controller 900 may alternatively instruct the camera 596 to capture only a single image of the element presentation location 526, and to determine the orientation and roundness of the decorative element 2 from this image.

The controller 900 is also configured to determine one or more colour values for the decorative element 2 from the captured images. The colour value may for example correspond to a parameter relating to a colour of the decorative element 2, or a parameter relating to a colour intensity of the decorative element 2. The controller 900 proceeds to compare each colour value to an expected colour value, or permitted colour value range for the decorative element 2. If the colour value does not match the expected colour value, or if it falls outside the permitted colour value range, the controller 900 again identifies the decorative element 2 as defective.

From these determinations, the controller 900 knows the predetermined element presentation locations 526 at which a decorative element 2 is present, and at which the present decorative element 2 has passed the checks for orientation, colour, size and shape, i.e. those locations at which the decorative element 2 is in the presentation orientation and has not been identified as defective. The controller 900 is advantageously configured to select only elements 2 that have passed the checks for application to the workpiece.

In other embodiments, information relating to the decorative element 2 characteristics may alternatively or additionally be obtained from an information carrier, such as a unique ID code, which may be provided for example on the decorative element support 16.

With the elements 2 presented and screened for application, the workpiece correctly located and oriented, and the precise element locations determined, the machine 1 can now apply the decorative elements 2 to the workpiece at the element locations. This application is carried out by the element application system 28, which will now be described in detail.

Element Application System

Figure 59:
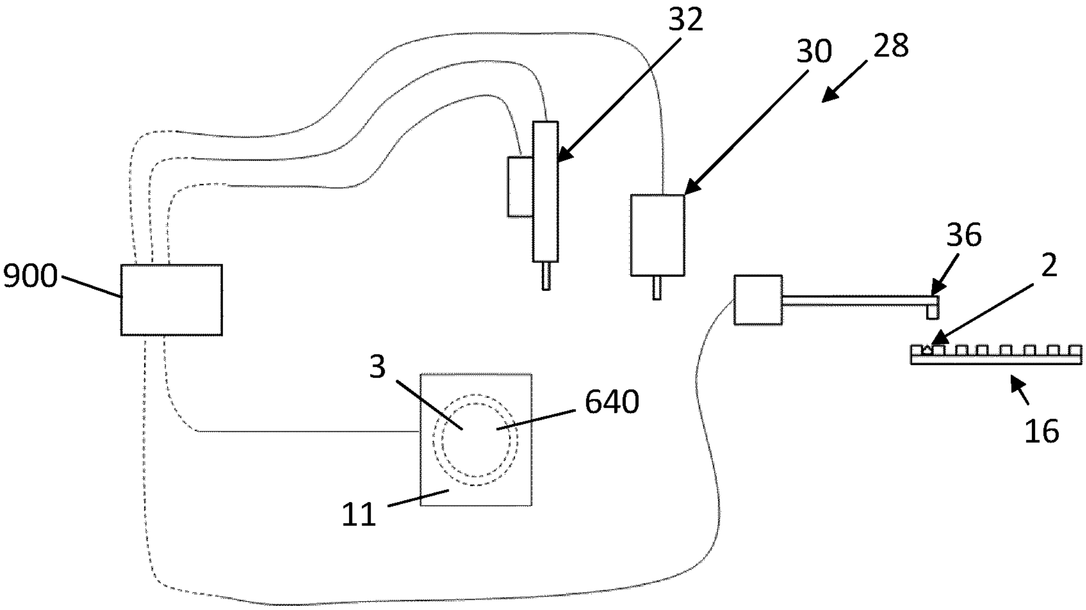
FIG. 59 shows a schematic view of the element application system of FIG. 1*b;*

FIG. 59 depicts the element application system 28. This system 28 comprises: the decorative element retriever arm 36, configured to retrieve each decorative element 2 from the element support 16; the element applicator 30, configured to receive each decorative element 2 from the retriever arm 36 and to apply each decorative element 2 at an application location; the adhesive applicator 32; and the controller 900. Also shown in FIG. 59 is the moveable workpiece support 11 and workpiece 3 to which the elements 2 will be applied.

Figure 60:
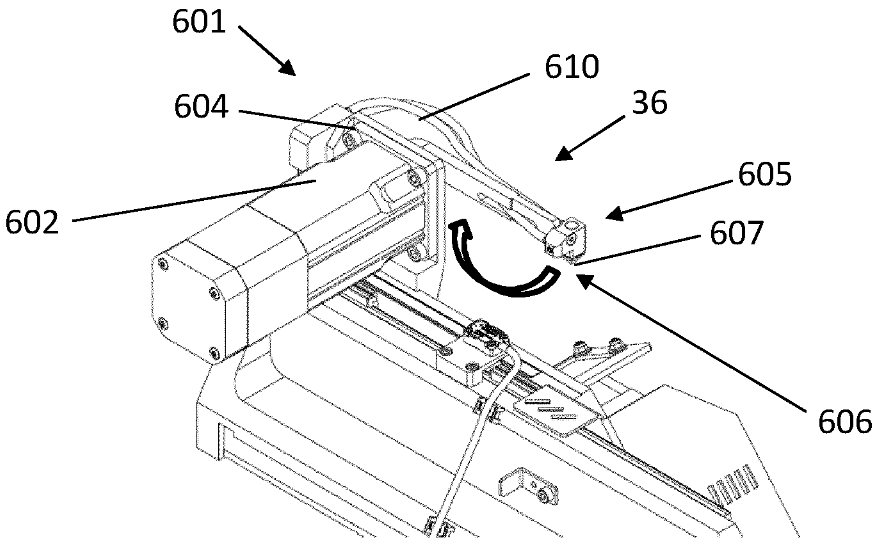
FIG. 60 shows a perspective view of a retriever arm of the element application system of FIG. 59.

The retriever arm 36, shown in more detail in FIG. 60, is an elongated component, connected at a first end 601 to a carriage by way of a pivot 604, or central shaft to allow pivotal movement about the pivot 604. At a second end 605 of the retriever arm 36, opposite the first end 601, the retriever arm 36 comprises a downward-facing nozzle 606. A bore (not shown) extends through a tip 607 of the nozzle 606 and is fluidly connected to tubes 610 that extend along the retriever arm 36 to a vacuum pump (not shown). In use, a vacuum can be applied by the vacuum pump, creating suction at the nozzle tip 607 and permitting the retriever arm 36 to retrieve a decorative element 2 from the element support 16.

Figure 64A:
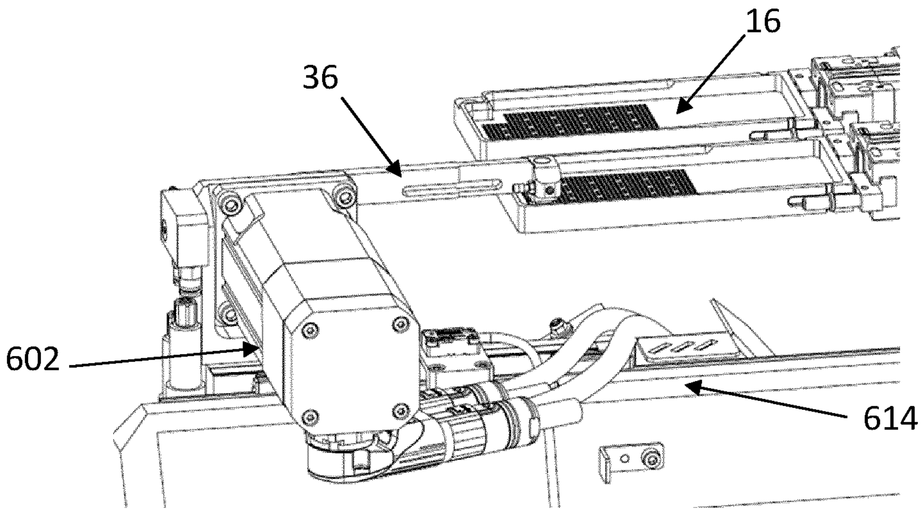
FIGS. 64*a* and 64*b* show a perspective view and a schematic side view, respectively, of the retriever arm of FIG. 60 contacting a decorative element supported by the element support of FIG. 52*a;*

The carriage to which the retriever arm 36 is mounted is itself mounted to a track 614, shown in FIG. 64*a*, extending parallel to the x direction, such that the retriever arm 36 can be transported towards and away from the element support 16 when it is positioned at the element presentation region.

In addition, the retriever arm 36 is configured to be pivotable through at least 180 degrees about the central shaft 604, around an axis parallel to the y-axis. In this particular embodiment, the retriever arm 36 can pivot downwardly, in an arc that defines the lower part a circle. In this way the retriever arm 36 can extend in the x direction either rightwards, such that the nozzle 606 is located over the element support 16 in the element presentation region with the nozzle 606 facing downwards, or leftwards, so that the nozzle 606 is located under the element applicator 30 in a handover location, with the nozzle 606 facing upwards.

Figure 61:
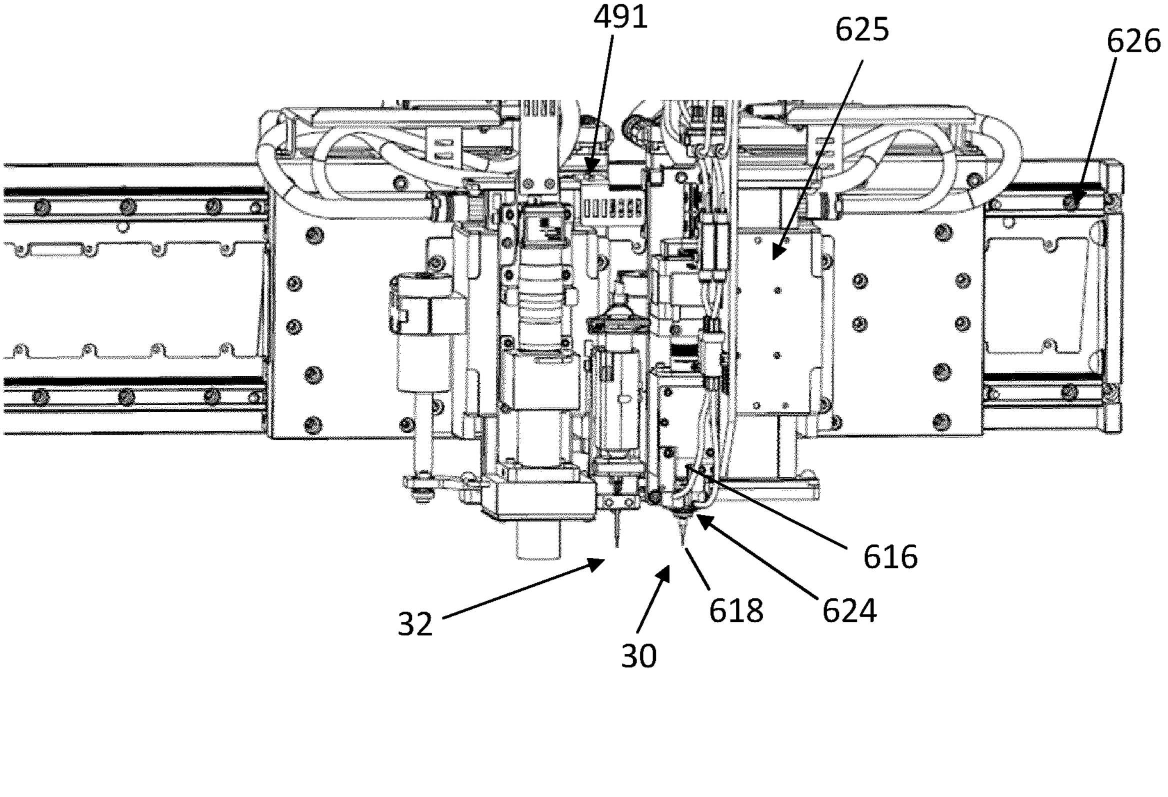
FIG. 61 shows a perspective view of an element applicator and an adhesive applicator of the element application system of FIG. 59.
Figure 62:
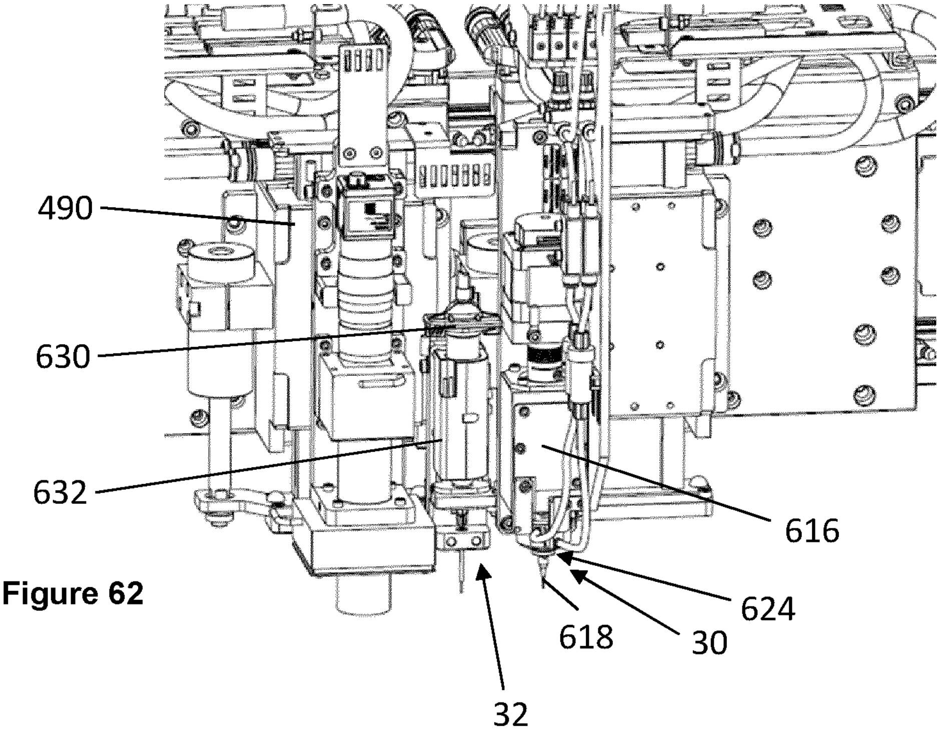
FIG. 62 shows another perspective view of the element applicator and adhesive applicator of FIG. 61.

The element applicator 30, shown in more detail in FIG. 61 and FIG. 62, also comprises a main body 616 and a nozzle 618 connected to the main body 616. Similarly to the retriever arm 36, the nozzle 618 of the element applicator 30 comprises a bore (not shown) that is fluidly connected to a vacuum pump (not visible), such that a vacuum can be generated in the region of the nozzle 618 in use. The element applicator 30 and retriever arm 36 may each be connected to the same vacuum pump, or may be provided with individual vacuum pumps.

The element applicator 30 additionally comprises an application sensor 624, which provides data to the controller associated with a force applied by the element applicator nozzle 618 to the workpiece. The application sensor 624 may take the form of a proximity sensor, for example, which detects a distance between a reference feature of the nozzle 618 and a reference feature of the main body 616 of the element applicator 30. The controller can be configured to determine an application force based on a known relationship between this distance and force.

The element applicator 30 is carried by a carriage 625 that is mounted to a track 626. The track 626 to which the element applicator carriage 625 is mounted also runs parallel to the x direction, such that the element applicator 30 can move back and forth in the x direction, between the handover location and the workpiece working region.

The adhesive applicator 32, also shown in FIGS. 61 and 62, is carried by a further carriage 491 that is mounted to the same track 626 as the element applicator 30, such that the adhesive applicator 32 can move back and forth in the x direction along the same path as the element applicator 30. The adhesive applicator 32 comprises a syringe 630 and a support structure 632. The syringe 630 can be mounted securely in the support structure 632, and is configured to hold adhesive for application to the workpiece 3. The syringe 630 is removable from the support structure 632 by an operator, allowing the adhesive to be replaced during maintenance operations or between operator shifts, for example. The adhesive applicator 32 additionally comprises an adhesive application sensor, which operates in the same way as is described above in relation to the application sensor 624 of the element applicator 30. Based on sensor readings from the adhesive application sensor, and based on the location of the adhesive applicator 32, the controller can detect a height to which adhesive is applied to a cavity of the workpiece 3.

The carriages 625, 491 of the element applicator 30 and the adhesive applicator 32 additionally each comprise an actuator (not visible). These actuators are configured to actuate individually upon instruction from the controller, to move the carriages 625, 491 in the z-direction. In particular, movement in the z direction moves the element applicator 30 or the adhesive applicator 32 towards and away from the workpiece 3. When actuated in this way, the element applicator 30 will apply an element 2 at an element application location, defined by the position of the element applicator 30, and the adhesive applicator 32 will apply adhesive at a dispensing location, defined by a position on the adhesive applicator 32.

The process by which the decorative elements 2 are applied to the workpiece 3 will now be described.

Figure 63:
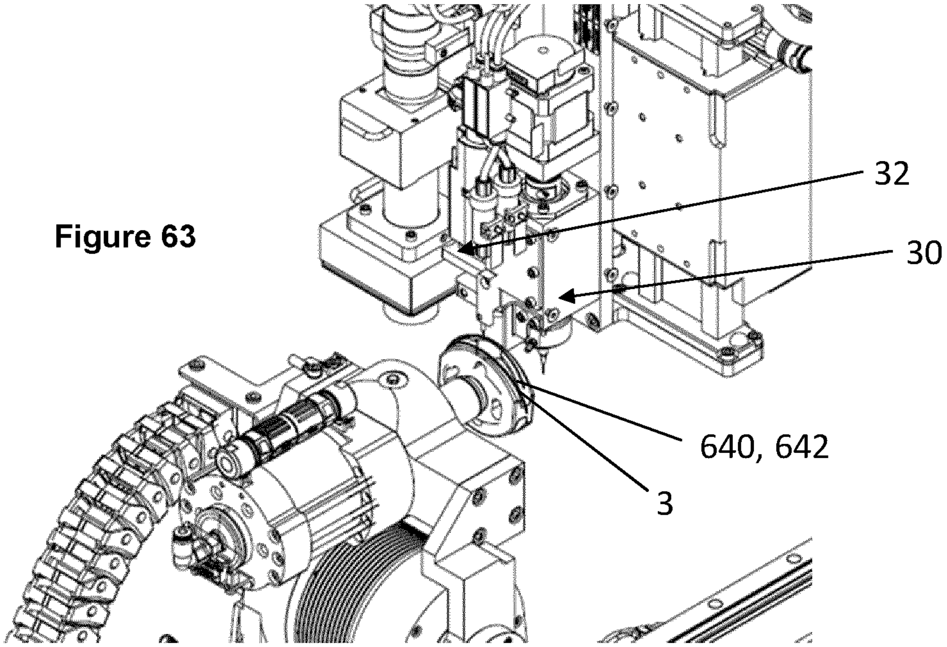
FIG. 63 shows a perspective view of the adhesive applicator of FIG. 61 applying adhesive to a workpiece.

Referring first to FIG. 63, in the event that the decorative elements 2 are to be cavity-set, the controller receives information as to the location of a first element location 640 corresponding to a first cavity 642, and instructs the adhesive applicator 32 to apply a desired amount of adhesive to the first cavity 642 at the first element location 640.

In particular, the controller outputs signals causing relative movement between the workpiece 3 and the adhesive applicator 32 such that the first element location 640 and the dispensing location of the adhesive applicator 32 align.

The controller causes the workpiece manipulation system 18 to move the workpiece 3 so that the first element location 640 is facing directly upwards. Once the first element location 640 and the dispensing location are aligned, the controller instructs the actuator 638 of the adhesive applicator 32 to move the adhesive applicator 32 in the z-direction to meet the workpiece 3, before instructing the adhesive applicator 32 to dispense the desired amount of adhesive to the cavity 642 at the first element location 640. The process by which the desired amount of adhesive is determined and the adhesive is applied to each cavity 642 is described in more detail below, in relation to the adhesive regulation system 34.

Over a number of steps, depicted in FIG. 64 to FIG. 67, the decorative element 2 is then transported from the element support 16 to the application location.

For a cavity-set decorative element 2, in parallel to the process by which the workpiece locating system 20 locates and orients the workpiece 3 and adhesive applicator 32 for the adhesive application at the first cavity 642, the retriever arm 36 is instructed by the controller to retrieve a first decorative element 2 from the element support 16. For an Epoxy clay-set decorative element, the retrieval of the decorative element 2 marks the first step in the element application process.

As mentioned above, the retriever arm 36 is movable along the x-axis towards and away from the element tray 510, while the second support gripper 560 is capable of moving the element tray 510 along the y-axis, perpendicular to the x-axis. In this way, the controller can instruct the retriever arm 36 and second support gripper 560 to move simultaneously, allowing fast alignment of the retriever arm 36 with a particular predetermined element presentation location 526 of the first decorative element 2 to be applied. As noted above, the controller may direct the retriever arm 36 only to predetermined element presentation locations 526 having elements 2 that have passed the screening procedure. The simultaneous motion of the retriever arm 36 and element support 16, in addition to the execution of process steps in parallel, advantageously serves to increase machine throughput and utilisation.

Figure 64B:
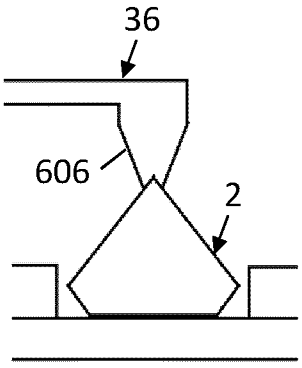

Once the controller determines that the retriever arm 36 is in position above the element support 16 and aligned with the desired element presentation location 526, the controller outputs a signal to cause the retriever arm 36 to rotate about the y-axis, such that the nozzle 606 of the retriever arm 36 is lowered and contacts the first decorative element 2 as shown in FIG. 64*a*. At this stage, the controller transmits a signal to the vacuum pump of the retriever arm 36, generating a vacuum in the region of the nozzle 606, such that suction is applied to the decorative element 2. This suction holds the first decorative element 2 tight to the nozzle 606, as shown in FIG. 64*b*.

Figure 64C:
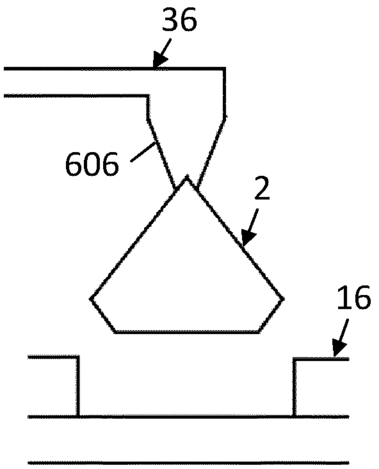
FIG. 64*c* shows a schematic side view of the retriever arm of FIG. 60 retrieving a decorative element from the element support of FIG. 52*a*, with the decorative element in a presentation orientation.
Figure 64D:
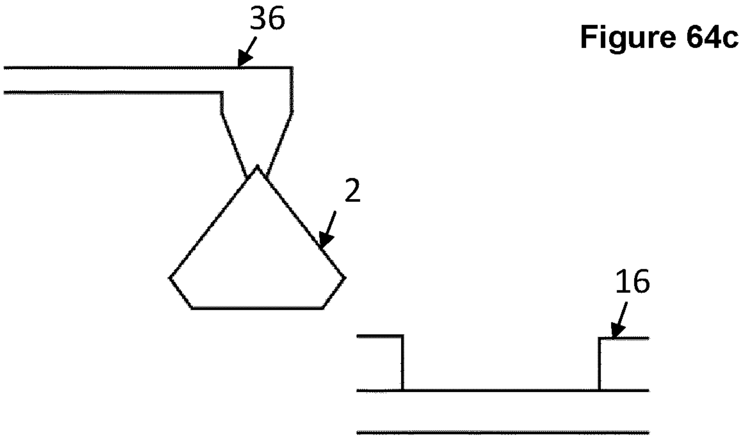
FIG. 64*d* shows another schematic side view of the retriever arm of FIG. 60 retrieving a decorative element from the element support of FIG. 52*a*, with the decorative element in a presentation orientation.
Figure 65A:
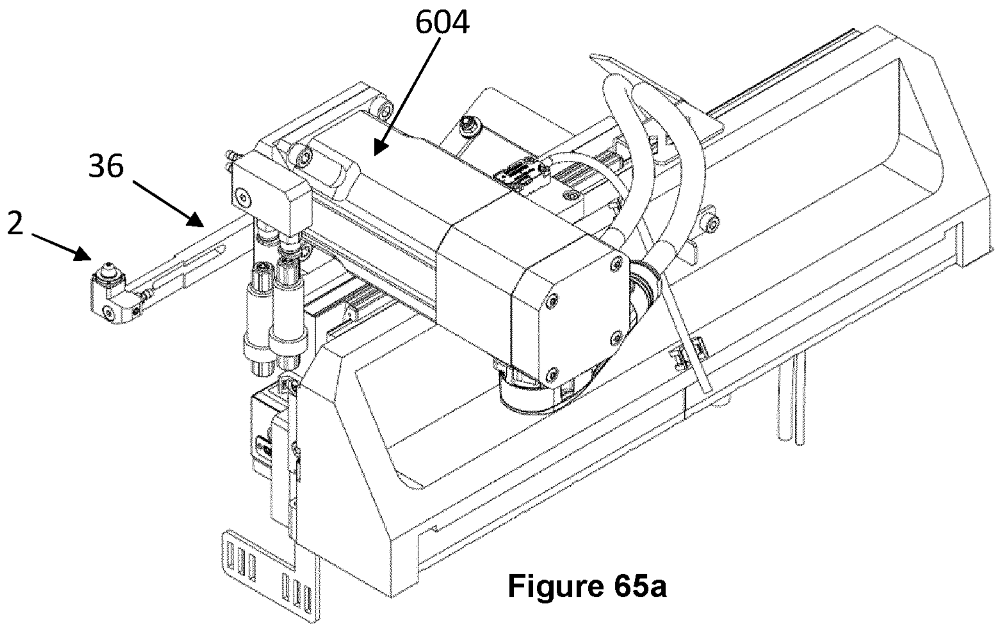
FIG. 65*a* shows a perspective view of the retriever arm of FIG. 60 in a rotated position, with the decorative element in an application orientation.
Figure 65B:
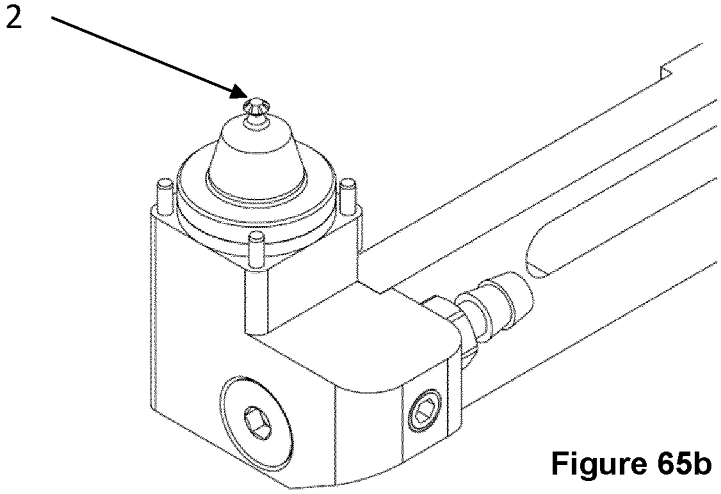
FIG. 65*b* is another perspective view of the retriever arm of FIG. 60 in a rotated position, with the decorative element in an application orientation.
Figure 65C:
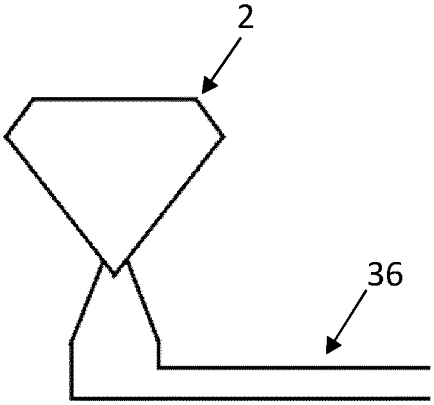
FIG. 65*c* is a schematic side view of a nozzle of the retriever arm of FIG. 60, with the decorative element in an application orientation.

The retriever arm 36 is then raised slightly to lift the decorative element 2 clear of the element support 16, as shown in FIG. 64*c*. The retriever arm 36 is then moved in the x direction, away from the element support 16 so that the decorative element 2 lies to the left of the element support 16, before the controller instructs the retriever arm 36 is to rotate about the central shaft 604. This rotation takes the decorative element 2 through approximately 180 degrees as shown in FIG. 65*a*. In this configuration, the decorative element 2 has been rotated so as to invert it from the presentation orientation to an application orientation, as shown in FIG. 65*b* and FIG. 65*c*. This application orientation is the orientation of the decorative element 2 when the decorative element 2 is applied to the workpiece 3, with the presentation face of the decorative element 2 visible to an observer. Since the rotation step effectively inverts the decorative element 2, the decorative element retriever arm 36 can also be referred to as a decorative element inversion arm.

This rotation of the decorative element 2 by way of the decorative element retriever arm 36, and any simultaneous motion of the arm 36 along the x-axis, also transports the decorative element 2 from the element presentation region to the handover location. As the decorative element 2 is rotated to this position, the carriage 625 of the element applicator 30 is simultaneously moved along the respective track 626 in the x-direction towards the handover region, following instruction from the controller. Movement ceases when the decorative element applicator 30 is vertically above, and aligned with, the element 2 held by the retriever arm 36 in the handover location.

Figure 66A:
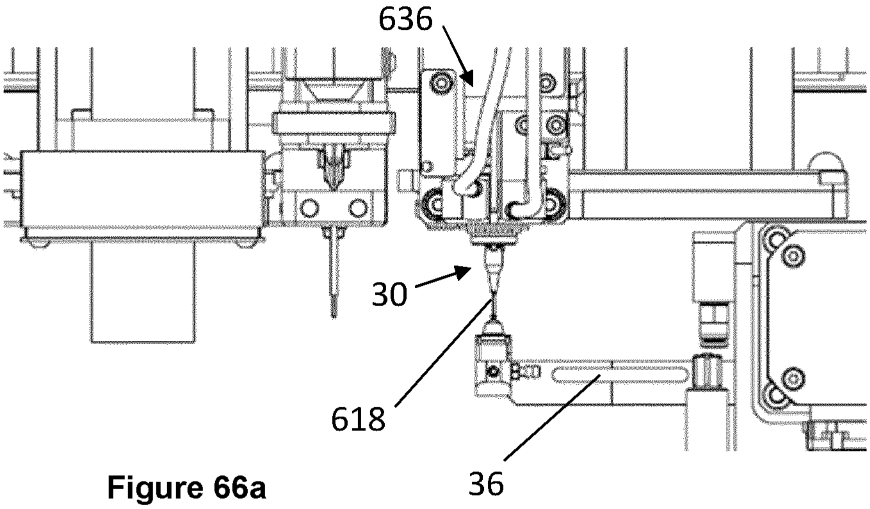
FIG. 66*a* is a perspective view of the element applicator of FIG. 61 contacting the decorative element held by the retriever arm of FIG. 60.
Figure 66B:
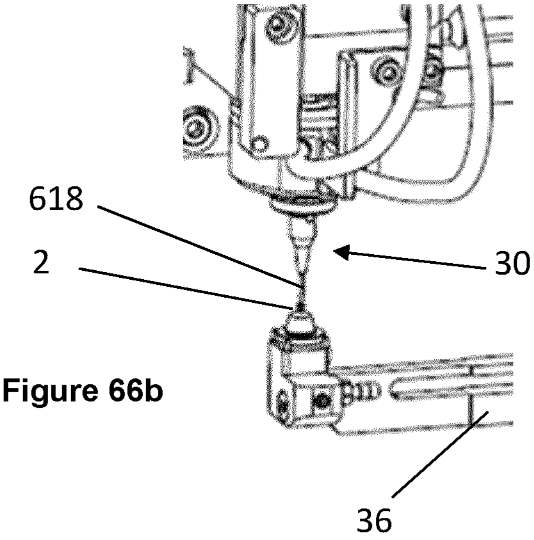
FIG. 66*b* is another perspective view of the element applicator of FIG. 61 contacting the decorative element held by the retriever arm of FIG. 60.

The controller next instructs the actuator 636 of the element applicator 30 to lower the applicator along the z-axis towards the retriever arm 36, until the nozzle 618 of the decorative element applicator 30 meets the first decorative element 2. This step is depicted in FIGS. 66*a* and 66*b*.

Figure 66C:
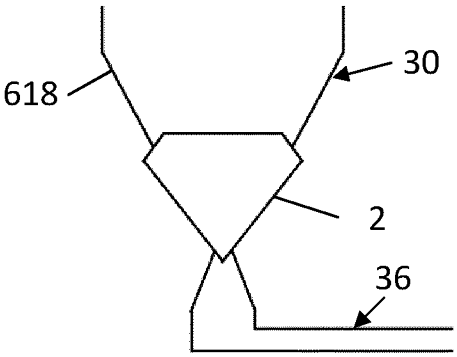
FIG. 66*c* is a schematic side view of the a nozzle of the element applicator of FIG. 61 contacting the decorative element held by a nozzle of the retriever arm of FIG. 60.

At this time, the controller simultaneously outputs signals to the vacuum pumps of each of the retriever arm 36 and the element applicator 30, causing the retriever arm 36 to cease applying suction to the first decorative element 2, and generating a vacuum at the nozzle 618 of the element applicator 30, causing the applicator 30 to begin applying suction. In this way, the decorative element 2 is quickly and securely handed over from the retriever arm 36 to the element applicator 30, as shown in FIG. 66*c*.

The retriever arm 36 then returns to the element presentation region to retrieve another element 2, by reversing the steps described above.

While the retrieval arm 36 retrieves another decorative element 2, the element applicator 30 applies the decorative element 2 to the workpiece 3.

To achieve this, the controller outputs signals causing the element applicator 30 to rise along the z-axis away from the retriever arm 36 and to move along the x-axis towards the workpiece working region, until the application location of the element applicator 30 is aligned with the first element location 640 of the workpiece 3. If appropriate, the controller may simultaneously instruct movement of the manipulator arm 472 to achieve this alignment. For example, the controller may instruct movement of the element applicator 30 in the x direction and movement of the manipulator arm 472 in the y direction.

The decorative element applicator 30 is then lowered along the z-axis until the element 2 is located in the first element location 640.

Figure 67:
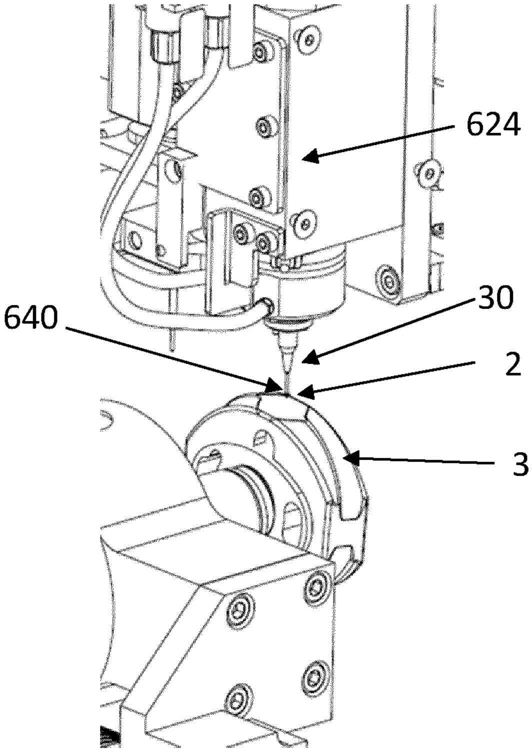
FIG. 67 is a perspective view of the element applicator of FIG. 61 applying the decorative element to a workpiece.

In the event that the element 2 is cavity-set and, the first element location 640 will be a cavity 642, which has had adhesive applied by the adhesive applicator 32. In this case, as the element applicator 30 is lowered, the first decorative element 2 meets the adhesive and is pressed into the adhesive, as shown in FIG. 67. As mentioned above, the adhesive applicator 32 comprises an adhesive application sensor 634, which enables the controller to determine a height to which adhesive has been applied to a cavity. The controller is therefore able to determine a height of the element applicator 30 along the z-axis that will be necessary for the successful application of a decorative element 2 to the adhesive, and positions the element applicator 30 accordingly.

In the event that the first element location 640 instead corresponds to a position on an Epoxy clay portion of the workpiece 3, the decorative element applicator 30 similarly lowers along the z-axis. In this case, the controller receives signals from the application sensor 624 of the applicator 30, which indicates a force with which the decorative element 2 is being applied to the Epoxy clay. Once the controller determines that the force has exceeded a threshold force, the first decorative element 2 is determined to have been successfully embedded in the Epoxy clay at the first element location 640.

Once the decorative element 2 has been applied at the first element location 640, the controller outputs a signal to turn off the vacuum pump of the element applicator 30, causing the nozzle 618 of the element applicator 30 to cease applying suction to the first decorative element 2. The decorative element applicator 30 is then instructed to rise away from the workpiece 3 along the z-axis, leaving the decorative element 2 in place.

The element applicator 30 is then moved along the x-axis back to the hand over location to retrieve another decorative element 2 for application.

The workpiece manipulation system 18 then moves the workpiece 3 so as to locate and orient a new element location ready for application of a new element 2, and the process repeats, until an element 2 has been applied at each element location.

It will be appreciated that in this embodiment, the element applicator 30 is configured to apply the element 2 directly downwardly in the z direction. The workpiece 3 is therefore arranged for application with the corresponding element location 640 facing directly upwardly. For example, where the elements 2 are cavity set, the cavity 642 is arranged to face directly upwardly. Where the elements 2 are Epoxy clay set, the workpiece 3 is arranged so that the element application is substantially perpendicular to the surface of the Epoxy clay in the element location.

In the event that the decorative elements 2 are cavity-set, once the first decorative element 2 has been applied at the first element location 640 of the workpiece 3, the adhesive regulation system 34 is used for quality control purposes, and is configured to check whether the element 2 has been successfully and properly applied.

Once the adhesive regulation system 34 determines correct application of the decorative element 2, the process described in relation to the element application system 28 and adhesive regulation system 34 is repeated for each further decorative element 2. Again, for cavity-set decorative elements 2, in the second iteration of the process, the controller outputs signals to the adhesive applicator 30 and manipulator arm 472 to align the dispensing location with the second element location, for application of the adhesive. The controller subsequently outputs signals to the element applicator 30 and the manipulator arm 472 to align the element application location with the second element location, for application of the second decorative element 2, and so on until all the elements 2 have been applied.

Adhesive Regulation System

The adhesive regulation system 34 is configured both to determine a desired amount of adhesive to be applied to the element location, and, subsequently, to act as a quality control system that determines whether a decorative element 2 has been successfully applied at the element location of the workpiece 3.

The adhesive regulation system 34 comprises first and second sensor systems and the controller.

The first sensor system is a workpiece sensor system and comprises a first sensor in the form of a camera, which corresponds to the camera 490 of the workpiece locating system 20, visible in FIG. 49, and is therefore mounted to the same carriage 491 as the adhesive applicator 32, such that the camera 490 moves with the adhesive applicator 32. The first sensor system additionally comprises the adhesive application sensor 634 and a first processor, configured to process signals transmitted from the first camera 490.

The second sensor system is an element sensor system, and similarly comprises a second processor and a second sensor in the form of a camera. The second processor is configured to process signals transmitted from the second camera. The second camera corresponds to the camera 596 described in relation to the element presentation system 24 above, visible in FIG. 57, and is therefore mounted beneath the element support 16 when the element support 16 is in position in the element presentation region. This second camera 596 is provided with a line of sight to the predetermined element presentation locations 526 of the element support 16, so as to image elements 2 located at the presentation locations 526.

The controller is that described previously in relation to the other systems of the machine 1, and comprises one or more processors. The first and second processors of the sensor systems may themselves form part of the controller.

The process by which the adhesive regulation system 34 is used to determine the amount of adhesive to be applied to a cavity will now be described.

First, the controller outputs signals to cause the visual field of the first camera 490 to align with the element location 640 to which the first decorative element 2 is to be applied. To this end, the signal causes the carriage 476*c* of the workpiece manipulator arm 472 and the carriage 491 that supports the first camera 490 to cause relative movement between the workpiece and the camera 490, such that the first element location 640 is arranged within the visual field of the first camera 490.

The first sensor system is configured to detect a number of characteristics of the first element location 640, and, specifically, detects one or more characteristics of the cavity 642 at this location. These detected characteristics may include: a maximum diameter of the cavity 642, a roughness of an internal surface of the cavity 642, a depth of the cavity 642 and an angle of an internal surface of the cavity 642. The depth of the cavity 642 can be detected using the adhesive application sensor 634. In particular, the controller causes the adhesive applicator nozzle 618 to align with the cavity 642, before instructing movement of the adhesive applicator 32 along the z-axis. The adhesive application sensor 634 detects contact between the nozzle 618 and the workpiece at the location of the cavity 642, and transmits this information to the controller, which ceases movement of the adhesive applicator 32.

The controller then records the position of the adhesive applicator nozzle 618, and by association, the depth of the cavity 642.

To detect the remaining characteristics, referring to FIG. 51 the first camera 490 captures an image of the first element location 640, which it transmits to the first processor of the first sensor system.

The controller is then configured to determine the required characteristics of the cavity 462 from the image received from the first camera 490, and to calculate a desired adhesive amount in dependence on these characteristics. As an example, for a cavity 642 having a relatively large maximum diameter, the controller determines that a larger amount of adhesive will be required than for a cavity 642 having a relatively small maximum diameter.

The calculations executed by the controller additionally account for properties of the adhesive itself, such as a viscosity of the adhesive. The viscosity of the adhesive can be a known value, inputted into the machine 1 by a machine operator, or a viscosity value can be determined by the adhesive regulation system 34 during operation of the machine 1.

In the latter case, the adhesive regulation system 34 additionally comprises a test system, comprising the first sensor system and a test plate having a number of test locations. Upon instruction from a machine operator to check the viscosity of the adhesive, the controller instructs movement of the adhesive applicator 32 to the test plate. A dispensing location of the adhesive applicator 32 is aligned with a test location of the test plate, and the controller instructs the adhesive applicator 32 to dispense a known quantity of adhesive to the test location.

The controller then instructs alignment of the first camera 490 with the test location, and the camera 490 captures an image of the dispensed adhesive. Upon receipt of this image, the controller can determine a diameter of the adhesive. Through comparison with a previously-determined diameter associated with the same known quantity of adhesive, the controller subsequently calculates a viscosity of the adhesive. In the event that the diameter of the adhesive in the test location is smaller than the previously-determined diameter, for example, the controller determines that the properties of the adhesive have changed and that the adhesive has become more viscous.

Alternatively, the viscosity of the adhesive in the test location can be calculated by the controller based on a known relationship between adhesive viscosity and adhesive diameter.

Turning now to the second sensor system, this system is configured to detect a number of characteristics of a first decorative element 2 to be applied to the workpiece 3. These characteristics can include a maximum diameter of element 2 and a roundness of the element 2, for example.

Referring to FIG. 57, the second camera 596 is configured to capture an image of the first decorative element 2 through the base 512 of the element support 16, and to transmit this image to the controller. This image may be the same image that is used by the element presentation system 24 to screen elements 2 for application, such that the element presentation system 24 and adhesive regulation system 34 make use of the same data and information to determine both the quality of an element 2 and a desired amount of adhesive to be applied for that element 2, respectively.

The first and second cameras 490, 596 can be instructed by the controller to detect characteristics of the cavity 642 and decorative element 2 and to transmit images to the controller substantially simultaneously, reducing the processing time required to determine the desired adhesive amount.

Upon receipt of the image from the second camera 596, the processor of the second sensor system is configured to determine an element parameter such as the maximum diameter of the decorative element 2 and the roundness of the element 2, for use in calculating the desired amount of adhesive.

As such, the controller can advantageously determine the desired amount of adhesive to be applied at the chosen element location in dependence on characteristics of the cavity, characteristics of the decorative element to be applied, and characteristics of the adhesive itself. In practice, the controller can make use of an algorithm to calculate and output the desired adhesive amount, using the characteristics of the cavity, decorative element and adhesive as inputs into this algorithm.

Alternatively, it is envisaged that the controller can store or have access to a look-up table, in which various combinations of values for these characteristics are listed against corresponding desired adhesive amounts.

Such a system allows for intelligent application of adhesive, ensuring that enough adhesive is applied to adhere the decorative element to the workpiece reliably, but guarding against the application of excess adhesive, which will appear unattractive to an observer.

Referring to FIG. 59, when the system is ready to apply adhesive to the workpiece 3, and the adhesive applicator 32 and first element location 640 are aligned, the controller outputs a signal to the adhesive applicator 32. This signal instructs the adhesive applicator 32 to apply the desired adhesive amount at the first element location 640. The decorative element applicator 30 is subsequently controlled to apply the first decorative element 2 to the adhesive at the first element location 640 as has been described above.

Figure 68:
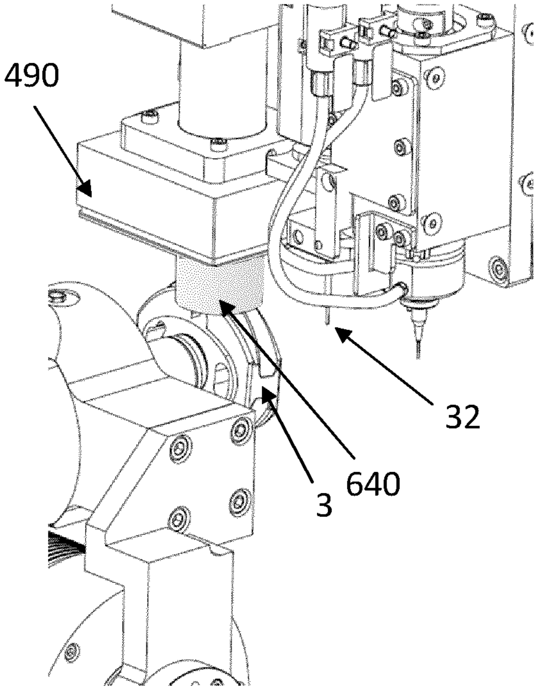
FIG. 68 is a perspective view of a camera of an adhesive regulation system of the machine of FIG. 1*a* conducting a quality check.

After the decorative element 2 has been applied, the controller is configured to instruct the first camera 490 to align again with the first element location 640 and to execute a quality check, which will now be described and which is shown in FIG. 68.

As part of this quality check, the first camera 490 captures another image of the first element location 640, now with the decorative element 2 in place. Examples of such images are shown in FIG. 69.

Figure 69A:
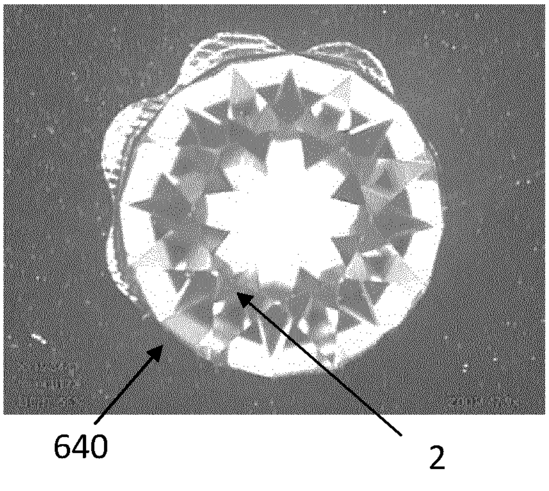
FIGS. 69*a* and 69*b* are examples of images captured by the camera of FIG. 68 during the quality check.
Figure 69B:
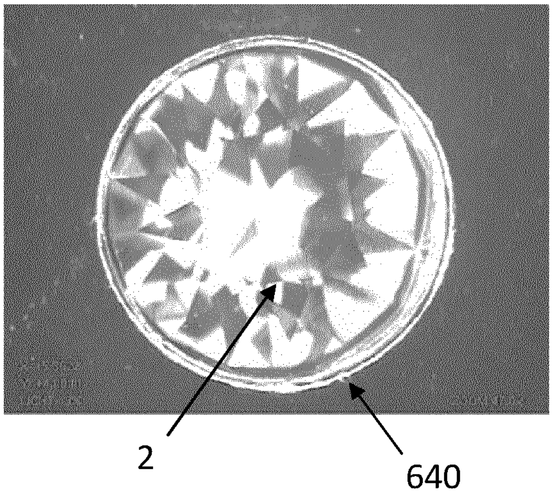

The captured image is then assessed by a processor to check for any application errors. For example, the processor may detect:

- whether or not the element 2 is present;
- whether there is an excess of adhesive at the first element location 640, such that the adhesive is visible around the periphery of the decorative element 2, as shown in FIG. 69*a;*
- an orientation of the decorative element 2 relative to the workpiece 3, to check whether the orientation corresponds to the intended application orientation of the decorative element 2; or
- a location of the decorative element 2 within the cavity 642, to check whether the element 2 is offset (for example as shown in FIG. 69*b*).

On receipt of the captured image, in the event that the controller determines that a fault is present, for example an excess amount of adhesive has been applied, or that the decorative element 2 is not in the application orientation, the controller is configured either to mark the first element location 640 for rework or to mark the workpiece 3 as scrap.

In contrast, in the event that the controller determines that there is no fault, the controller is configured to pass the element location 640.

The controller proceeds to determine the desired amount of adhesive and to execute this quality check in respect of each successive element location as the elements 2 are applied.

A determination made by the controller as to whether an excess amount of adhesive has been applied can advantageously be fed back into the adhesive regulation system 34 on a continuing basis. For example, in the event that the controller determines that an excess amount of adhesive has been applied in respect of a particular element location, the controller can adjust parameters or functions of the algorithm, or can adjust values stored within the look-up table, to be used by the controller to determine the desired amount of adhesive for subsequent adhesive applications. In particular, the controller can adjust these parameters or values such that the combination of adhesive, cavity and decorative element characteristics associated with that particular element location will, in the future, result in a reduced amount of adhesive being applied to the workpiece.

Thus, the adhesive regulation system 34 acting as a quality control system allows for effective and automatic quality control of articles that pass through the machine 1.

Once elements 2 have been applied to the workpiece 3 at every element location, the holder 12 and associated workpiece 3 are returned to the workpiece carrier system 11. Once the elements 2 have been applied to every workpiece 3 in the carrier system 11, the carrier system 11 is transported out of the machine 1 using the workpiece transporter system 15, as has already been described, and the holders 12 and associated workpieces 3 can be removed.

Any workpieces 3 that have been flagged for manual quality checks or for additional processing may be removed at this stage for further actions. Otherwise, the workpiece 3 may now be considered complete, and can be packaged for onward supply.

Having described the machine 1 and its relevant systems and processes in detail, it will be appreciated that the machine 1 provides an extremely fast and efficient means for automatically applying decorative elements 2 of many different shapes and sizes to articles of many different shapes and sizes. The process can be carried out in the machine 1 extremely quickly, at a high through-put rate and requiring limited human input. Overall, compared to an equivalent manual application operation, the workpiece throughput can be increased by an order of magnitude.

To maximise efficiency and through-put of the machine 1, the different systems may be configured to run in parallel to one another. For example:

- while a first carrier system and associated holders are inside the working volume 4 undergoing application, the user may insert a second carrier system into the workpiece insertion location 4 ready for use, and the workpiece transporter system 15 may transport the second carrier system to the workpiece receiving region;
- while a first element support is in the element presentation region, the element presentation system 24 may ready a second element support 16 by placing it in the sorting region and vibrating the support 16 so as to sort the elements 2 into the element presentation locations;
- while the workpiece manipulation system 18 is arranging a holder in the workpiece working region, the element transporter system 550 may be moving an element support 16 to the element presentation region and/or may be retrieving a first element from the element support 16 with the retrieval arm 36; and
- while the workpiece manipulation system 18 is moving the workpiece so that a new element location is presented for application of an element 2, the element applicator 30 may be retrieving an element 2 from the element retriever arm 36.

The modular nature of the carrier system 11 allows for full flexibility in the nature of the articles to be adorned in each cycle, allowing for a mixture of articles to be adorned in a single cycle, or for a single article type to be adorned if desired.

The machine 1 also provides for particularly accurate application of the elements 2 to the workpiece 3. Manufacturing variations in relation to both the workpieces 3 and the elements 2 can be overcome through processes such as accurate calculation of element locations, screening of elements 2, accurate calculation of optimum adhesive quantities, and quality control of element locations after element application.

It will be appreciated that the various systems described above may be used in isolation from one another or in any appropriate combination in a machine. For example, the element presentation system 24 could be used to sort and present elements 2 which are then used for manual application of elements 2 to a workpiece 3.

Other variations and modifications will be apparent to the skilled person without departing from the scope of the following claims. Embodiments of the present invention may also be understood by reference to the following numbered clauses:

1. A system (11) for supporting a workpiece (3) to allow transportation of the workpiece (3) to a working region (808) of a machine (1) for application of decorative elements (2) to the workpiece (3), the system comprising:
   - a holder (12) configured to hold a workpiece (1); and
   - a carrier (14) configured to carry the holder (12);
   - wherein the holder (12) comprises a connecting feature (48) that is configured to connect with a corresponding connecting feature (478) of a moveable support (470) of the machine (1) to connect the holder (12) to the moveable support (470) so that the moveable support (470) can transport the holder (12) to the working region (808) of the machine (1).

2. A system (11) according to Clause 1, wherein the holder (12) and carrier (14) each comprise cooperating engaging features (46, 348, 422) that are configured to engage to secure the holder (12) to the carrier (14) and to disengage to permit removal of the holder (12) from the carrier (14).

3. A system (11) according to Clause 2, wherein the cooperating engaging features (46, 348, 422) comprise cooperating male and female engaging features.

4. A system (11) according to Clause 3, wherein the engaging feature (46) of the holder (12) comprises one or more protrusions (47) that protrude from a main body (38) of the holder (12), and/or the engaging feature (422) of the carrier (14) comprises one or more recesses (426) configured to receive the protrusions (47) on the holder (12).

5. A system (11) according to any of Clauses 2 to 4, wherein:
   - the corresponding connecting feature (478) of the moveable workpiece support (470) is configured to connect with the connecting feature (48) of the holder (12) when the movable workpiece support (470) is moved in a connecting direction;
   - the engaging feature (46) of the holder (12) is configured to disengage with the respective engaging feature (422) of the carrier (14) when the holder (12) is moved in a disengaging direction; and
   - the disengaging direction and the connecting direction are the same direction.

6. A system (11) according to any of Clauses 2 to 5, wherein the carrier (14) comprises a withdrawal feature (424) configured to allow the holder (12) to be withdrawn from the carrier (14).

7. A system (11) according to any preceding clause, wherein the carrier (14) comprises an aperture (420), the aperture (420) being configured to surround a part of the holder (12), such that the holder (12) extends through the carrier (14) when the holder (12) is carried by the carrier (14).

8. A system according to Clause 7 when dependent on Clause 6, wherein the withdrawal feature (424) comprises one or more openings (430) that extend from the aperture (420).

9. A system according to Clause 8, when dependent on Clause 4, wherein spacings between the protrusions (47) on the holder (12) are the same as spacings between the openings (430) on the carrier (14), such that, when the protrusions (47) and the openings (430) are aligned, the main body (38) and protrusions of the holder (12) can be withdrawn through the aperture (420) and openings (430) of the carrier (14).

10. A system (11) according to any preceding clause, wherein the holder (12) comprises a first section (52) configured for location above the carrier (14) when the holder (12) is held by the carrier (14), and a second section (54) configured for location below the carrier (14) when the holder (12) is held by the carrier (14) and wherein the connecting feature (48) is located on the second section (54) of the holder (12).

11. A system (11) according to any preceding clause, wherein the connecting feature (48) on the holder (12) comprises a recess.

12. A machine (1) for automatically applying decorative elements (2) to a workpiece (3) held in a holder (12), the machine (1) comprising:
   - a workpiece-receiving region (800) for receiving a carrier (14) and associated holders (12) and workpieces (3) of the system (11) of any preceding clause; and
   - a moveable support (450) comprising a connecting feature (478) that is configured to engage with the connecting feature (48) on the holder (12) to connect the holder (12) to the moveable support (450);
   - wherein the moveable support (450) is moveable between the workpiece-receiving region (800) and the working region (808).

13. The machine (1) of Clause 12, wherein the moveable support (450) is configured to move in one or more directions and/or rotate in one or more rotational degrees of freedom to remove the holder (12) from the carrier (14).

14. A method for transporting a workpiece (3) to a working region (808) of a machine (1) for application of decorative elements (2) to the workpiece (3), the machine (1) having a moveable support (450) and the method comprising:
   - mounting a workpiece (3) to a holder (12), the holder (12) comprising a connecting feature (48);
   - mounting the holder (12) to a carrier (14);
   - arranging the carrier (14) and mounted holder (12) in the machine (1);
   - connecting a corresponding connecting feature (478) of the moveable support (450) with the connecting feature (48) of the holder (12) to connect the holder (12) to the moveable support (450); and,
   - using the moveable support (450):
     - removing the holder (12) from the carrier (14); and
     - transporting the holder (12) to the working region (808) of the machine (1).

15. A method of making an article, the article comprising a plurality of decorative elements (2) at respective element locations (640) and the method comprising:
   - transporting a workpiece (3) to a working region (808) of a machine (1) according to the method of Clause 14; and
   - applying a decorative element (2) to an element location (640) on the workpiece (3) in the working region (808) of the machine (1).

16. A system (24) for presenting a plurality of decorative elements (2) for automatic application of the decorative elements (4) to a workpiece (2), the system (24) comprising:
   - a sensor system (26) configured to detect a characteristic of the decorative elements (2);
   - a support (16) configured to support the decorative elements (2), the support (16) configured to provide a line of sight from the sensor system (26) to the decorative elements (2);

- a decorative element retriever (36, 30) configured to retrieve the decorative elements (2) from the support (16);
- a controller (900) configured to cause the decorative element retriever (36, 30) to retrieve a selected decorative element (2) from the support (16) in dependence on its decorative element characteristic.

17. A system (24) according to Clause 16, wherein the controller (900) is configured to cause movement of the support (16) and/or the decorative element retriever (36, 30) to align the decorative element retriever (36, 30) with a decorative element (2), to retrieve the element (2) from the support (16).

18. A system (24) according to Clause 16 or Clause 17, wherein the decorative element characteristic is one or more of the following:

- a presence of the decorative element (2);
- an orientation of the decorative element (2);
- a shape parameter of the decorative element (2), such as a roundness of the decorative element (2);
- a colour of the decorative element (2);
- a surface quality parameter of the decorative element (2);
- one or more dimensions of the decorative element (2), such as a maximum diameter of the decorative element (2); and
- an aspect ratio of the decorative element (2).

19. A system (24) according to any of Clauses 16 to 18, wherein the support (16) comprises a base (512) configured to provide the line of sight from the sensor system (26) to the decorative elements (2) through the base (512).

20. A system (24) according to any of Clauses 16 to 19, wherein the support (16) is at least partially transparent so as to provide the line of sight from the sensor system (26) to the decorative element (2).

21. A system (24) according to any of Clauses 16 to 20, wherein the controller (900) is configured to control an adhesive application system, and wherein the controller (900) is configured to determine a desired amount of adhesive to be applied by the adhesive application system to the workpiece (3) in dependence on the decorative element characteristic.

22. A system (24) according to any of Clauses 16 to 21, wherein the support (16) defines element presentation locations (526) at which elements (2) are presented for sensing by the sensor system (26) and retrieval by the element retriever (36, 30).

23. The system (24) according to Clause 22, wherein the element presentation locations (526) are defined by recesses or apertures (534) in the support (16).

24. The system (24) according to Clause 23, wherein the line of sight is provided via a base of the recess or aperture (534).

25. A system (24) according to any of Clauses 22 to 24, wherein the controller (900) is configured to output a signal to cause the support (16) to vibrate, to cause each decorative element (2) of the plurality of decorative elements (2) to self-locate in a respective element presentation location (526).

26. A system (24) according to any of Clauses 16 to 25, wherein the system (24) comprises a light source (600), the support (16) being positioned between the sensor system (26) and the light source (600).

27. A system (24) according to any of Clauses 16 to 26, wherein the decorative element retriever (36) is configured to invert the decorative element (2) following retrieval from the element support (16).

28. Apparatus for automatically applying a decorative element (2) to a workpiece (3), the apparatus comprising the system (24) of any of Clauses 16 to 27 for presenting a plurality of decorative elements (2) for automatic application of the decorative elements (2) to a workpiece (3), and an element applicator (36, 30) for applying the decorative elements (2) to the workpiece (3).

29. A method of selecting a decorative element (2) for automatic application of the decorative element (2) to a workpiece (3), the method comprising:

- supporting a plurality of decorative elements (2) on a support (16), the support (16) providing a line of sight from a sensor (26) to the decorative element (2);
- detecting a characteristic of the decorative elements (2) using the sensor (26); and
- selectively retrieving a decorative element (2) from the support (16) in dependence on the decorative element characteristic.

30. A method of making an article, the article comprising a plurality of decorative elements (2) at respective element locations (640) and the method comprising:

- providing a workpiece (3) defining the plurality of element locations (640);
- supporting a plurality of decorative elements (2) on a support (16), the support (16) providing a line of sight from a sensor (26) to the decorative elements (2);
- detecting a characteristic of the decorative elements (2) using the sensor (26);
- selectively retrieving a decorative element (2) from the support (16) in dependence on the decorative element characteristic;
- applying the retrieved decorative element (2) to the workpiece (3) at the element location (640).

The invention claimed is:

1. Apparatus (1) for automatically applying a decorative element (2) to a workpiece (3), wherein the decorative element (2) is a faceted element, a pearl, or a bead, the apparatus comprising:

- an element applicator (30) configured to apply the decorative element (2) in an application direction at an application location;
- a moveable support (470) for supporting the workpiece (3), the support (470) being moveable by translation and/or rotation along and/or about an axis transverse to the application direction;
- a control arrangement configured to:
  - determine, or receive information relating to, an element location at which the decorative element (2) is to be applied to the workpiece (3);
  - cause relative translation and/or rotation between the support (470) and the element applicator (30) along and/or about an axis transverse to the application direction to align and/or orient the application location with the element location; and
  - cause the element applicator (30) to apply the decorative element (2) at the element location of the workpiece (3); and
- a workpiece carrier system (11) comprising a plurality of holders (12) each configured to hold a workpiece (3) and a carrier (14) configured to carry the plurality of holders (12),
- wherein the apparatus (1) comprises a workpiece presentation area for presenting workpieces (3) on the workpiece carrier system (11) and a working area in which the element applicator (30) applies decorative elements (2) to the workpiece (3), wherein the moveable support (470) comprises a connecting feature configured to engage with a corresponding or complementary connecting feature of each holder (12) to allow manipulation of each holder (12), and wherein the moveable support (470) is moveable between the workpiece presentation area and the working area to retrieve a holder (12) holding a workpiece (3) from the carrier (14) of the workpiece carrier system (11) and to transport the workpiece (3) from the workpiece presentation area to the working area.

2. Apparatus (1) according claim 1, wherein the apparatus comprises an element retrieval location at which one or more decorative elements (2) are presented to the element applicator (30), and wherein the element applicator (30) is moveable between the retrieval location and the working area so as to retrieve a decorative element (2) from the element retrieval location and transport it to the working area for application to the workpiece (3).

3. Apparatus (1) according claim 2, wherein the apparatus (1) further comprises an element presentation region for presenting a plurality of elements (2) on an element support (16), and wherein the element presentation region defines the element retrieval location, such that the element applicator (30) is moveable between the element presentation region and the working area.

4. Apparatus (1) according claim 2, wherein the apparatus (1) further comprises an element presentation region for presenting a plurality of elements (2) on an element support (16), and an element retriever (36) configured to retrieve an element (2) from the element support (16) and transport the element (2) to the element retrieval location, the element applicator (30) being configured to retrieve the element (2) from the element retrieval location.

5. Apparatus (1) according to claim 4, wherein the element retriever (36) comprises a retriever arm configured to rotate the decorative element (2) from a presentation orientation to an application orientation during transportation, the application orientation corresponding to an orientation of the decorative element (2) when the decorative element (2) has been applied to the workpiece (3).

6. Apparatus (1) according to claim 2, wherein the apparatus (1) further comprises an element presentation region for presenting a plurality of elements (2) on an element support (16), the support (16) defining element presentation locations (526) at which elements (2) are presented, and wherein the control arrangement is configured to output a signal to cause the support (16) to vibrate to cause each decorative element (2) of the plurality of elements (2) to self-locate in a respective element presentation location (526).

7. Apparatus (1) according to claim 1, wherein the apparatus (1) further comprises an adhesive regulation system (34) configured to detect or receive information relating to a workpiece characteristic, and wherein the control arrangement is configured to determine a desired adhesive amount for application at the element location in dependence on the workpiece characteristic.

8. Apparatus (1) according to claim 7, wherein the apparatus (1) comprises an adhesive applicator (32) configured to apply adhesive to the element location of the workpiece (3), the control arrangement being configured to output an instruction to the adhesive applicator (32) to dispense the desired adhesive amount to the workpiece (3).

9. Apparatus (1) according to claim 1, wherein the workpiece (3) has a primary reference feature (486) common to all workpieces (3) of that type and the apparatus (1) further comprises an alignment sensor system (500) configured to detect the primary reference feature (486), and wherein the control arrangement is configured to: determine an offset between a detected primary reference feature location and/or orientation and a target location and/or orientation; and align the primary reference feature (486) with the target location and/or orientation.

10. Apparatus (1) according to claim 1, wherein:

the control arrangement is configured to store or receive information relating to a base model of the workpiece (3), the base model including information relating to one or more secondary parameters of the base model, and a plurality of element locations on the base model;

an alignment sensor system (500) is configured to detect a secondary parameter relating to a selected area of the workpiece (3), and to transmit information relating to the detected secondary parameter to the control arrangement; and the control arrangement is configured to determine a deviation between the detected secondary parameter and a corresponding secondary parameter of the base model, and to calculate an updated model for the selected area of the workpiece (3) based on the deviation, the updated model comprising updated element locations in the selected area of the workpiece (3).

11. A method of making an article, the article comprising a plurality of decorative elements (2) at respective element locations, wherein the decorative elements (2) are faceted elements, pearls, or beads, and the method comprising:

a) providing an element applicator (30) configured to apply a decorative element (2) in an application direction at an application location;

b) providing a workpiece (3) defining the plurality of element locations;

c) supporting the workpiece (3) using a moveable support (470);

d) causing relative translation and/or rotation between the moveable support (470) and the element applicator (30) along and/or about an axis transverse to the application direction to align and/or orient the application location with an element location; and e) causing the element applicator (30) to apply a decorative element (2) at the element location of the workpiece (3); and wherein the method further comprises:

providing a workpiece carrier system (11) comprising a plurality of holders (12) each configured to hold a workpiece (3) and a carrier (14) configured to carry the plurality of holders (12), wherein the moveable support (470) comprises a connecting feature configured to engage with a corresponding or complementary connecting feature of each holder (12) to allow manipulation of each holder (12); and moving the moveable support (470) to retrieve a holder (12) holding a workpiece (3) from the carrier (14) of the workpiece carrier system (11) within a workpiece presentation area, and to transport the workpiece (3) to a working area, where the element applicator (30) applies decorative elements (2) to the workpiece (3).

12. Apparatus (1) according to claim 1, wherein the workpiece (3) is a decorative article, and/or the decorative element (2) is a decorative element of glass, ceramic, glass ceramic, precious or semi-precious stone, resin, plastics material or metal.

13. Method according to claim 11, wherein the workpiece (3) is a decorative article and/or the decorative element (2)

is a decorative element of glass, ceramic, glass ceramic, precious or semi-precious stone, resin, plastics material or metal.

14. Apparatus (1) according to claim 12, wherein the workpiece (3) is an article of jewellery and/or the decorative element (2) is a jewellery element.

15. Method according to claim 13, wherein the workpiece (3) is an article of jewellery and/or the decorative element (2) is a jewellery element.

* * * * *